US012705880B2

(12) United States Patent
Whitman et al.

(10) Patent No.: US 12,705,880 B2
(45) Date of Patent: Aug. 11, 2026

(54) PERCEPTION AND FITTING FOR A STAIR TRACKER

(71) Applicant: Boston Dynamics, Inc., Waltham, MA (US)

(72) Inventors: Eric Cary Whitman, Watertown, MA (US); Gene Brown Merewether, Cambridge, MA (US)

(73) Assignee: Boston Dynamics, Inc., Waltham, MA (US)

(*) Notice: Subject to any disclaimer, the term of this patent is extended or adjusted under 35 U.S.C. 154(b) by 270 days.

(21) Appl. No.: 18/149,588

(22) Filed: Jan. 3, 2023

(65) Prior Publication Data

US 2023/0143315 A1 May 11, 2023

Related U.S. Application Data

(63) Continuation of application No. 16/877,721, filed on May 19, 2020, now Pat. No. 11,599,128.

(Continued)

(51) Int. Cl.
*G06V 20/10* (2022.01)
*B62D 57/02* (2006.01)
(Continued)

(52) U.S. Cl.
CPC ............ *G06V 20/10* (2022.01); *B62D 57/02* (2013.01); *G05D 1/10* (2013.01); *G06F 18/243* (2023.01); *G06V 10/44* (2022.01); *G06V 10/764* (2022.01)

(58) Field of Classification Search
CPC ...... G06V 20/10; G06V 10/44; G06V 10/764; B62D 57/02; G05D 1/10; G06F 18/243; G06T 7/62
See application file for complete search history.

(56) References Cited

U.S. PATENT DOCUMENTS 3,533,483 A 10/1970 Ballinger
5,378,969 A 1/1995 Haikawa
(Continued)

FOREIGN PATENT DOCUMENTS

CN 103273984 9/2013
CN 103273985 9/2013
(Continued)

OTHER PUBLICATIONS

Aoi et al., "Adaptive Control Strategies for Interlimb Coordination in Legged Robots: A Review," Frontiers in Neurorobotics, Aug. 2017, 21 pages, https://doi.org/10.3389/fnbot.2017.00039.
(Continued)

*Primary Examiner* — Anne Marie Antonucci
*Assistant Examiner* — Jewel A Kuntz
(74) *Attorney, Agent, or Firm* — Knobbe, Martens, Olson & Bear, LLP

(57) ABSTRACT

A method for perception and fitting for a stair tracker includes receiving sensor data for a robot adjacent to a staircase. For each stair of the staircase, the method includes detecting, at a first time step, an edge of a respective stair of the staircase based on the sensor data. The method also includes determining whether the detected edge is a most likely step edge candidate by comparing the detected edge from the first time step to an alternative detected edge at a second time step, the second time step occurring after the first time step. When the detected edge is the most likely step edge candidate, the method includes defining, by the data processing hardware, a height of the respective stair based on sensor data height about the detected edge. The method also includes generating a staircase model including stairs with respective edges at the respective defined heights.

20 Claims, 31 Drawing Sheets

Related U.S. Application Data

(60) Provisional application No. 63/013,677, filed on Apr. 22, 2020.

(51) Int. Cl.
*G05D 1/00* (2024.01)
*G06F 18/243* (2023.01)
*G06V 10/44* (2022.01)
*G06V 10/764* (2022.01)

(56) References Cited

U.S. PATENT DOCUMENTS 5,402,050 A * 3/1995 Ozawa ................ B62D 57/032 318/568.1
5,416,393 A 5/1995 Gomi et al.
5,737,217 A 4/1998 Nishikawa et al.
5,838,130 A 11/1998 Ozawa
5,872,893 A 2/1999 Takenaka et al.
5,974,366 A 10/1999 Kawai et al.
6,021,363 A 2/2000 Nishikawa et al.
6,177,776 B1 1/2001 Kawai et al.
6,317,652 B1 11/2001 Osada
6,438,454 B1 8/2002 Kuroki
6,527,071 B1 3/2003 Villedieu
6,718,231 B2 4/2004 Konno et al.
7,053,577 B2 5/2006 Nagasaka
7,127,326 B2 10/2006 Lewis
7,219,064 B2 5/2007 Nakakita et al.
7,319,918 B2 1/2008 Takenaka et al.
7,482,775 B2 1/2009 Zaier
7,653,216 B2 1/2010 Kanade et al.
7,878,276 B2 2/2011 Limbacher
7,912,583 B2 3/2011 Gutmann et al.
8,289,321 B2 10/2012 Gutmann et al.
8,410,732 B2 4/2013 Kassow et al.
8,457,830 B2 6/2013 Goulding
8,614,559 B2 12/2013 Kassow et al.
8,630,763 B2 1/2014 Goulding
8,688,273 B2 4/2014 Lee et al.
8,737,692 B2 5/2014 Asatani
8,779,715 B2 7/2014 Kassow et al.
9,089,968 B2 7/2015 Goulding
9,096,281 B1 * 8/2015 Li ......................... B62D 55/04
9,446,518 B1 9/2016 Blankespoor
9,488,987 B2 11/2016 Goulding
9,499,218 B1 11/2016 Stephens
9,527,538 B2 12/2016 Kaneko et al.
9,552,640 B2 1/2017 Yoon
9,561,592 B1 2/2017 Da Silva
9,594,377 B1 * 3/2017 Perkins ................. G05D 1/021
9,630,319 B2 4/2017 Vicenti
9,849,926 B2 12/2017 Saunders
9,862,095 B2 1/2018 Takagi et al.
9,868,210 B1 1/2018 Whitman
9,878,751 B1 1/2018 Thorne et al.
9,908,240 B1 3/2018 Da Silva
9,926,025 B1 3/2018 Blankespoor et al.
9,975,245 B1 5/2018 Whitman
9,989,970 B1 6/2018 Morey et al.
10,081,098 B1 9/2018 Nelson
10,099,378 B2 10/2018 Kaneko et al.
10,102,429 B2 10/2018 Schnittman
10,126,757 B2 11/2018 Goulding
10,144,342 B2 12/2018 Ji et al.
10,179,619 B1 1/2019 Urata
10,196,104 B1 2/2019 Kagami
10,327,969 B2 6/2019 Galonska
10,414,318 B2 9/2019 Valtanen
10,434,651 B1 10/2019 Blankespoor et al.
10,528,051 B1 1/2020 Perkins et al.
10,688,667 B1 6/2020 Berard et al.
10,908,612 B2 2/2021 Palan et al.
10,926,756 B2 2/2021 Coulter et al.
11,059,532 B1 7/2021 Fay et al.
11,073,842 B1 7/2021 Whitman et al.
11,077,898 B2 8/2021 Saunders et al.
11,123,869 B2 9/2021 Whitman et al.
11,247,344 B2 2/2022 Berard et al.
11,287,826 B2 3/2022 Whitman et al.
11,298,826 B1 4/2022 Jackowski et al.
11,383,381 B2 7/2022 Whitman et al.
11,413,570 B2 8/2022 Jefferson et al.
11,416,003 B2 8/2022 Whitman et al.
11,447,195 B2 9/2022 Whitman
11,548,151 B2 1/2023 Whitman et al.
11,599,128 B2 3/2023 Whitman et al.
11,660,752 B2 5/2023 Whitman et al.
12,077,229 B2 9/2024 Whitman
12,094,195 B2 9/2024 Komoroski
12,151,380 B2 11/2024 Whitman et al.
2002/0022907 A1 2/2002 Takenaka et al.
2005/0131581 A1 6/2005 Sabe et al.
2006/0185911 A1 8/2006 Gunderson et al.
2007/0257910 A1 11/2007 Gutmann et al.
2008/0086241 A1 4/2008 Phillips et al.
2008/0281468 A1 11/2008 Jacobsen et al.
2009/0321150 A1 12/2009 Kwon et al.
2011/0054690 A1 3/2011 Gal
2011/0208444 A1 8/2011 Solinsky
2011/0231050 A1 9/2011 Goulding
2012/0072052 A1 3/2012 Powers et al.
2012/0215355 A1 8/2012 Bewley et al.
2013/0116820 A1 5/2013 Lee et al.
2014/0277718 A1 9/2014 Izhikevich et al.
2015/0073592 A1 3/2015 Kaneko et al.
2016/0174459 A1 6/2016 Balutis et al.
2016/0297072 A1 10/2016 Williams et al.
2016/0362147 A1 * 12/2016 Mailey .................. A61G 5/061
2017/0243365 A1 8/2017 Nuijten
2018/0035606 A1 2/2018 Burdoucci
2018/0111261 A1 4/2018 Asada et al.
2019/0156472 A1 5/2019 Link et al.
2019/0210225 A1 7/2019 Hong
2019/0256159 A1 8/2019 Zhou et al.
2019/0325763 A1 10/2019 Hux et al.
2019/0351555 A1 11/2019 Blankespoor et al.
2019/0377349 A1 12/2019 van der Merwe et al.
2019/0388247 A1 * 12/2019 Goldfarb .................. A61F 2/60
2020/0117198 A1 4/2020 Whitman et al.
2020/0150655 A1 5/2020 Artes et al.
2020/0324412 A1 10/2020 Whitman et al.
2020/0397202 A1 12/2020 Artes et al.
2021/0041887 A1 2/2021 Whitman et al.
2021/0055113 A1 2/2021 Jeon et al.
2021/0089037 A1 3/2021 Fukuoka et al.
2021/0096560 A1 4/2021 Al-Mohssen et al.
2021/0114620 A1 4/2021 Yu et al.
2021/0299867 A1 * 9/2021 Kenneally ........... B62D 57/032
2021/0323618 A1 10/2021 Komoroski
2021/0331317 A1 10/2021 Whitman et al.
2021/0331754 A1 10/2021 Whitman
2021/0333804 A1 10/2021 Whitman et al.
2022/0089234 A1 * 3/2022 Sprowitz ............. B62D 57/032
2022/0253060 A1 8/2022 Xu
2022/0388170 A1 12/2022 Merewether
2022/0390952 A1 12/2022 Yu et al.
2022/0410390 A1 12/2022 Whitman et al.
2023/0008677 A1 1/2023 Whitman et al.
2023/0356397 A1 11/2023 Rivot et al.
2023/0415343 A1 12/2023 Whitman et al.
2024/0174310 A1 5/2024 Whitman et al.
2024/0193936 A1 6/2024 Komoroski
2024/0378846 A1 11/2024 Tsuzaki
2025/0135646 A1 5/2025 Whitman et al.
2026/0064124 A1 3/2026 Whitman

FOREIGN PATENT DOCUMENTS

CN 103963864 A 8/2014
CN 205034207 U 2/2016
CN 107943021 4/2018
CN 207780600 U 8/2018
CN 109202901 1/2019

(56) References Cited

FOREIGN PATENT DOCUMENTS

| | | | | |
|---|---|---|---|---|
| CN | 109434795 | A | 3/2019 | |
| CN | 106547206 | | 8/2019 | |
| CN | 209615483 | U | 11/2019 | |
| CN | 113661462 | | 11/2021 | |
| CN | 115667061 | | 1/2023 | |
| CN | 115702405 | | 2/2023 | |
| CN | 115702445 | | 2/2023 | |
| EP | 1502843 | A2 | 2/2005 | |
| JP | 61257375 | | 11/1986 | |
| JP | S63176720 | | 7/1988 | |
| JP | 5318342 | | 12/1993 | |
| JP | H07166974 | | 6/1995 | |
| JP | H07237154 | A | 9/1995 | |
| JP | 2001079787 | A | 3/2001 | |
| JP | 2003236781 | | 8/2003 | |
| JP | 2003340763 | | 12/2003 | |
| JP | 2004181600 | | 7/2004 | |
| JP | 2007041656 | | 2/2007 | |
| JP | 2007175831 | A | 7/2007 | |
| JP | 4295947 | B2 * | 7/2009 | |
| JP | 4476468 | B2 | 6/2010 | |
| JP | 4613692 | B2 | 1/2011 | |
| JP | 2013072813 | | 4/2013 | |
| JP | 2013237126 | | 11/2013 | |
| JP | 2014100767 | | 6/2014 | |
| JP | 2015051483 | | 3/2015 | |
| JP | 2015054391 | | 3/2015 | |
| JP | 2015080832 | | 4/2015 | |
| JP | 7351920 | | 9/2023 | |
| JP | 7351920 | B2 | 9/2023 | |
| KR | 20100093833 | | 8/2010 | |
| KR | 20100093834 | | 8/2010 | |
| KR | 20160055731 | A | 5/2016 | |
| KR | 20230006507 | | 1/2023 | |
| WO | WO 2003090982 | | 11/2003 | |
| WO | WO 2005087452 | | 9/2005 | |
| WO | WO-2005087452 | A1 * | 9/2005 | B62D 57/032 |
| WO | WO 2009/131341 | | 10/2009 | |
| WO | WO 2012086604 | | 6/2012 | |
| WO | WO 2018035320 | | 2/2018 | |
| WO | WO 2020209888 | | 10/2020 | |
| WO | WO 2021216231 | | 10/2021 | |
| WO | WO 2021216235 | | 10/2021 | |
| WO | WO 2021216264 | | 10/2021 | |
| WO | WO 2024/058844 | | 3/2024 | |

OTHER PUBLICATIONS

Battaglia, "Design of the SCOUT II Quadruped with Preliminary Stair-Climbing," McGill University, May 1999, 143 pages, https://escholarship.mcgill.ca/downloads/4f16c4825?locale=en.

Bazeille et al., "Vision Enhanced Reactive Locomotion Control for Trotting on Rough Terrain", In 2013 IEEE Conference on Technologies for Practical Robot Applications (TePRA) Apr. 22, 2013; pp. 1-6, https://doi.org/10.1109/TePRA.2013.6556366.

Bazeille, et al., "Quadruped Robot Trotting Over Irregular Terrain Assisted by Stereo-Vision," Intelligent Service Robotics, Mar. 2014, 12 pages, https://iit-dlslab.github.io/papers/bazeille14isr.pdf.

Bellicoso et al., "Perception-less Terrain Adaptation through Whole Body Control and Hierarchical Optimization.," 2016 IEEE-RAS 16th International Conference on Humanoid Robots (Humanoids), Nov. 2016, pp. 558-564, doi: 10.1109/HUMANOIDS.2016.7803330.

Bellicoso et al., "Dynamic Locomotion through Online Nonlinear Motion Optimization for Quadrupedal Robots," IEEE Robotics and Automation Letters, Jul. 2018, vol. 3, No. 3, pp. 2261-2268, doi: 10.1109/LRA.2018.2794620.

"Boston Dynamics: The Coming Robot Revolution—Marc Raibert," video screen shots taken from https://www.youtube.com/watch?v=FahbCJ330Vg, Nov. 14, 2017, downloaded Jan. 31, 2024, 7 pages.

"Boston Dynamics Spot Mini at MIT AGI lecture," video screen shots taken from https://www.youtube.com/watch?v=I_l6-iwyKvc, Feb. 18, 2018, downloaded Apr. 17, 2024, 3 pages.

Brewer, "Development of a Quadruped Robot and Parameterized Stair-Climbing Behavior," University of Maryland, Jan. 2011, 132 pages, https://drum.lib.umd.edu/bitstreams/023eee39-6342-4d49-b7b3-cfc95077d988/download.

Camurri M., "Multisensory State Estimation and Mapping on Dynamic Legged Robots", Thesis for Doctor of Philosophy, University of Genova, Italy, Mar. 2017, 1-145 pages, https://iit-dlslab.github.io/papers/camurri17phd.pdf.

Chu J., "'Blind' Cheetah 3 robot can climb stairs littered with obstacles", MIT News Office Jul. 4, 2018, 10 pages, https://news.mit.edu/2018/blind-cheetah-robot-climb-stairs-obstacles-disaster-zones-0705.

Eich et al., "Adaptive compliance control of a multi-legged stair-climbing robot based on proprioceptive data," Industrial Robot, Jun. 2009, vol. 36 No. 4, pp. 331-339. https://doi.org/10.1108/01439910910957084.

Ellenberg, "A Stability-Estimator to Unify Humanoid Locomotion: Walking, Stair-Climbing and Ladder-Climbing," Drexel University, Jun. 2014, 106 pages, DOI: https://doi.org/10.17918/etd-4538.

Fankhauser et al., "Robot-Centric Elevation Mapping with Uncertainty Estimates", In Mobile Service Robotics Apr. 1, 20147; pp. 433-440, https://core.ac.uk/download/pdf/148004368.pdf.

Fankhauser et al., "Free Gait—An Architecture for the Versatile Control of Legged Robots," 2016 IEEE-RAS 16th International Conference on Humanoid Robots (Humanoids), Nov. 2016, pp. 1052-1058, doi: 10.1109/HUMANOIDS.2016.7803401.

Focchi et al., "Heuristic Planning for Rough Terrain Locomotion in Presence of External Disturbances and Variable Perception Quality", Advances in Robotics Research: From Lab to Market: ECHORD++: Robotic Science Supporting Innovation. 2020; pp. 165-209, https://doi.org/10.48550/arXiv.1805.10238.

Gehring et al., "Quadrupedal Locomotion Using Trajectory Optimization and Hierarchical Whole Body Control," 2017 IEEE International Conference on Robotics and Automation (ICRA), May 2017, pp. 4788-4794, doi: 10.1109/ICRA.2017.7989557.

"Google-owned robot lab Boston Dynamics shows off its Spot Mini prototype at TechCrunch Disrupt," video screen shots taken from https://www.youtube.com/watch?v=qNo-muuj128, Dec. 5, 2016, downloaded Apr. 17, 2024, 4 pages.

Gutmann et al., "Stair Climbing for Humanoid Robots Using Stereo Vision," 2004 IEEE/RSJ International Conference on Intelligent Robots and Systems (IROS) (IEEE Cat. No. 04CH37566), Sep. 28, 2004, pp. 1407-1413 vol. 2, doi: 10.1109/IROS.2004.1389593.

Haynes et al., "Multistable Phase Regulation for Robust Steady and Transitional Legged Gaits.," TheInternational Journal of Robotics Research, Sep. 2012, vol. 31, Issue 14, pp. 1712-1738, https://doi.org/10.1177/0278364912458463.

Hutter et al., "ANYmal—A Highly Mobile and Dynamic Quadrupedal Robot", 2016 IEEE/RSJ international conference on intelligent robots and systems (IROS) Oct. 9, 2016; pp. 38-44, https://doi.org/10.1109/IROS.2016.7758092.

Ilyas et al., "Design of sTetro: A Modular, Reconfigurable, and Autonomous Staircase Cleaning Robot," Journal of Sensors, Jul. 2018, 25 pages, https://doi.org/10.1155/2018/8190802.

Kaslin et al., "Towards a Passive Adaptive Planar Foot with Ground Orientation and Contact ForceSensing for Legged Robots," 2018 IEEE/RSJ International Conference on Intelligent Robots and Systems (IROS), Oct. 2018, pp. 2707-2714, doi: 10.1109/IROS.2018.8593875.

Kim et al., "Realization of Dynamic Stair Climbing for Biped Humanoid Robot Using Force/Torque Sensors," Journal of Intelligent and Robotic Systems, Apr. 2009, vol. 56, pp. 389-423, DOI:10.1007/s10846-009-9324-z.

Ko, et al., "Trajectory Planning and Four-Leg Coordination for Stair Climbing in a Quadruped Robot,"2010 IEEE/RSJ International Conference on Intelligent Robots and Systems, Oct. 2010, 6 pages, http://peichunlin.me.ntu.edu.tw/homepage/research/Publication/2010%20IROS.pdf.

Lan et al., "Novel design of a wheeled robot with double swing arms capable of autonomous stair climbing," Proceedings of the 2018 International Conference on Mechatronic Systems and Robots May 2, 20185 (pp. 110-114) https://doi.org/10.1145/3230876.3230899.

(56) References Cited

OTHER PUBLICATIONS

Lee et al., "Robust Recovery Controller for a Quadrupedal Robot using Deep Reinforcement Learning," arXiv.org, Jan. 2019, 8 pages, https://doi.org/10.48550/arXiv.1901.07517.
Li et al., "A Kinect-sensor-based Tracked Robot for Exploring and Climbing Stairs," International Journal of Advanced Robotic Systems, Jan. 2014,11(5), 11 pages, doi:10.5772/58583.
Liu et al., The development of a multi-legged robot using eight-bar linkages as leg mechanisms with switchable modes for walking and stair climbing. In2017 3rd International Conference on Control, Automation and Robotics (ICCAR) Apr. 24, 2017 (pp. 103-108).
Marion, et al., "Director: A User Interface Designed for Robot Operation with Shared Autonomy," Journal of Field Robotics, Dec. 2016, 25 pages, https://groups.csail.mit.edu/robotics-center/public_papers/Marion16.pdf.
"Meet Spot, the robot dog that can run, hop and open doors | Marc Raibert," video screen shots taken from https://www.youtube.com/watch?v=AO4In7d6X-c, Aug. 14, 2017, downloaded Jan. 31, 2024, 5 pages.
Pack D.J., "Sensor-Based Planning and Control for a Quadruped Walking Robot," Purdue University, 1996, 190 pages; https://dl.acm.org/doi/book/10.5555/240733.
Patil et al., Deep learning based stair detection and statistical image filtering for autonomous stair climbing. In 2019 3rd IEEE International Conference on Robotic Computing (IRC) Feb. 25, 2019 (pp. 159-166).
Qi et al., "Perceptive autonomous stair climbing for quadrupedal robots," 2021 IEEE/RSJ International Conference on Intelligent Robots and Systems (IROS) Sep. 27, 2021 (pp. 2313-2320) https://doi.org/10.1109/IROS51168.2021.9636302.
Raibert et al., "Dynamically Stable Legged Locomotion," The Leg Laboratory, Report LL-6, Sep. 1989, 207 pages, https://apps.dtic.mil/sti/tr/pdf/ADA225713.pdf.
Raković et al., "Biped walking and stairs climbing using reconfigurable adaptive motion primitives". In 2016 IEEE-RAS 16th International Conference on Humanoid Robots (Humanoids) Nov. 1, 20165 (pp. 57-62).
Shkolnik et al., "Bounding on Rough Terrain with the LittleDog Robot," The International Journal of Robotics Research, Dec. 2010, 30(2) pp. 192-215, doi:10.1177/0278364910388315.
"Silicon Valley—Erlich Hits the Robotic Deer," video screen shots taken from https://www.youtube.com/watch?v=-mHYoXedZ10, Apr. 30, 2016, downloaded Apr. 17, 2024, 8 pages.
Suganuma, et al., "A Remote Operated Quadruped Robot System for Investigation of Reactor Building," 2014 22nd International Conference on Nuclear Engineering, Jul. 2014, 4 pages, https://citeseerx.ist.psu.edu/document?repid=rep1&type=pdf&doi=fdade07033b9a6cfaeb3f414261317e4967f8c03.
"The Spot by Boston Dynamics comes on stage at Disrupt SF," video screen shots taken fromhttps://www.youtube.com/watch?v=3Q0ZC_wDoGI, Sep. 14, 2016, downloaded Jan. 31, 2024, 4 pages.
Thu et al., "Autonomous stairs ascending and descending algorithm for tri-star wheeled robot," 2018 3rd International Conference on Advanced Robotics and Mechatronics (ICARM) Jul. 18, 2018 (pp. 328-333) https://doi.org/10.1109/ICARM.2018.8610676.
Vatankhah M., "Synergy Pattern Identification of Hip, Knee, Ankle Joints During Human Stair Ascent as a Bio-Inspired Model for Humanoid Robots," Stevens Institute of Technology, 2018, 104 pages, ISBN: 9780438259966.
"Vision-free MIT Cheetah", video screen shots taken from https://www.youtube.com/watch?v=QZ1DaQgg3IE, Jul. 5, 2018, downloaded Jan. 16, 2024, 25 pages.
Zeng et al., "Leg Trajectory Planning for Quadruped Robots with High-Speed Trot Gait," Applied Sciences, Apr. 2019, 21 pages, doi: 10.3390/app9071508.
Korean Office Action dated Aug. 19, 2024 in Application No. 10-2022-7036795; 22 Pages.
Communication Relating to the Results of the Partial International Search for PCT/US2023/025760, dated Apr. 9, 2024, 15 pages.
International Search Report and Written Opinion for PCT/US2023/025760, dated Jun. 6, 2024, 21 pages.
Defendant Ghost Robotics Corporation's Supplemental Identification of Invalidity References in *Boston Dynamics, Inc.* v. *Ghost Robotics Corporation,* Case No. 1.22-cv-01483-UNA (D. Del.), Jan. 19, 2024, 23 pages (involving U.S. Pat. Nos. 9,308,648, 9,662,791, 11,123,869, 9,387,588, 11,073,842, 10,253,855, 11,131,368).
Defendant Ghost Robotics Corporation's Final Invalidity Contentions in *Boston Dynamics, Inc.* v. *GhostRobotics Corporation,* Case No. 1.22-cv-01483-UNA (D. Del.), Mar. 7, 2024, 81 pages (involving U.S. Pat. Nos. 9,308,648, 9,662,791, 11,123,869, 9,387,588, 11,073,842, 10,253,855, 11,131,368).
Exhibit C1(i) (Redacted), *Boston Dynamics, Inc.* v. *Ghost Robotics Corporation,* Case No. 1.22-cv-01483-UNA (D. Del.), Mar. 7, 2024, 44 pages (involving U.S. Pat. Nos. 9,308,648, 9,662,791, 11,123,869, 9,387,588, 11,073,842, 10,253,855, 11,131,368).
Exhibit C1(ii) (Redacted), *Boston Dynamics, Inc.* v. *Ghost Robotics Corporation,* Case No. 1.22-cv-01483-UNA (D. Del.), Mar. 7, 2024, 54 pages (involving U.S. Pat. Nos. 9,308,648, 9,662,791, 11,123,869, 9,387,588, 11,073,842, 10,253,855, 11,131,368).
Exhibit C1(iii) (Redacted), *Boston Dynamics, Inc.* v. *Ghost Robotics Corporation,* Case No. 1.22-cv-01483-UNA (D. Del.), Mar. 7, 2024, 86 pages (involving U.S. Pat. Nos. 9,308,648, 9,662,791, 11,123,869, 9,387,588, 11,073,842, 10,253,855, 11,131,368).
Exhibit C2 (Redacted), *Boston Dynamics, Inc.* v. *Ghost Robotics Corporation,* Case No. 1.22-cv-01483-UNA (D. Del.), Mar. 7, 2024, 38 pages (involving U.S. Pat. Nos. 9,308,648, 9,662,791, 11,123,869, 9,387,588, 11,073,842, 10,253,855, 11,131,368).
Exhibit C3 (Redacted), *Boston Dynamics, Inc.* v. *Ghost Robotics Corporation,* Case No. 1.22-cv-01483-UNA (D. Del.), Mar. 7, 2024, 44 pages (involving U.S. Pat. Nos. 9,308,648, 9,662,791, 11,123,869, 9,387,588, 11,073,842, 10,253,855, 11,131,368).
Exhibit E1, *Boston Dynamics, Inc.* v. *Ghost Robotics Corporation,* Case No. 1.22-cv-01483-UNA (D. Del.), Mar. 7, 2024, 115 pages (involving U.S. Pat. Nos. 9,308,648, 9,662,791, 11, 123,869, 9,387,588, 11,073,842, 10,253,855, 11,131,368).
Exhibit E2, *Boston Dynamics, Inc.* v. *Ghost Robotics Corporation,* Case No. 1.22-cv-01483-UNA (D.Del.), Mar. 7, 2024, 63 pages (involving U.S. Pat. Nos. 9,308,648, 9,662,791, 11,123,869, 9,387,588, 11,073,842, 10,253,855, 11,131,368).
Exhibit E3, *Boston Dynamics, Inc.* v. *Ghost Robotics Corporation,* Case No. 1.22-cv-01483-UNA (D.Del.), Mar. 7, 2024, 84 pages (involving U.S. Pat. Nos. 9,308,648, 9,662,791, 11,123,869, 9,387,588, 11,073,842, 10,253,855, 11,131,368).
Exhibit E4, *Boston Dynamics, Inc.* v. *Ghost Robotics Corporation,* Case No. 1.22-cv-01483-UNA (D. Del.), Mar. 7, 2024, 93 pages (involving U.S. Pat. Nos. 9,308,648, 9,662,791, 11,123,869, 9,387,588, 11,073,842, 10,253,855, 11,131,368).
Request for Ex Parte Reexamination in U.S. Pat. No. 11,660,752 by Ghost Robotics Corporation, filed Dec. 31, 2023, 49 pages.
Declaration of Dr. Darwin Caldwell in Support of Ex Parte Reexamination in U.S. Pat. No. 11,660,752, filed Dec. 31, 2023, 27 pages.
Order Granting Request for Ex Parte Reexamination in U.S. Pat. No. 11,660,752 by Ghost Robotics Corporation, mailed Feb. 20, 2024, 18 pages.
U.S. Office Action in Ex Parte Reexamination of U.S. Pat. No. 11,660,752 by Ghost Robotics Corporation, mailed Jun. 18, 2024, 48 pages.
Dornhege et al., "Behavior maps for online planning of obstacle negotiation and climbing on rough terrain", 2007 IEEE/RSJ International Conference on Intelligent Robots and Systems, San Diego, CA, USA, 2007, pp. 3005-3011.
Gutmann et al., "A Modular Architecture for Humanoid Robot Navigation," 5th IEEE-RAS International Conference on Humanoid Robots, Tsukuba, Japan, 2005, pp. 26-31.
"Spot Autonomous Navigation", https://www.youtube.com/watch?v=Ve9kWX_KXus, May 10, 2018 (pp. 3, 5, 6, 11, 13, and 14 correspond to screenshots supplied by the USPTO during prosecution of U.S. Appl. No. 17/933,066).
International Preliminary Report on Patentability, PCT/US2021/022869, Oct. 25, 2022, 7 pages.

(56) References Cited

OTHER PUBLICATIONS

International Preliminary Report on Patentability, PCT/US2021/025302, Oct. 25, 2022, 10 pages.
International Preliminary Report on Patentability, PCT/US2022/022953, Oct. 25, 2022, 9 pages.
Office Action in European Application No. 19766387.5-1205, Dec. 20, 2022, 5 pages.
"The New Spot", https://www.youtube.com/watch?v=kgaO45SyaO4, Nov. 13, 2017.
"Hey Buddy, Can You Give Me a Hand?", https://www.youtube.com/watch?v=fUyU3IKzoio, Feb. 12, 2018.
"Introducing Spot (Previously SpotMini)", https://www.youtube.com/watch?v=tf7IEVTDjng, Jun. 23, 2016.
"Testing Robustness", https://www.youtube.com/watch?v=aFuA50H9uek, Feb. 20, 2018.
"SpotMini", The Wayback Machine, http://web.archive.org/web/20171118145237/https://bostondynamics.com/spot-mini, downloaded Jul. 31, 2023, 3 pages.
"Behold the Future", The Wayback Machine, http://web.archive.org/web/20161003004018/http://beholdthefuture.com/, downloaded Jul. 31, 2023, 3 pages.
Fu et al., "Gait Synthesis and Sensory Control of Stair Climbing for a Humanoid Robot," in IEEE Transactions on Industrial Electronics, May 2008, pp. 2111-2120 vol. 55, No. 5, doi: 10.1109/TI E.2008.921205. (Year: 2008).
Complaint filed Nov. 11, 2022, *Boston Dynamics, Inc.* v. *Ghost Robotics Corporation,* Case No. 1.22-cv-01483-UNA (D. Del.), 110 pages (involving U.S. Pat. Nos. 9,308,648, 9,662,791, 11,123,869, 9,387,588, 11,073,842, 10,253,855, 11,131,368).
Delmerico, et al., "Ascending Stairway Modeling from Dense Depth Imagery for Traversability Analysis," 2013 IEEE International Conference on Robotics and Automation, May 6, 2013, pp. 2283-2290, doi: 10.1109/ICRA.2013.6630886 (Year: 2013).
Gutmann et al., "Stair Climbing for humanoid robots using stereo vision," 2004 IEEE/RSJ International Conference on Intelligent Robots and Systems (IROS) (IEEE Cat. No. 04CH37566), Sep. 28, 2004, pp. 1407-1413 vol. 2, doi: 10.1109/IROS.2004.1389593. (Year: 2004).
"Honda's Asimo Robot buckling on the stairs", https://www.youtube.com/watch?v=VTIV0Y5yAww, Dec. 12, 2006.
Gutmann et al., "A Floor and Obstacle Height Map for 3D Navigation of a Humanoid Robot," Proceedings of the 2005 IEEE International Conference on Robotics and Automation, Apr. 2005, pp. 1066-1071, doi: 10.1109/ROBOT.2005.1570257. (Year: 2005).
Obringer, et al., "How Asimo Works", https://science.howstuffworks.com/asimo.htm#pt1, printed Jan. 3, 2023 in 20 pages.
Orsolino, et al., "Feasible Region: an Actuation-Aware Extension of the Support Region," IEEE Transactions on Robotics (TRO) 2020, Mar. 19, 2019, 19 pages, doi: 10.48550/arXiv.1903.07999 (Year: 2019).
Osswald, et al., "Autonomous Climbing of Spiral Staircases with Humanoids," 2011 IEEE/RSJ International Conference on Intelligent Robots and Systems (IROS), Sep. 25, 2011, pp. 4844-4849, doi: 10.1109/IROS.2011.6048209 (Year: 2011).
Osswald, et al., "From 3D Point Clouds to Climbing Stairs: A Comparison of Plane Segmentation Approaches for Humanoids," 11th IEEE RAS International Conference on Humanoid Robots (Humanoids), Oct. 26, 2011, pp. 93-98, doi: 10.1109/HUMANOIDS.2011.6100836 (Year: 2011).
Heydari et al., "Model predictive control for biped robots in climbing stairs," 2014 22nd Iranian Conference on Electrical Engineering (ICEE), May 2014, pp. 1209-1214, doi: 10.1109/IranianCEE.2014.6999719. (Year: 2014).
Ishikawa et al., "Bipedal walking control against swing foot collision using swing foot trajectory regeneration and impact mitigation ," Sep. 2017 IEEE/RSJ International Conference on Intelligent Robots and Systems (IROS), Sep. 2017, pp. 4531-4537, doi: 10.1109/IROS.2017.8206320. (Year: 2017).
International Search Report, PCT/US2019/047928, Jan. 3, 2020, 15 pages.
International Preliminary Report on Patentability, PCT/US2019/047928, Oct. 12, 2021, 7 pages.
International Search Report, PCT/US2021/025302, Aug. 11, 2021, 17 pages.
International Search Report, PCT/US2021/022953, Jul. 23, 2021, 15 pages.
International Search Report, PCT/US2021/022869, Jun. 14, 2021, 17 pages.
Tong et al., "Real-Time Map Building for Path Planning of a Humanoid Robot," 2009 Asia-Pacific Conference on Information Processing, 2009, pp. 211-214, doi: 10.1109/APCIP.2009.60 (Year: 2009).
Santos et al., "Step Modeling and Safe Path Planning for a Lower Limb Exoskeleton," 2019 19th International Conference on Advanced Robotics (ICAR), 2019, pp. 560-565, doi: 10.1109/ICAR46387.2019.8981644 (Year: 2019).
"Robust Rough-Terrain Locomotion with a Quadrupedal Robot (ANYmal)," video screen shots taken from https://www.youtube.com/watch?v=CpzQu25iLa0, Sep. 19, 2017, downloaded Nov. 6, 2023, 14 pages.
"Legged Robot ANYmal Climbing Stairs in Zurich," video screen shots taken from https://www.youtube.com/watch?v=vSveQrJLRTo, Jan. 17, 2018, downloaded Nov. 6, 2023, 6 pages.
"ANYmal climbing stairs at Oxford Robotics," video screen shots taken from https://www.youtube.com/watch?v=MrZIWzrGb_g, Jun. 28, 2018, downloaded Nov. 6, 2023, 8 pages.
Di Carlo et al., "Dynamic Locomotion in the MIT Cheetah 3 Through Convex Model-PredictiveControl," 2018 IEEE/RSJ International Conference on Intelligent Robots and Systems (IROS), Madrid, Spain, 2018, pp. 1-9, doi: 10.1109/IROS.2018.8594448.
"Dynamic Locomotion in the MIT Cheetah 3 Through Convex Model Predictive Control," video screen shots taken from https://www.youtube.com/watch?v=q6zxCvCxhic, Sep. 9, 2019, downloaded Nov. 6, 2023, 16 pages.
Fankhauser et al., "Robust Rough-Terrain Locomotion with a Quadrupedal Robot," 2018 IEEE International Conference on Robotics and Automation (ICRA), Brisbane, QLD, Australia, 2018, pp. 5761-5768, doi: 10.1109/ICRA.2018.8460731.
Gutmann et al., "Real-Time Path Planning for Humanoid Robot Navigation," IJCAI, 2005, pp. 1232-1237, https://www.ijcai.org/Proceedings/05/Papers/0974.pdf.
Hodgins et al., "Adjusting Step Length for Rough Terrain Locomotion," IEEE Transactions on Robotics and Automation, Jun. 1991, vol. 7, No. 3, pp. 289-298, doi: 10.1109/70.88138.
"Introducing Spot Classic (Previously Spot)", video screen shots taken from https://www.youtube.com/watch?v=M8YjvHYbZ9w, Feb. 9, 2015, downloaded Aug. 10, 2023, 14 pages.
Kolter et al., "Stereo Vision and Terrain Modeling for Quadruped Robots," 2009 IEEE International Conference on Robotics and Automation, Kobe, 2009, pp. 1557-1564, doi: 10.1109/ROBOT.2009.5152795.
Kolter et al., "The Stanford Little Dog: A Learning and Rapid Replanning Approach to Quadruped Locomotion," International Journal of Robotics Research (First published online Jan. 25, 2011), https://journals.sagepub.com/doi/10.1177/0278364910390537.
Michel et al., "GPU-Accelerated Real-Time 3D Tracking for Humanoid Locomotion and Stair Climbing," 2007 IEEE/RSJ International Conference on Intelligent Robots and Systems, San Diego, CA, USA, 2007, pp. 463-469, doi: 10.1109/IROS.2007.4399104.
Ren et al., "Toward Robust Stair Climbing of the Quadruped using Proprioceptive Sensing," Technical Report Carnegie Mellon University Robotics Institute Summer Scholars Working Papers Journal, vol. 6, Fall 2018, pp. 112-118, https://bibbase.org/network/publication/ren-johnson-towardrobuststairclimbingofthequadrupedusingproprioceptivesensing-2018.
Shih et al., "Ascending and Descending Stairs for a Biped Robot," IEEE Transactions on Systems, Man, and Cybernetics—Part A: Systems and Humans, May 1999, vol. 29, No. 3, pp. 255-268, doi: 10.1109/3468.759271.
Stoeter et al., "Autonomous Stair-Climbing with Miniature Jumping Robots," IEEE Transactions on Systems, Man, and Cybernetics, Part B (Cybernetics), Apr. 2005, vol. 35, No. 2, pp. 313-325, doi: 10.1109/TSMCB.2004.843270.

(56) References Cited

OTHER PUBLICATIONS

Answer in *Boston Dynamics, Inc.* v. *Ghost Robotics Corporation,* Case No. 1.22-cv-01483-UNA (D.Del.), Feb. 10, 2023, 28 pages (involving U.S. Pat. Nos. 9,308,648, 9,662,791, 11,123,869, 9,387,588, 11,073,842, 10,253,855, 11,131,368).
Amended Answer in *Boston Dynamics, Inc.* v. *Ghost Robotics Corporation,* Case No. 1.22-cv-01483-UNA (D. Del.), Mar. 3, 2023, 25 pages (involving U.S. Pat. Nos. 9,308,648, 9,662,791, 11,123,869, 9,387,588, 11,073,842, 10,253,855, 11,131,368).
Defendant Ghost Robotics Corporation's Initial Invalidity Contentions in *Boston Dynamics, Inc.* v. *Ghost Robotics Corporation,* Case No. 1.22-cv-01483-UNA (D. Del.), Sep. 19, 2023, 48 pages (involving U.S. Pat. Nos. 9,308,648, 9,662,791, 11,123,869, 9,387,588, 11,073,842, 10,253,855, 11,131,368).
Exhibit C1 (Redacted) in *Boston Dynamics, Inc.* v. *Ghost Robotics Corporation,* Case No. 1.22-cv-01483-UNA (D. Del.), Sep. 19, 2023, 42 pages (involving U.S. Pat. Nos. 9,308,648, 9,662,791, 11,123,869, 9,387,588, 11,073,842, 10,253,855, 11,131,368).
Exhibit C2 in *Boston Dynamics, Inc.* v. *Ghost Robotics Corporation,* Case No. 1.22-cv-01483-UNA (D. Del.), Sep. 19, 2023, 36 pages (involving U.S. Pat. Nos. 9,308,648, 9,662,791, 11,123,869, 9,387,588, 11,073,842, 10,253,855, 11,131,368).
Exhibit C3 in *Boston Dynamics, Inc.* v. *Ghost Robotics Corporation,* Case No. 1.22-cv-01483-UNA (D. Del.) Sep. 19, 2023, 42 pages (involving U.S. Pat. Nos. 9,308,648, 9,662,791, 11,123,869, 9,387,588, 11,073,842, 10,253,855, 11,131,368).
Exhibit E1 in *Boston Dynamics, Inc.* v. *Ghost Robotics Corporation,* Case No. 1.22-cv-01483-UNA (D.Del.), Sep. 19, 2023, 90 pages (involving U.S. Pat. Nos. 9,308,648, 9,662,791, 11,123,869, 9,387,588, 11,073,842, 10,253,855, 11,131,368).
Exhibit E2 in *Boston Dynamics, Inc.* v. *Ghost Robotics Corporation,* Case No. 1.22-cv-01483-UNA (D. Del.), Sep. 19, 2023, 80 pages (involving U.S. Pat. Nos. 9,308,648, 9,662,791, 11, 123,869, 9,387,588, 11,073,842, 10,253,855, 11,131,368).
Exhibit E3 in *Boston Dynamics, Inc.* v. *Ghost Robotics Corporation,* Case No. 1.22-cv-01483-UNA (D.Del.), Sep. 19, 2023, 75 pages (involving U.S. Pat. Nos. 9,308,648, 9,662,791, 11,123,869, 9,387,588, 11,073,842, 10,253,855, 11,131,368).
Second Amended Answer in *Boston Dynamics, Inc.* v. *Ghost Robotics Corporation,* Case No. 1.22-cv-01483-UNA (D. Del.), Oct. 18, 2023, 83 pages (involving U.S. Pat. Nos. 9,308,648, 9,662,791, 11,123,869, 9,387,588, 11,073,842, 10,253,855, 11,131,368).
U.S. Office Action in Ex Parte Reexamination of U.S. Pat. No. 11,660,752 by Ghost Robotics Corporation, mailed Sep. 27, 2024, 60 pages.
U.S. Office Action in Ex Parte Reexamination of U.S. Pat. No. 11,660,752 by Ghost Robotics Corporation, mailed Nov. 21, 2024, 12 pages.
U.S. Office Action in Ex Parte Reexamination of U.S. Pat. No. 11,660,752 by Ghost Robotics Corporation, mailed Dec. 19, 2024, 15 pages.
Notice of Intent to Issue Ex Parte Reexamination Certificate in Ex Parte Reexamination of U.S. Pat. No. 11,660,752 by Ghost Robotics Corporation, mailed Mar. 11, 2025, 5 pages.
Ex Parte Reexamination Certificate in Ex Parte Reexamination of U.S. Pat. No. 11,660,752 by Ghost Robotics Corporation, mailed Apr. 9, 2025, 2 pages.
European Office Action dated Jul. 9, 2025 in Application No. 21720650.7; 10 pages.
Asatani et al., "Real-Time Step Edge Estimation Using Stereo Images for Biped Robot", 2011 IEEE/RSJ International Conference on Intelligent Robots and Systems, Sep. 25-30, 2011, pp. 4463-4468.
Tong et al., "Real-Time Path Planning for Humanoid Robot", 2009 Third International Symposium on Intelligent Information Technology Application, 2009, pp. 692-695.
"Vision-free MIT Cheetah", YouTube, uploaded by Massachusetts Institute of Technology (MIT), video screen shots taken from https://www.youtube.com/watch?v=QZ1DaQgg3IE; Jul. 5, 2018, downloaded Nov. 26, 2024, 81 pages.

* cited by examiner 10
28
20, 20a-n
20, 20a-d
26, 26a
26b
26c
26d
22, 22a
22b
22c
22d
24, 24a
24b
24c
24d
d
h
P, 100
110
CM
Az
Ax
Ay
Fv
12
140
142
144
130, 132, 132a
130, 132, 130b
130, 132, 132c
130, 132, 132d
120, 120a, 120ST
120, 120b, 120SW
120, 120c
120, 120d
124, 124a
124, 124b
124, 124c
124, 124d

PERCEPTION AND FITTING FOR A STAIR TRACKER

CROSS REFERENCE TO RELATED APPLICATIONS

This U.S. patent application is a continuation of U.S. patent application Ser. No. 16/877,721 filed May 19, 2020, entitled "Perception and Fitting for a Stair Tracker," which claims priority under 35 U.S.C. § 119(e) to U.S. Provisional Application No. 63/013,677, filed on Apr. 22, 2020, entitled "Perception and Fitting for a Stair Tracker," each of which is hereby incorporated by reference in its entirety.

TECHNICAL FIELD

This disclosure relates to perception and fitting for a stair mode.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability of robots to traverse environments with obstacles or features requiring various means of coordinated leg movement provides additional benefits to such industries.

SUMMARY

One aspect of the disclosure provides method for perception and fitting for a stair tracker. The method includes receiving, at data processing hardware, sensor data for a robot adjacent to a staircase. For each stair of the staircase, the method includes detecting, by the data processing hardware at a first time step, an edge of a respective stair of the staircase based on the sensor data. For each stair of the staircase, the method also includes determining, by the data processing hardware, whether the detected edge is a most likely step edge candidate by comparing the detected edge from the first time step to an alternative detected edge at a second time step. The second time step occurs after the first time step. When the detected edge is the most likely step edge candidate, the method includes defining, by the data processing hardware, a height of the respective stair based on sensor data height about the detected edge. The method also includes generating, by the data processing hardware, a staircase model including stairs with respective edges at the respective defined heights.

Implementations of the disclosure may include one or more of the following optional features. In some implementations, for each stair of the staircase, the method includes estimating, by the data processing hardware at a third time step, a wall location at an end of the detected edge of the respective stair of the staircase based on the sensor data. In this implementation, the method also includes determining, by the data processing hardware, whether the estimated wall location is a most likely wall location candidate by comparing the estimated wall location from the third time step to an alternative wall location at a fourth time step, the fourth time step occurring after the third time step. When the estimated wall location is the most likely wall location candidate, the method further includes defining, by the data processing hardware, the estimated wall location as a respective wall location at an end of the respective stair, the respective wall location designating a boundary for the robot while traversing the staircase. Also in this implementation, generating the staircase model includes generating one or more walls at the respective defined wall location for each stair of the staircase. Here, the third time step for estimating the wall location may coincide with the first time step for detecting the edge of the respective stair of the staircase. In some examples, defining the height of the respective stair includes identifying points from a point cloud of the sensor data that exist about the detected edge and defining the height of the respective stair based on an average of heights of the identified points from the point cloud that exist about the detected edge.

In some configurations, detecting the edge of the respective stair of the staircase at the first time step includes identifying points from a point cloud of sensor data that occur within a target detection box, the target detection box located at a position relative to a previously identified stair of the staircase. Here, detecting, at the first time step, the edge of the respective stair of the staircase may include traversing, using a detection column, the identified points from the point cloud of sensor data that occur within the target detection box in an upwards direction towards the robot and at an angle with respect to a gravitational axis of the robot, the detection column traversing the target detection box based on columnar increments of the target detection box. While traversing the identified points within the target detection box using the detection column, the method may include determining that the detection column is an empty set. Here, the method my also include identifying one or more respective points of a most recent non-empty set for the detection column as one or more points along the edge of the respective stair of the staircase, the one or more respective points within a cell of the detection column, the cell having the greatest height within the detection column and most towards the robot. The method may further include generating an initial edge line from the one or more respective points identified using the detection column, removing outlier sensor data associated with the initial edge line, and generating a refined edge line from the one or more respective points of the initial edge line once the outlier sensor data is removed using the least squares fit. The initial edge line may be generated using a least squares fit.

In some implementations, when the respective step is a first step of the staircase closest to a support surface of the staircase, detecting the edge of the respective stair of the staircase at the first time step includes classifying points in a point cloud of the sensor data based on a height of a foot of the robot in contact with the support surface. In this implementation, the points are classified as ground points at a first height range with respect to the height of the foot of the robot and first step points at a second height range with respect to the height of the foot of the robot, the second height range greater than the first height range.

In some examples, the robot is initially located atop the staircase. Here, for a floor edge corresponding to a respective edge of a top stair of the staircase, the method may include classifying, by the data processing hardware, the sensor data into height classifications, each height classification corresponding to a height along an axis parallel to a gravitational axis of the robot and classifying the height of the sensor data relative to a floor beneath the robot, the floor including the floor edge. Further, for a floor edge corresponding to a respective edge of a top stair of the staircase, the method may include identifying, by the data processing hardware, a plurality of points along the floor edge based on a change in height classifications between portions of the sensor data, the change defined as either (i) a first transition from sensor data classified as a floor height to a portion of missing sensor data or (ii) a second transition from sensor data classified as a floor height to sensor data classified as below the floor height. For a floor edge corresponding to a respective edge of a top stair of the staircase, the method may also include generating, by the data processing hardware, a line fit to the plurality of points along the floor edge. Here, detecting the floor edge of the top stair of the staircase may detect the line fit to the plurality of points along the floor edge as the detected edge. The method may include associating, by the data processing hardware, a respective height classification with each pixel within a two-dimensional (2D) image space representing the classified sensor data. Here, identifying the plurality of points along the floor edge includes searching each pixel of the 2D image space for the change in height classifications. The method may include refining the line fit to the plurality of points along the floor edge by removing outlier points from the plurality of points.

Another aspect of the disclosure provides a robot. The robot includes a body and two or more legs coupled to the body and configured to traverse an environment. The robot also includes a stair modeling system in communication with the robot. The modeling system includes data processing hardware and memory hardware in communication with the data processing hardware. The memory hardware stores instructions that when executed on the data processing hardware cause the data processing hardware to perform operations. The operations include receiving sensor data for the robot adjacent to a staircase. For each stair of the staircase, the operations include detecting, at a first time step, an edge of a respective stair of the staircase based on the sensor data. For each stair of the staircase, the operations also include determining whether the detected edge is a most likely step edge candidate by comparing the detected edge from the first time step to an alternative detected edge at a second time step, the second time step occurring after the first time step. For each stair of the staircase, when the detected edge is the most likely step edge candidate, the operations include defining a height of the respective stair based on sensor data height about the detected edge. For each stair of the staircase, the operations further include generating a staircase model including stairs with respective edges at the respective defined heights.

This aspect may include one or more of the following optional features. In some configurations, for each stair of the staircase the operations include estimating, at a third time step, a wall location at an end of the detected edge of the respective stair of the staircase based on the sensor data and determining whether the estimated wall location is a most likely wall location candidate by comparing the estimated wall location from the third time step to an alternative wall location at a fourth time step, the fourth time step occurring after the third time step. In this configuration, when the estimated wall location is the most likely wall location candidate, the operations include defining the estimated wall location as a respective wall location at an end of the respective stair, the respective wall location designating a boundary for the robot while traversing the staircase. Further, in this configuration, generating the staircase model includes generating one or more walls at the respective defined wall location for each stair of the staircase. Here, the third time step for estimating the wall location may coincide with the first time step for detecting the edge of the respective stair of the staircase. In some examples, defining the height of the respective stair includes identifying points from a point cloud of the sensor data that exist about the detected edge and defining the height of the respective stair based on an average of heights of the identified points from the point cloud that exist about the detected edge.

In some implementations, detecting the edge of the respective stair of the staircase at the first time step includes identifying points from a point cloud of sensor data that occur within a target detection box, the target detection box located at a position relative to a previously identified stair of the staircase. Here, detecting, at the first time step, the edge of the respective stair of the staircase may include traversing, using a detection column, the identified points from the point cloud of sensor data that occur within the target detection box in an upwards direction towards the robot and at an angle with respect to a gravitational axis of the robot, the detection column traversing the target detection box based on columnar increments of the target detection box. While traversing the identified points within the target detection box using the detection column, the operations may include determining that the detection column is an empty set. Further, detecting, at the first time step, the edge of the respective stair of the staircase may include identifying one or more respective points of a most recent non-empty set for the detection column as one or more points along the edge of the respective stair of the staircase, the one or more respective points within a cell of the detection column, the cell having the greatest height within the detection column and most towards the robot. The operations may also include generating an initial edge line from the one or more respective points identified using the detection column, removing outlier sensor data associated with the initial edge line, and generating a refined edge line from the one or more respective points of the initial edge line once the outlier sensor data is removed using the least squares fit. The initial edge line may be generated using a least squares fit.

In some examples, when the respective step is a first step of the staircase closest to a support surface of the staircase, detecting the edge of the respective stair of the staircase at the first time step includes classifying points in a point cloud of the sensor data based on a height of a foot of the robot in contact with the support surface. In this examples, the points are classified as ground points at a first height range with respect to the height of the foot of the robot and first step points at a second height range with respect to the height of the foot of the robot, the second height range greater than the first height range.

In some configurations, the robot is initially located atop the staircase. Here, the operations may include, for a floor edge corresponding to a respective edge of a top stair of the staircase, classifying the sensor data into height classifications, each height classification corresponding to a height along an axis parallel to a gravitational axis of the robot and classifying the height of the sensor data relative to a floor beneath the robot, the floor including the floor edge. Here, the operations may also include identifying a plurality of points along the floor edge based on a change in height classifications between portions of the sensor data, the change defined as either (i) a first transition from sensor data classified as a floor height to a portion of missing sensor data or (ii) a second transition from sensor data classified as a floor height to sensor data classified as below the floor height, and generating a line fit to the plurality of points along the floor edge. Detecting the floor edge of the top stair of the staircase may detect the line fit to the plurality of points along the floor edge as the detected edge. Optionally, the operations may include associating a respective height classification with each pixel within a two-dimensional (2D) image space representing the classified sensor data and identifying the plurality of points along the floor edge may include searching each pixel of the 2D image space for the change in height classifications. The operations may include refining the line fit to the plurality of points along the floor edge by removing outlier points from the plurality of points.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As legged-robots maneuver about environments, the robots may encounter terrain (e.g., human-made structures) that requires precise leg movement and foot placement (i.e., distal end placement). To provide precise leg movement and foot placement, when systems of the robot recognize different types of terrain, the movement control systems of the robot may constrain the robot's movement to traverse the terrain in order to prevent mistakes, even small mistakes, which may lead to catastrophic issues for the robot. For example, when humans traverse stairs, this task requires a degree of coordination (e.g., eye-to-foot coordination). Without the coordination, a human may misstep, slip, trip, or fall on the stairs. Robots may encounter the same misfortunes, but lack natural coordination. Therefore, robots need systems and methods to coordinate precise leg movements.

Figure 1A:
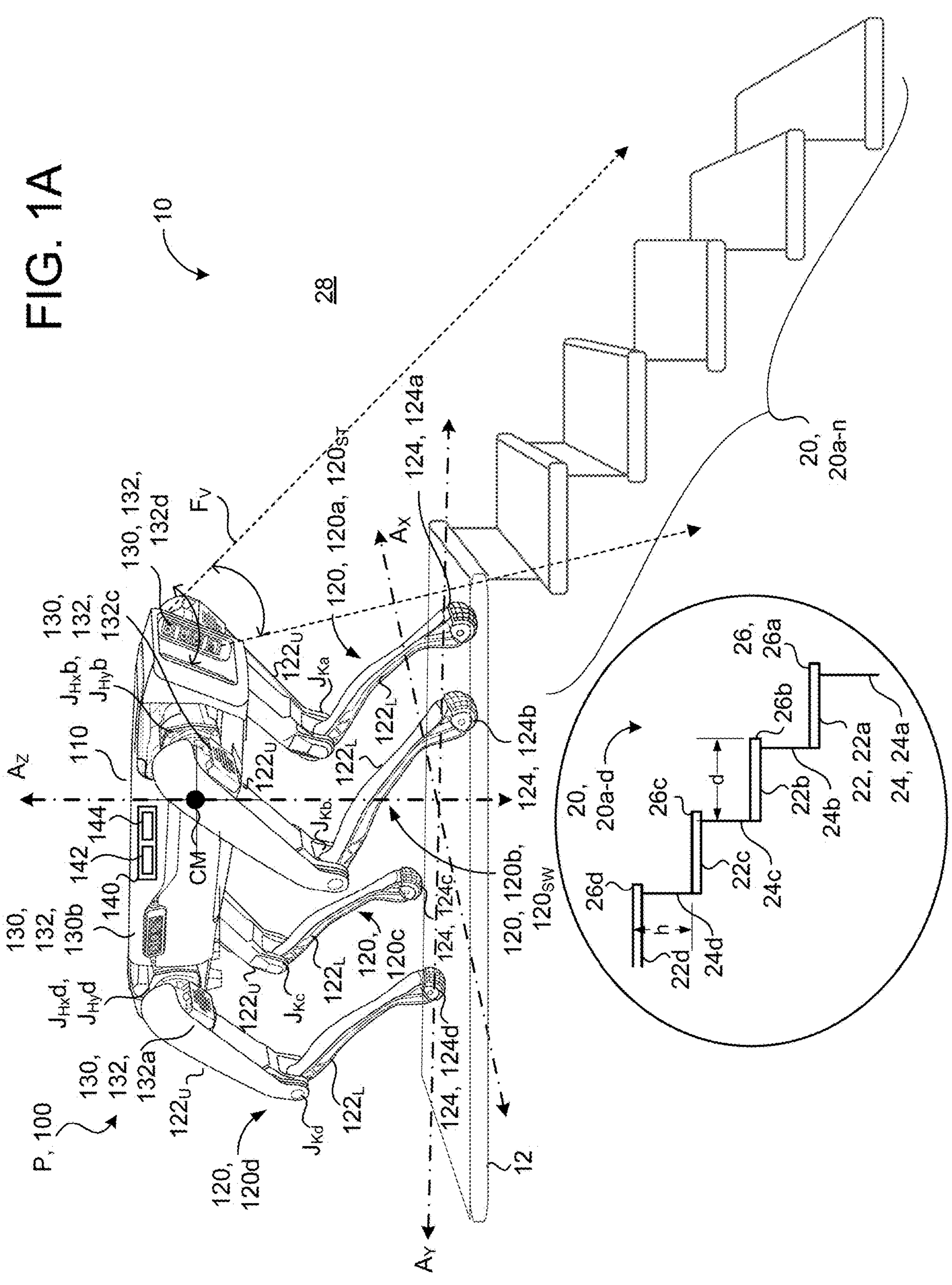
FIG. 1A is a perspective view of an example robot standing atop a landing of a staircase.
Figure 1B:
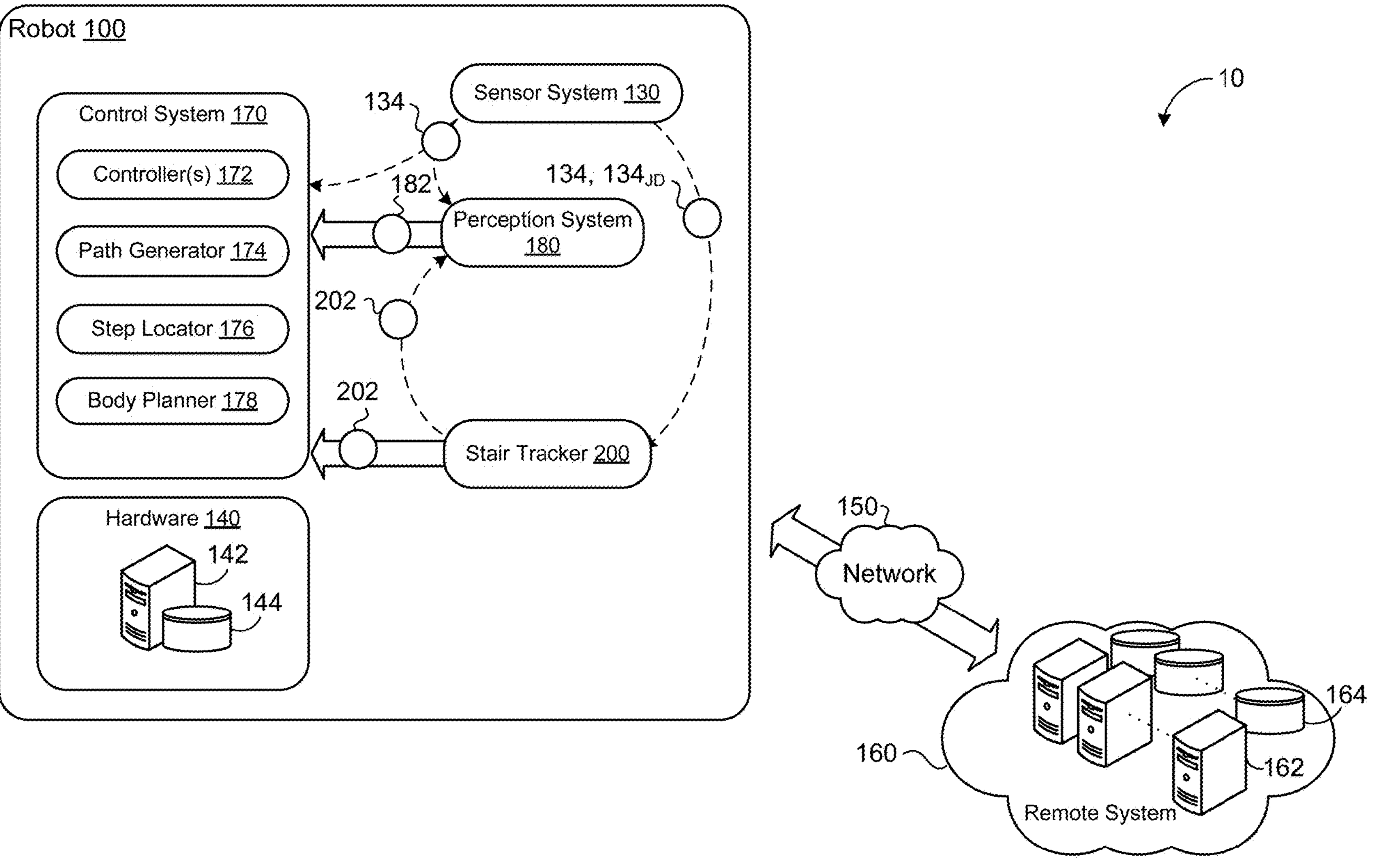
FIG. 1B is a schematic view of example systems of the robot of FIG. 1A.

FIG. 1A is an example of an environment 10 for a robot 100. The environment 10 generally refers to a spatial area associated with some type of terrain including stairs 20, 20*a-n* or stair-like terrain that may be traversed by the robot 100 (e.g., using a control system 170 as shown in FIG. 1B). Systems of the robot 100 are responsible for coordinating and/or moving the robot 100 about the environment 10. As the robot 100 traverses stairs 20 or stair-like terrain and moves about the environment 10, systems of the robot 100 may analyze the terrain, plan motion trajectories for the robot 100 (e.g., with a path generator 174, a step locator 176, a body planner 178), and/or instruct the robot 100 to perform various movements (e.g., with a controller 172). The robot 100 may use various systems of the robot 100 together to attempt to successfully traverse the environment 10 while avoiding collisions C and/or damage to the robot 100 or the robot's environment 10.

Stairs 20, 20*a-n* generally refer to a group of more than one stair 20 (i.e., a group of n stairs 20) designed to bridge a vertical distance. To bridge the vertical distance, stairs 20*a-n* typically run a horizontal distance with a given rise in vertical height over a pitch (or pitch line). Each stair 20 traditionally includes a tread 22 and a riser 24. The tread 22 of a stair 20 refers to a horizontal part of the stair 20 that is stepped on while a riser 24 refers to a vertical portion of the stair 20 between each tread 22. The tread 22 of each stair 20 spans a tread depth "d" measuring from an outer edge 26 of a stair 20 to the riser 24 between stairs 20. For a residential, a commercial, or an industrial structure, some stairs 20 also include nosing as part of the edge 26 for safety purposes. Nosing, as shown in FIG. 1A, is a part of the tread 22 that protrudes over a riser 24 beneath the tread 22. For example, the nosing (shown as edge 26*a*) is part of the tread 22*a* and protrudes over the riser 24*a*.

A set of stairs 20 may be preceded by or include a platform or support surface 12 (e.g., a level support surface). For example, a landing refers to a level platform or support surface 12 at a top of a set of stairs 20 or at a location between stairs 20. For instance, a landing occurs where a direction of the stairs 20 change or between a particular number of stairs 20 (i.e., a flight of stairs 20 that connects two floors). FIG. 1A illustrates the robot 100 standing on a landing at the top of a set of stairs 20. Furthermore, a set of stairs 20 may be constrained between one or more walls 28 and/or railings. In some examples, a wall 28 includes a toe board (e.g., baseboard-like structure or runner at ends of the treads 22) or a stringer. In the case of industrial stairs 20 that are not completely enclosed, industrial stairs 20 include a stringer that functions as a toe board (e.g., a metal stringer).

Stair-like terrain more generally refers to terrain that varies in height over some distance. Stair-like terrain may resemble stairs in terms of a change in elevation (e.g., an inclined pitch with a gain in elevation or a declined pitch with a loss in elevation). However, with stair-like terrain the delineation of treads 22 and risers 24 is not as obvious. Rather, stair-like terrain may refer to terrain with tread-like portions that allow a robot to have enough traction to plant a stance limb and sequentially or simultaneously use a leading limb to ascend or to descend over an adjacent vertical obstruction (resembling a riser) within the terrain. For example, stair-like terrain my include rubble, an inclined rock scramble, damaged or deteriorating traditional stairs, etc.

Referring to FIG. 1A, the robot 100 includes a body 110 with locomotion based structures such as legs 120*a-d* coupled to the body 110 that enable the robot 100 to move about the environment 10. In some examples, each leg 120 is an articulable structure such that one or more joints J permit members 122 of the leg 120 to move. For instance, each leg 120 includes a hip joint $J_H$ coupling an upper member 122, 122$_U$ of the leg 120 to the body 110 and a knee joint $J_K$ coupling the upper member 122$_U$ of the leg 120 to a lower member 122$_L$ of the leg 120. For impact detection, the hip joint $J_H$ may be further broken down into abductionadduction rotation of the hip joint $J_H$ designated as "$J_{Hx}$" for occurring in a frontal plane of the robot 100 (i.e., a X-Z plane extending in directions of a x-direction axis $A_x$ and the z-direction axis $A_Z$) and a flexion-extension rotation of the hip joint $J_H$ designated as "$J_{Hy}$," for occurring in a sagittal plane of the robot 100 (i.e., a Y-Z plane extending in directions of a y-direction axis $A_Y$ and the z-direction axis $A_Z$). Although FIG. 1A depicts a quadruped robot with four legs 120*a-d*, the robot 100 may include any number of legs or locomotive based structures (e.g., a biped or humanoid robot with two legs) that provide a means to traverse the terrain within the environment 10.

In order to traverse the terrain, each leg 120 has a distal end 124 that contacts a surface 12 of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint $J_A$ such that the distal end 124 is articulable with respect to the lower member $122_L$ of the leg 120.

The robot 100 has a vertical gravitational axis (e.g., shown as a Z-direction axis $A_Z$) along a direction of gravity, and a center of mass CM, which is a point where the weighted relative position of the distributed mass of the robot 100 sums to zero. The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height (i.e., vertical distance) generally refers to a distance along (e.g., parallel to) the z-direction (i.e., z-axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a support surface 12 where distal ends 124 of the legs 120 of the robot 100 may generate traction to help the robot 100 move about the environment 10. Another anatomical plane of the robot 100 is the frontal plane that extends across the body 110 of the robot 100 (e.g., from a left side of the robot 100 with a first leg 120*a* to a right side of the robot 100 with a second leg 120*b*). The frontal plane spans the X-Z plane by extending in directions of the x-direction axis $A_X$ and the z-direction axis $A_z$.

When a legged-robot moves about the environment 10, the legs 120 of the robot undergo a gait cycle. Generally, a gait cycle begins when a leg 120 touches down or contacts a support surface 12 and ends when that same leg 120 once again contacts the ground surface 12. Here, touchdown is also referred to as a footfall defining a point or position where the distal end 124 of a locomotion-based structure 120 falls into contact with the support surface 12. The gait cycle may predominantly be divided into two phases, a swing phase and a stance phase. During the swing phase, a leg 120 performs (i) lift-off from the support surface 12 (also sometimes referred to as toe-off and the transition between the stance phase and swing phase), (ii) flexion at a knee joint $J_K$ of the leg 120, (iii) extension of the knee joint $J_K$ of the leg 120, and (iv) touchdown (or footfall) back to the support surface 12. Here, a leg 120 in the swing phase is referred to as a swing leg $\mathbf{120}_{SW}$. As the swing leg $\mathbf{120}_{SW}$ proceeds through the movement of the swing phase, another leg 120 performs the stance phase. The stance phase refers to a period of time where a distal end 124 (e.g., a foot) of the leg 120 is on the support surface 12. During the stance phase a leg 120 performs (i) initial support surface contact which triggers a transition from the swing phase to the stance phase, (ii) loading response where the leg 120 dampens support surface contact, (iii) mid-stance support for when the contralateral leg (i.e., the swing leg $\mathbf{120}_{SW}$) lifts-off and swings to a balanced position (about halfway through the swing phase), and (iv) terminal-stance support from when the robot's COM is over the leg 120 until the contralateral leg 120 touches down to the support surface 12. Here, a leg 120 in the stance phase is referred to as a stance leg $\mathbf{120}_{ST}$.

In order to maneuver about the environment 10, the robot 100 includes a sensor system 130 with one or more sensors 132, 132*a-n* (e.g., shown as a first sensor 132, 132*a* and a second sensor 132, 132*b*). The sensors 132 may include vision/image sensors, inertial sensors (e.g., an inertial measurement unit (IMU)), force sensors, and/or kinematic sensors. Some examples of sensors 132 include a camera such as a stereo camera, a scanning light-detection and ranging (LIDAR) sensor, or a scanning laser-detection and ranging (LADAR) sensor. In some configurations, the robot 100 includes two stereo cameras as sensors 132 at a front end of the body 110 of the robot 100 (i.e., a head of the robot 100 adjacent the front legs 120*a-b* of the robot 100) and one stereo camera as a sensor 132 at a back end of the body 110 of the robot 100 adjacent rear legs 120*c-d* of the robot 100. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

Referring to FIGS. 1A and 1B, in some implementations, the sensor system 130 includes sensor(s) 132 coupled to a joint J. In some examples, these sensors 132 couple to a motor that operates a joint J of the robot 100 (e.g., sensors 132, 132*a-b*). Here, these sensors 132 generate joint dynamics 134, $\mathbf{134}_{JD}$ in the form of joint-based sensor data 134. Joint dynamics $\mathbf{134}_{JD}$ collected as joint-based sensor data 134 may include joint angles (e.g., an upper member $\mathbf{122}_U$ relative to a lower member $\mathbf{122}_L$), joint speed (e.g., joint angular velocity or joint angular acceleration), and/or joint torques experienced at a joint J (also referred to as joint forces). Here, joint-based sensor data 134 generated by one or more sensors 132 may be raw sensor data, data that is further processed to form different types of joint dynamics $\mathbf{134}_{JD}$, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

When surveying a field of view $F_V$ with a sensor 132, the sensor system 130 generates sensor data 134 (also referred to as image data) corresponding to the field of view $F_V$. In some examples, the sensor data 134 is image data that corresponds to a three-dimensional volumetric point cloud generated by a three-dimensional volumetric image sensor 132. Additionally or alternatively, when the robot 100 is maneuvering about the environment 10, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 of the robot 100. With the sensor data 134, a perception system 180 of the robot 100 may generate maps 182 for the terrain about the environment 10.

While the robot 100 maneuvers about the environment 10, the sensor system 130 gathers sensor data 134 relating to the terrain of the environment 10 and/or structure of the robot 100 (e.g., joint dynamics and/or odometry of the robot 100). For instance, FIG. 1A depicts the robot 100 standing on a landing (i.e., level support surface) of a set of stairs 20 as the environment 10 of the robot 100. Here, the sensor system 130 gathering sensor data 134 about the set of stairs 20. As the sensor system 130 gathers sensor data 134, hardware including a computing system 140 is configured to store, to process, and/or to communicate the sensor data 134 to various systems of the robot 100 (e.g., the control system 170, the perception system 180, a stair tracker 200, and/or a stair supervisor 300). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

With continued reference to FIGS. 1A and 1B, in some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 may communicate via a network 150 with a remote system 160 (e.g., a remote computer/server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In some examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1B, the robot 100 includes a control system 170 and a perception system 180. The perception system 180 is configured to receive the sensor data 134 from the sensor system 130 and process the sensor data 134 to generate maps 182. With the maps 182 generated by the perception system 180, the perception system 180 may communicate the maps 182 to the control system 170 in order to perform controlled actions for the robot 100, such as moving the robot 100 about the environment 10. In some examples, by having the perception system 180 separate from, yet in communication with the control system 170, processing for the control system 170 may focus on controlling the robot 100 while the processing for the perception system 180 focuses on interpreting the sensor data 134 gathered by the sensor system 130. For instance, these systems 170, 180 execute their processing in parallel to ensure accurate, fluid movement of the robot 100 in an environment 10.

In some examples, the control system 170 includes at least one controller 172, a path generator 174, a step locator 176, and a body planner 178. The control system 170 may be configured to communicate with at least one sensor system 130 and any other system of the robot 100 (e.g., the perception system 180, a stair tracker 200, and/or a stair supervisor 300). The control system 170 performs operations and other functions using hardware 140. The controller 172 is configured to control movement of the robot 100 to traverse about the environment 10 based on input or feedback from the systems of the robot 100 (e.g., the control system 170, the perception system 180, a stair tracker 200, and/or a stair supervisor 300). This may include movement between poses and/or behaviors of the robot 100. For example, the controller 172 controls different footstep patterns, leg patterns, body movement patterns, or vision system sensing patterns.

In some examples, the controller 172 includes a plurality of controllers 172 where each of the controllers 172 has a fixed cadence. A fixed cadence refers to a fixed timing for a step or swing phase of a leg 120. For example, the controller 172 instructs the robot 100 to move the legs 120 (e.g., take a step) at a particular frequency (e.g., step every 250 milliseconds, 350 milliseconds, etc.). With a plurality of controllers 172 where each controller 172 has a fixed cadence, the robot 100 can experience variable timing by switching between controllers 172. In some implementations, the robot 100 continuously switches/selects fixed cadence controllers 172 (e.g., re-selects a controller 170 every three milliseconds) as the robot 100 traverses the environment 10.

In some implementations, the control system 170 includes specialty controllers 172 that are dedicated to a particular control purpose. For example, the control system 170 may include one or more stair controllers 172 dedicated to planning and coordinating the robot's movement to traverse a set of stairs 20. For instance, a stair controller 172 may ensure the footpath for a swing leg $\mathbf{120}_{SW}$ maintains a swing height to clear a riser 24 and/or edge 26 of a stair 20. Other specialty controllers 172 may include the path generator 174, the step locator 176, and/or the body planner 178. Referring to FIG. 1B, the path generator 174 is configured to determine horizontal motion for the robot 100. For instance, the horizontal motion refers to translation (i.e., movement in the X-Y plane) and/or yaw (i.e., rotation about the Z-direction axis $A_Z$) of the robot 100. The path generator 174 determines obstacles within the environment 10 about the robot 100 based on the sensor data 134. The path generator 174 communicates the obstacles to the step locator 176 such that the step locator 176 may identify foot placements for legs 120 of the robot 100 (e.g., locations to place the distal ends 124 of the legs 120 of the robot 100). The step locator 176 generates the foot placements (i.e., locations where the robot 100 should step) using inputs from the perceptions system 180 (e.g., map(s) 182). The body planner 178, much like the step locator 176, receives inputs from the perceptions system 180 (e.g., map(s) 182). Generally speaking, the body planner 178 is configured to adjust dynamics of the body 110 of the robot 100 (e.g., rotation, such as pitch or yaw and/or height of COM) to successfully move about the environment 10.

The perception system 180 is a system of the robot 100 that helps the robot 100 to move more precisely in a terrain with various obstacles. As the sensors 132 collect sensor data 134 for the space about the robot 100 (i.e., the robot's environment 10), the perception system 180 uses the sensor data 134 to form one or more maps 182 for the environment 10. Once the perception system 180 generates a map 182, the perception system 180 is also configured to add information to the map 182 (e.g., by projecting sensor data 134 on a preexisting map) and/or to remove information from the map 182.

In some examples, the one or more maps 182 generated by the perception system 180 are a ground height map 182, 182*a,* a no step map 182, 182*b,* and a body obstacle map 182, 182*c*. The ground height map 182*a* refers to a map 182 generated by the perception system 180 based on voxels from a voxel map. In some implementations, the ground height map 182*a* functions such that, at each X-Y location within a grid of the map 182 (e.g., designated as a cell of the ground height map 182*a*), the ground height map 182*a* specifies a height. In other words, the ground height map 182*a* conveys that, at a particular X-Y location in a horizontal plane, the robot 100 should step at a certain height.

The no step map 182*b* generally refers to a map 182 that defines regions where the robot 100 is not allowed to step in order to advise the robot 100 when the robot 100 may step at a particular horizontal location (i.e., location in the X-Y plane). In some examples, much like the body obstacle map 182*c* and the ground height map 182*a,* the no step map 182*b* is partitioned into a grid of cells where each cell represents a particular area in the environment 10 about the robot 100. For instance, each cell is a three centimeter square. For ease of explanation, each cell exists within an X-Y plane within the environment 10. When the perception system 180 generates the no-step map 182*b*, the perception system 180 may generate a Boolean value map where the Boolean value map identifies no step regions and step regions. A no step region refers to a region of one or more cells where an obstacle exists while a step region refers to a region of one or more cells where an obstacle is not perceived to exist. The perception system 180 further processes the Boolean value map such that the no step map 182*b* includes a signed-distance field. Here, the signed-distance field for the no step map 182*b* includes a distance to a boundary of an obstacle (e.g., a distance to a boundary of the no step region 244) and a vector v (e.g., defining nearest direction to the boundary of the no step region 244) to the boundary of an obstacle.

The body obstacle map 182*c* generally determines whether the body 110 of the robot 100 may overlap a location in the X-Y plane with respect to the robot 100. In other words, the body obstacle map 182*c* identifies obstacles for the robot 100 to indicate whether the robot 100, by overlapping at a location in the environment 10, risks collision or potential damage with obstacles near or at the same location. As a map of obstacles for the body 110 of the robot 100, systems of the robot 100 (e.g., the control system 170) may use the body obstacle map 182*c* to identify boundaries adjacent, or nearest to, the robot 100 as well as to identify directions (e.g., an optimal direction) to move the robot 100 in order to avoid an obstacle. In some examples, much like other maps 182, the perception system 182 generates the body obstacle map 182*c* according to a grid of cells (e.g., a grid of the X-Y plane). Here, each cell within the body obstacle map 182*c* includes a distance from an obstacle and a vector pointing to the closest cell that is an obstacle (i.e., a boundary of the obstacle).

Since the robot 100 navigates about an environment 10 based on some interpretation of sensor data 134 captured by one or more sensors 132 about the robot 100, situations arise where certain types of structures within the environment 10 may routinely result in poor sensor data 134. Unfortunately, even when poor sensor data 134 exists, the robot 100 may still attempt to navigate and/or to perform tasks within the environment 10. One type of structure that often leads to poor sensor data 134 is stairs 20. This is particularly problematic because stairs 20 are a fairly common structural feature both commercially and residentially. Furthermore, poor sensor data 134 for stair navigation may be catastrophic because stairs also generally demand precise leg movement and foot placement. Since stairs may be a difficult feature to navigate from a coordination perspective, poor sensor data 134 may significantly compound the navigational challenges.

A sensor 132 may produce poor sensor data 134 for a variety of reasons, but stairs 20 are actually a structure that is more susceptible to sensor data issues. With regard to stairs 20, two separate problems may commonly occur. One problem generally pertains to stair ascent while the other problem pertains to stair descent. For stair ascent, open riser stairs 20 pose issues for the robot 100. With open riser stairs 20, the sensor(s) 132 of the robot 100 may be at a sensing height equal to a height of one or more stairs 20. At this height, the sensor 132 generates far sensor data 134 through the open riser 24 and near sensor data 134 for an edge 26 of a stair 20. In other words, when the sensor 132 cannot see the riser 24, the edge 26 for the treads 22 of the stairs 20 may appear to the robot 100 as floating rungs and may be falsely identified as an obstacle of the robot 100 by the robot's perception system 180. When a robot 100 is about to descend or descending a set of stairs 20, a sensor 132, such as a stereo camera, may produce poor sensor data 134 due to the repetitive structure and lines that define a staircase. For example, stereo cameras specifically function by trying to find a portion of two different images that are the same object in the real world and use parallax to determine a distance for that object. Yet based on the repeating lines of a staircase when viewing it from top to bottom, sensors 132 are more likely to mismatch the same object and thus generate poor sensor data 134. This is particularly common for industrial or grated staircases because the grating introduces more repeating lines that the sensor 132 is capable of mismatching. Although not all staircases are grated, this presents a problem to the navigation of the robot 100 because robots 100 may often be deployed in industrial environments 10. Though these scenarios do not occur for every type of staircase, a robot 100 that struggles to ascend one type of staircase and to descend another may limit the robot's versatility and robustness.

Figure 2A:
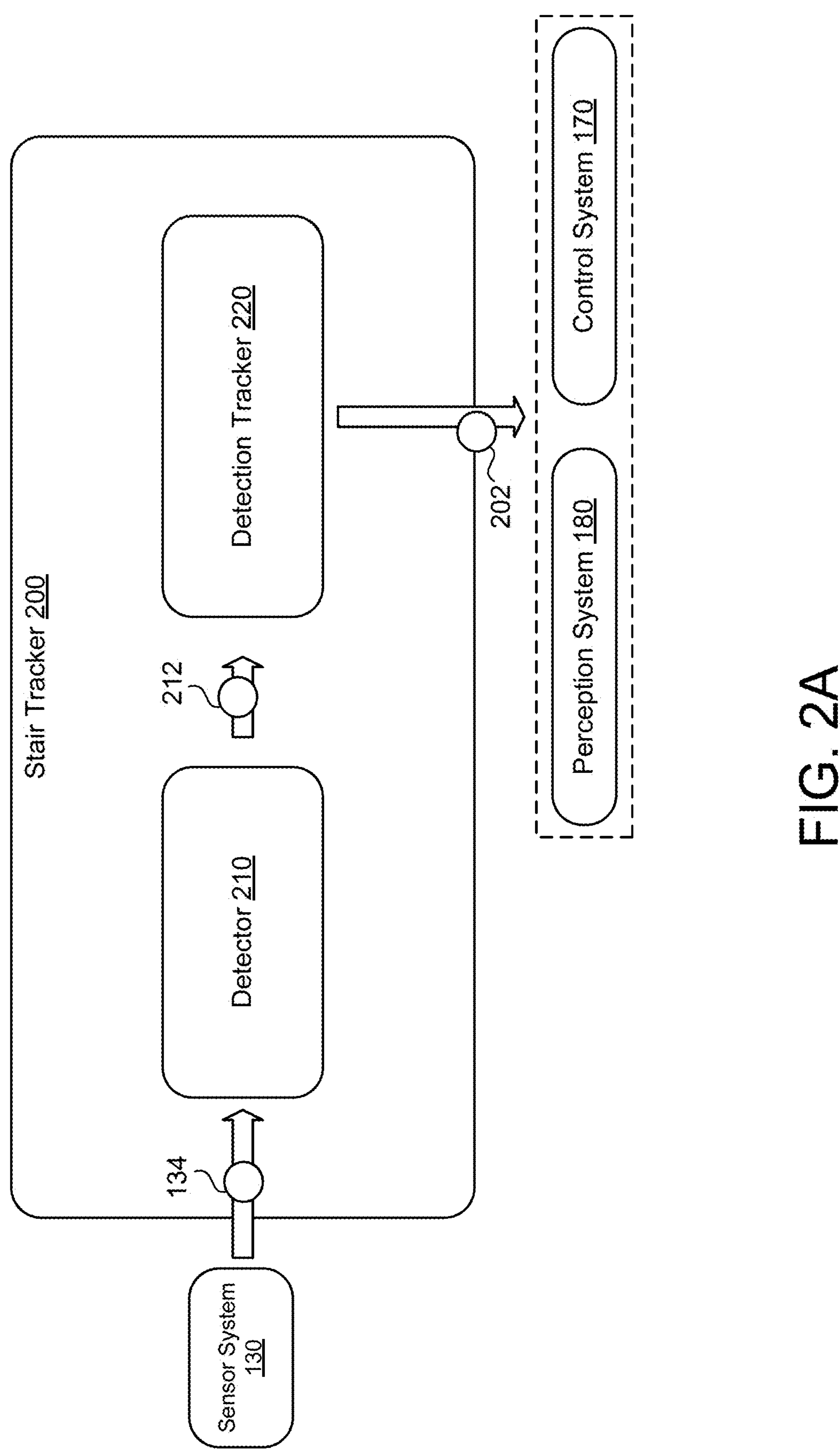
FIGS. 2A and 2B are schematic views of example stair trackers for the robot of FIG. 1A.
Figure 2B:
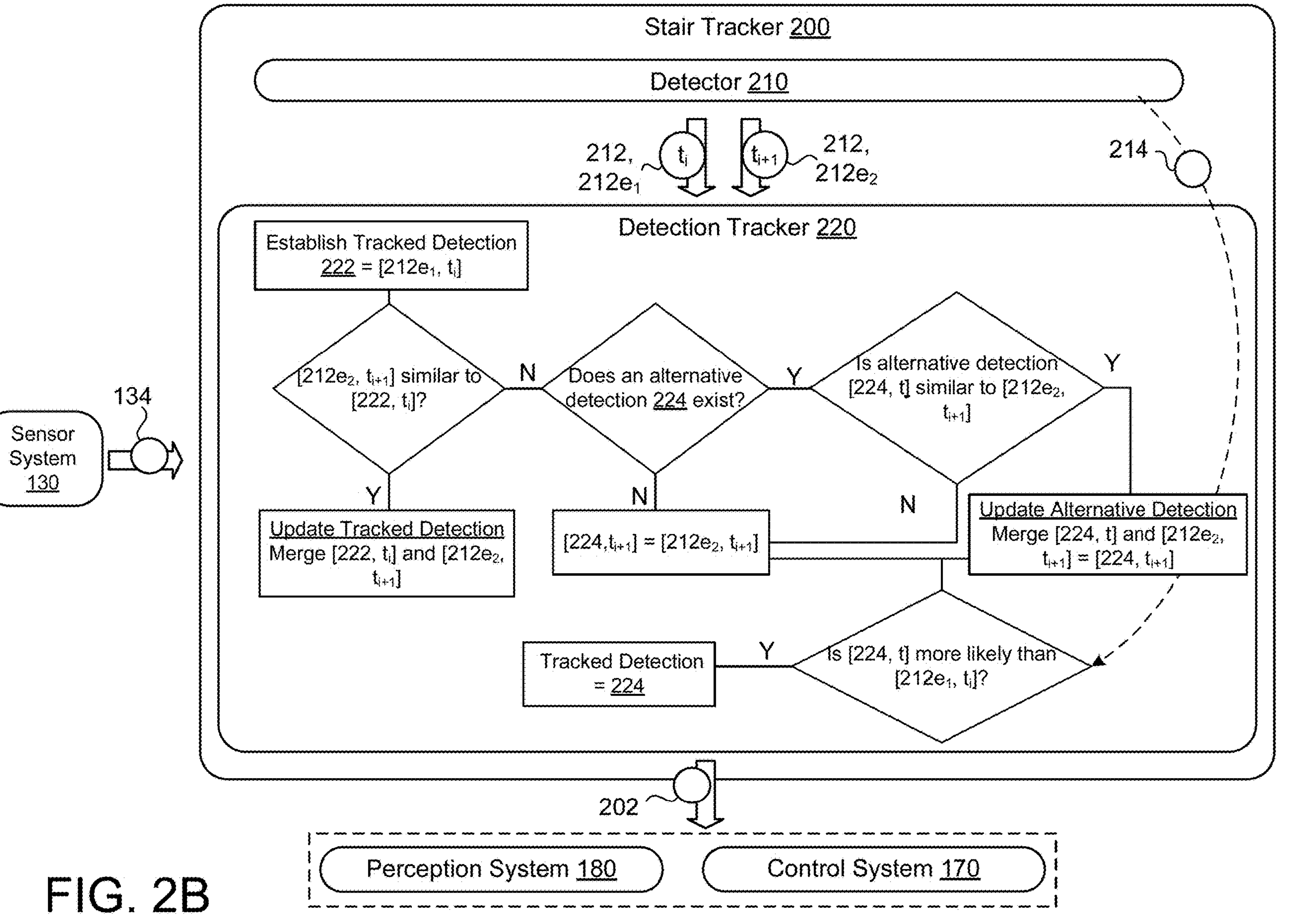
Figure 2C:
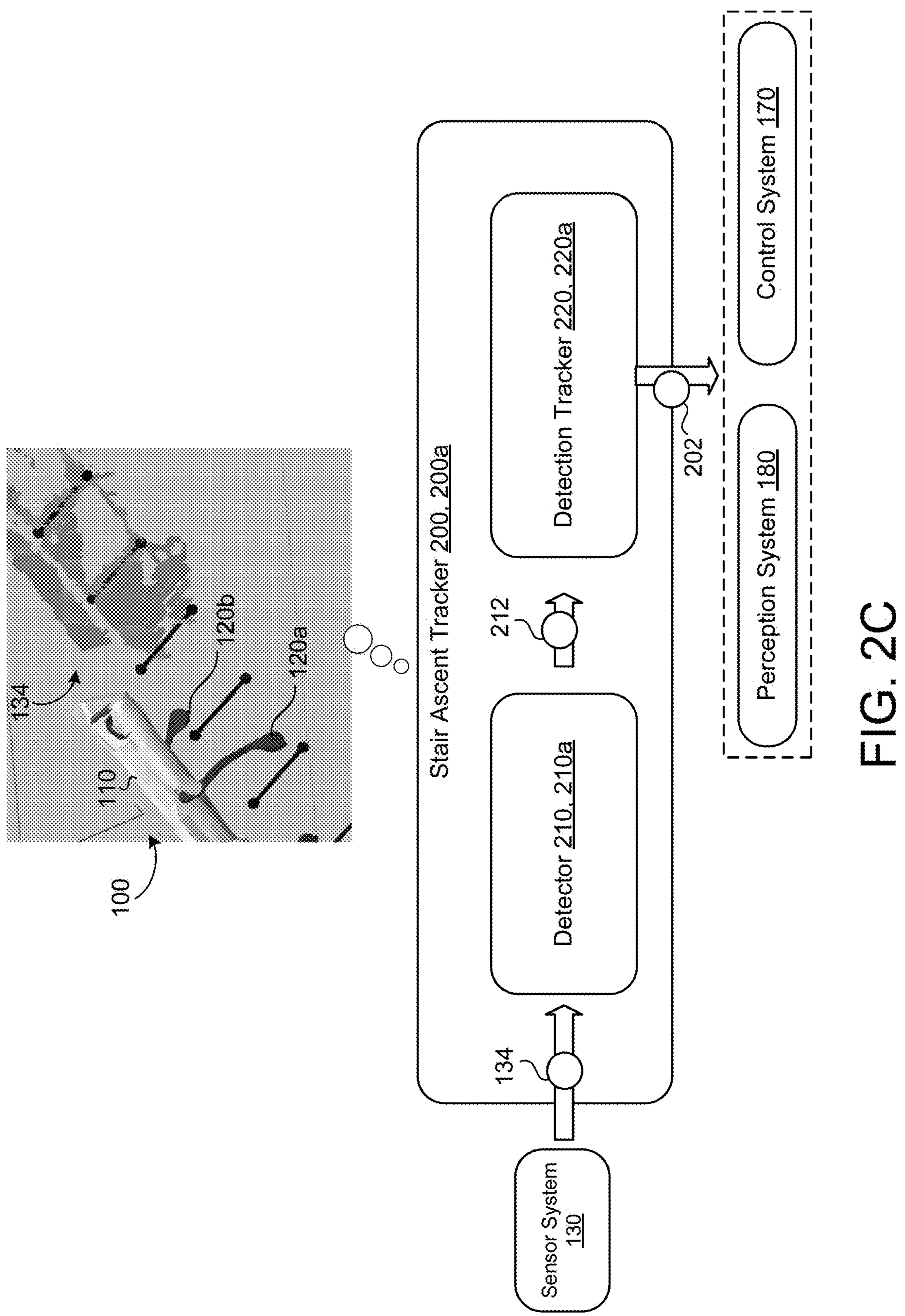
FIGS. 2C-2I are schematic views of example stair ascent trackers for the robot of FIG. 1A.

To attempt to address some of these sensor data issues, the robot 100 uses a system called stair tracker 200 for detecting and tracking features for stairs 20. Stair tracker 200 allows the robot 100 to understand ambiguous data by having a lower dimensional model. Referring to FIGS. 2A and 2B, in some implementations, the stair tracker 200 is configured to receive sensor data 134 and output a stair model 202. The model 202 may include some form of a floor height and a series of stairs 20. Here, a stair 20 is a line segment with a direction, a location, and an extent in either direction. The model 202 may generally assume the stairs 20 are horizontally constrained and include a minimum/maximum rise and a minimum/maximum run. Alternatively, the slope may be constrained to a minimum/maximum value.

To generate the model 202, the stair tracker 200 includes a detector 210 and a detection tracker 220. The detector 210 of the stair tracker 200 receives the sensor data 134 from the sensor system 130 and generates a detected feature 212. This detected feature 212 may correspond to different structural features of the stairs 20 such as edges 26, treads 22, risers 26, walls 28, and/or some combination thereof. As the robot 100 approaches a set of stairs 20, the detector 210 functions to determine a detected feature 212 (e.g., shown in FIG. 2B as a detected edge 212, 212*e*) corresponding to a feature of the stairs 20 (e.g., an edge 26 of a first stair 20). The detector 210 generates the detected feature 212 at a particular time $t_i$. Once the detector 210 determines the detected feature 212 at the particular time $t_i$, the detection tracker 220 monitors that this detected feature 212*e* remains the best representation of the actual feature for the stairs 20 during future time steps $t_{i+1}$. In other words, the stair tracker 200 is receiving sensor data 134 at a particular frequency as the sensor system 130 captures the sensor data 134. The detector 210 determines the detected feature 212 at a first time step $t_1$ based on both sensor data 134 from the first time step $t_1$ and aggregate sensor data 134 from prior time steps $t_{i-1}$. The detector 210 communicates the detected feature 212 to the detection tracker 220 and the detection tracker 220 establishes the detected feature 212 as a tracked detection 222 (also referred to as a primary detection) or initial detection when no primary detection exists at the detection tracker 220. In other words, when the detection tracker 220 is not tracking the stair feature corresponding to the detected feature 212 received from the detector 210, the detection tracker 212 initializes a tracking process for this stair feature using the detected feature 212 at the first time step $t_1$. For instance, FIG. 2B illustrates the detection tracker 220 identifying the first detected feature 212, 212*e*$_1$ for an edge 26 of a stair 20 at the first time step $t_1$ as the tracked detection 222. At a second time step $t_2$ subsequent to the first time step $t_1$, the stair tracker 200 receives sensor data 134 generated at the second time step $t_2$ and/or during a time period between the first time step $t_1$ and the second time step $t_2$as the most recent sensor data 134. Using the most recent sensor data 134, the detector 210 generates another detected feature 212 at a later time $t_{i+1}$. For example, the detector 210 generates a second detected feature 212, 212*e*$_2$ for the edge 26 of the stair 20 at the second time step $t_2$.

To perform its tracking process, when the detection tracker 220 receives the second detected feature 212, 212$_2$ the detection tracker 220 determines whether the second detected feature 212$_2$ received at the second time step $t_2$ is similar to the first detected feature 212$_1$ from the first time step $t_1$ (now the tracked detection 222). When the first and the second detected features 212 are similar, the detection tracker 220 merges the first and the second detected features 212 together to update the tracked detection 222. Here, during a merging operation, the detection tracker 220 may merge detected features 212 together with the tracked detection 222 using averaging (e.g., a weighted average weighted by a confidence error in the detected feature 212). When the second detected feature 212$_2$ is not similar to the first detected feature 212$_1$ the detection tracker 220 determines whether an alternative tracked feature 224 exists for the stair feature corresponding to the second detected feature 212$_2$ (i.e., has the detection tracker 220 previously identified at detected feature 212 as an alternative tracked feature 224). When an alternative tracked feature 224 does not exist, the detection tracker 220 establishes the second detected feature 212$_2$ at the second time step $t_2$ to be the alternative tracked feature 224. When an alternative tracked feature 224 already exists, the detection tracker 220 determines whether the second detected feature 212$_2$ at the second time step $t_2$ is similar to the existing alternative tracked feature 224. When the second detected feature 212$_2$ at the second time step $t_2$ is similar to the existing alternative tracked feature 224, the detection tracker 220 merges the second detected feature 212$_2$ at the second time step $t_2$ with the existing alternative tracked feature 224 (e.g., using averaging or weighted averaging). When the second detected feature 212$_2$ at the second time step $t_2$ is not similar to the existing alternative tracked feature 224, the detection tracker 200 may generate another alternative tracked feature 224 equal to the second detected feature 212$_2$ at the second time step $t_2$. In some examples, the detection tracker 220 is configured to track and/or store multiple alternative detections 224.

By using the tracking process of the detection tracker 220 in conjunction with the detector 210, the stair tracker 200 may vet each detection to prevent the stair tracker 200 from detrimentally relying on a detection. In other words, with the robot 100 constantly gathering sensor data 134 about itself (e.g., at a frequency of 15 Hz), a reliance on a single detection from a snapshot of sensor data 134 may cause inaccuracy as to the actual location of features of the stairs 20. For example, a robot 100 may move or change its pose P between a first time and a second time generating sensor data 134 for areas of the stairs 20 that were previously occluded, partially occluded, or poorly captured in general. Here, a system that only performed a single detection at the first time may suffer from incomplete sensor data 134 and inaccurately detect a feature. In contrast, by constantly tracking each detection based on the most recent sensor data 134 available to the stair tracker 200 over a period of time, the stair tracker 200 generates a bimodal probability distribution for a detected stair feature (e.g., a primary detection and an alternative detection). With a bimodal probability distribution for a feature of a stair 20, the stair tracker 200 is able to generate an accurate representation for the feature of the stair 20 to include in the stair model 202. Furthermore, this detection and tracking process tolerates a detection at any particular instance in time that corresponds to arbitrary poor sensor data 134 because that detection is tracked and averaged over time with other detections (e.g., presumably detections based on better data or based on a greater aggregate of data over multiple detections). Therefore, although a single detection may appear noisy at any moment in time, the merging and alternative swapping operations of the detection tracker 220 develop an accurate representation of stair features over time.

These stair features may then be incorporated into the stair model 202 that the stair tracker 200 generates and communicates to various systems of the robot 100 (e.g., systems that control the robot 100 to traverse the stairs 20). In some configurations, the stair tracker 200 incorporates a tracked feature 222 into the stair model 202 once the tracked feature 222 has been detected by the detector 210 and tracked by the detection tracker 220 for some number of iterations. For example, when the detection tracker 220 has tracked the same feature for three to five detection/tracking cycles, the stair tracker 200 incorporates the tracked detection 222 (i.e., a detection that has been updated for multiple detection cycles) for this feature into the stair model 202. Stated differently, the stair detector 200 determines that the tracked detection 222 has matured over the detection and tracking process into a most likely candidate for a feature for the stairs 20.

When a sensor 132 peers down a set of stairs 20, this descending vantage point for a sensor 132 produces a different quality of sensor data 134 than a sensor 132 peering up a set of stairs 20. For example, peering up a set of stairs 20 has a vantage point occluding the treads 22 of stairs 20 and some of the riser 26 while peering down the set of stairs 20 has a vantage point that occludes the risers 26 and a portion of the treads 22. Due to these differences among other reasons, the stair tracker 200 may have separate functionality dedicated to stair ascent (e.g., a stair ascent tracker 200*a*) and stair descent (e.g., a stair descent tracker 200*b*). For example, each stair tracker 200*a-b* may be part of the stair tracker 200, but separate software modules. In some configurations, each stair tracker 200*a-b*, though a separate model, may coordinate with each other. For instance, the stair ascent tracker 200*a* passes information to the stair descent tracker 200*b* (or vice versa) when the robot 100 changes directions during stair navigation (e.g., on the stairs 20).

Referring to FIGS. 2C-2I, the stair ascent tracker 200*a* includes a detector 210, 210*a* and a detection tracker 220, 220*a*. Here, the detector 210*a* and the detection tracker 220*a* have functionality as previously described such that the detector 210*a* is configured to detect a feature of one or more stairs 20 (e.g., an edge 26 or a wall 28) and the detection tracker 220*a* is configured to track the detected feature 212 to ensure that the detected feature 212 remains an accurate representation of the actual feature of the stair 20 based on the modeling techniques of the stair ascent tracker 200 and current sensor data 134 captured by the robot 100. Yet in some examples, the detector 210*a* and the detection tracker 220*a* also include additional or alternative operations specific to ascending a set of stairs 20.

Figure 2D:
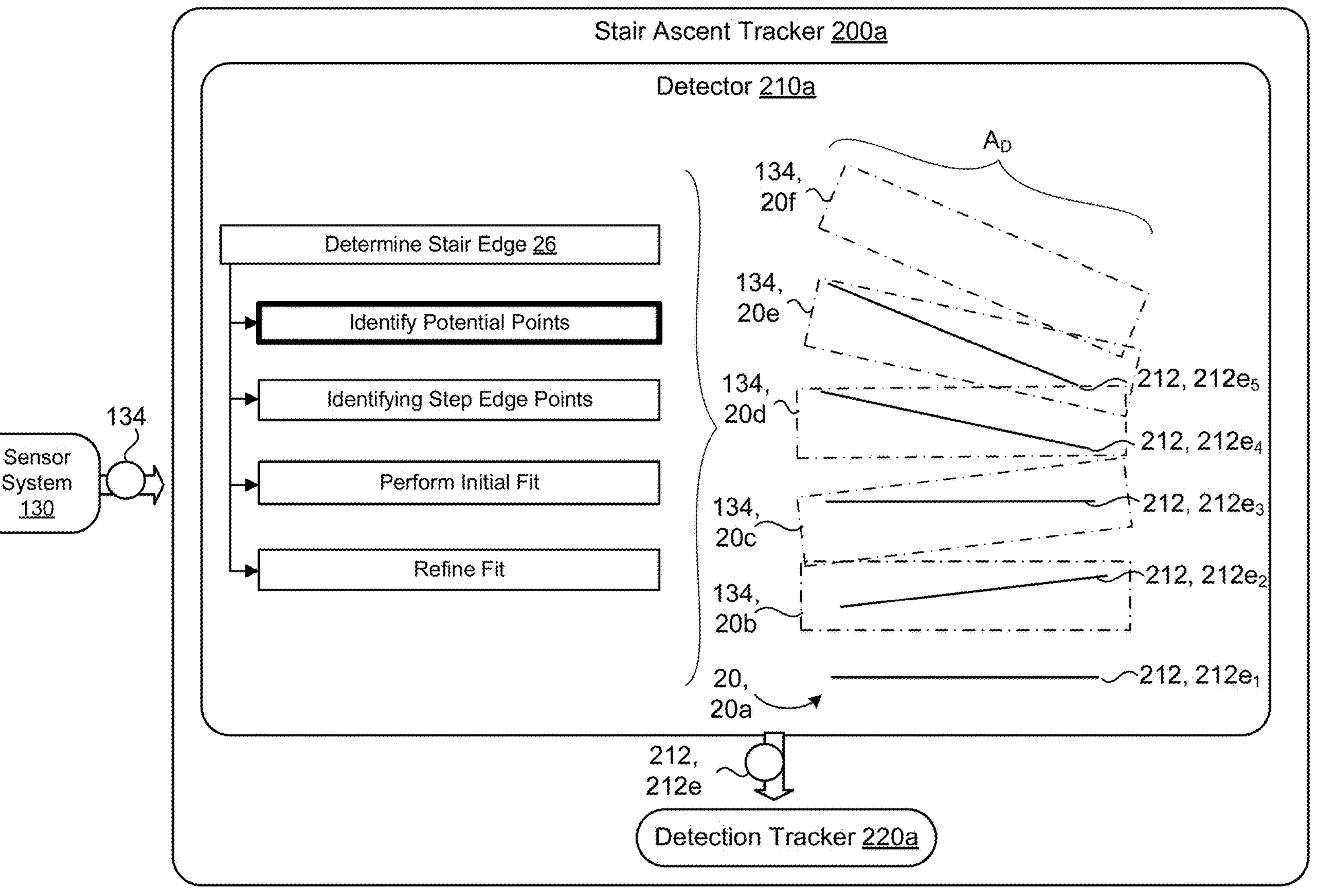
Figure 2E:
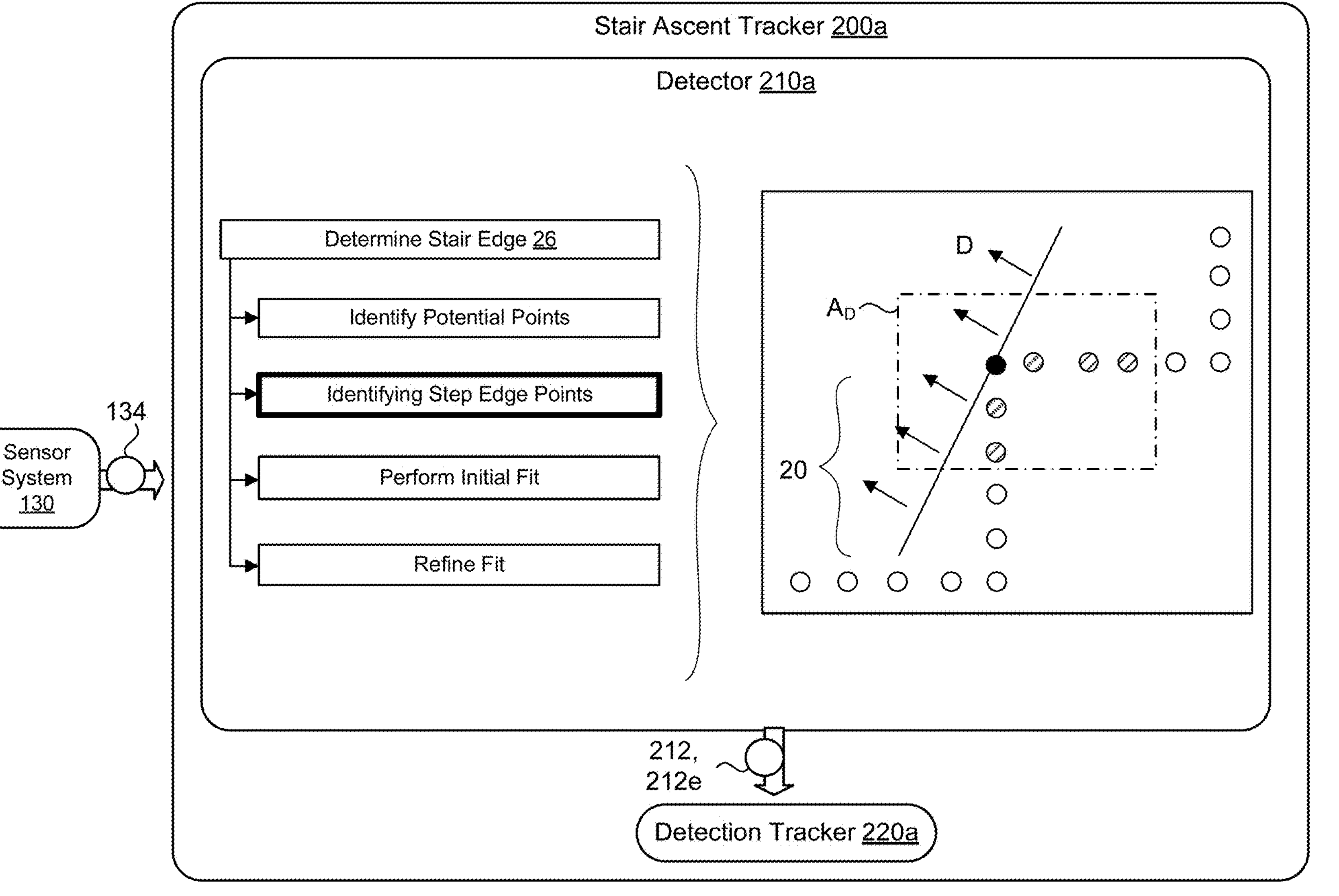
Figure 2F:
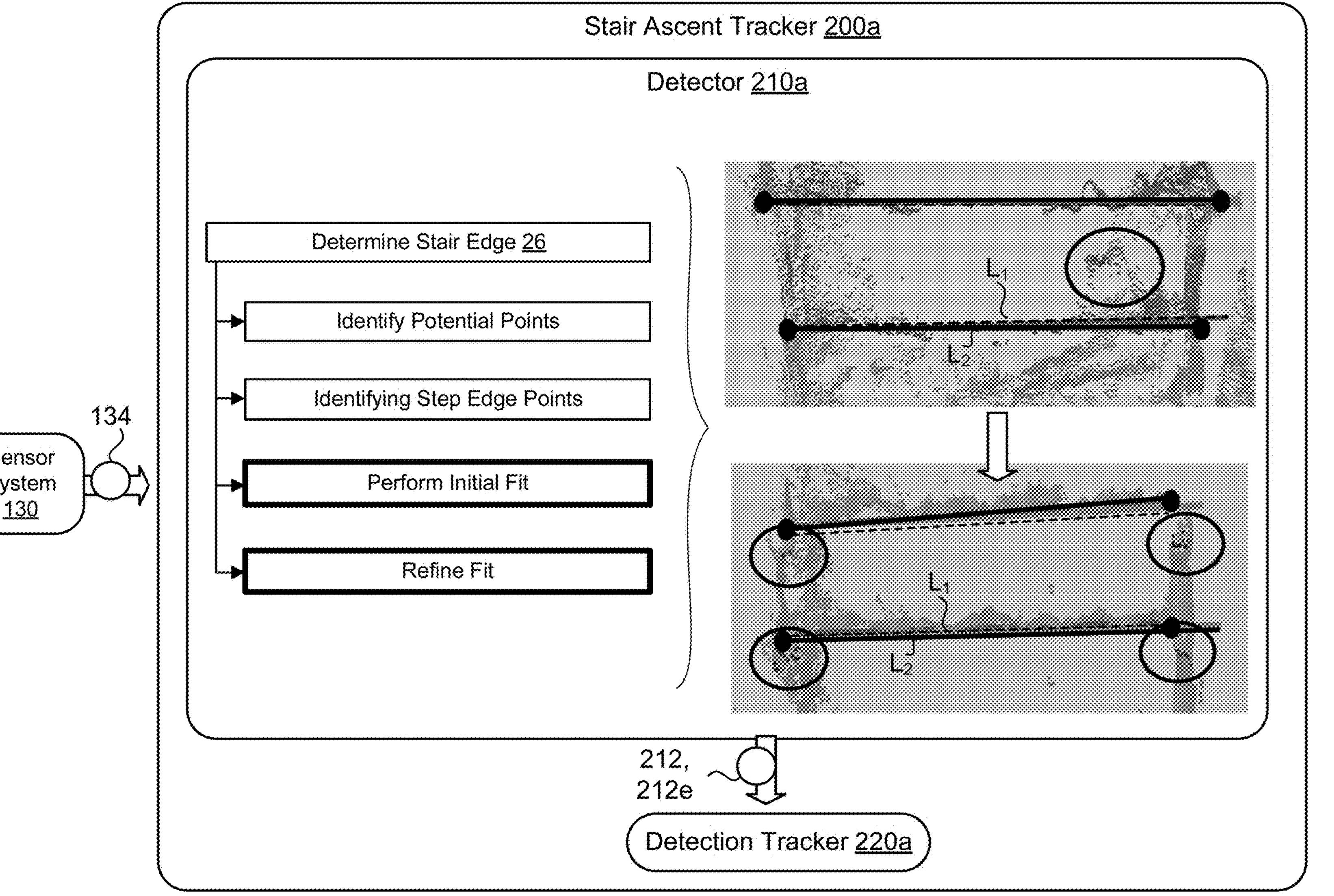
Figure 2G:
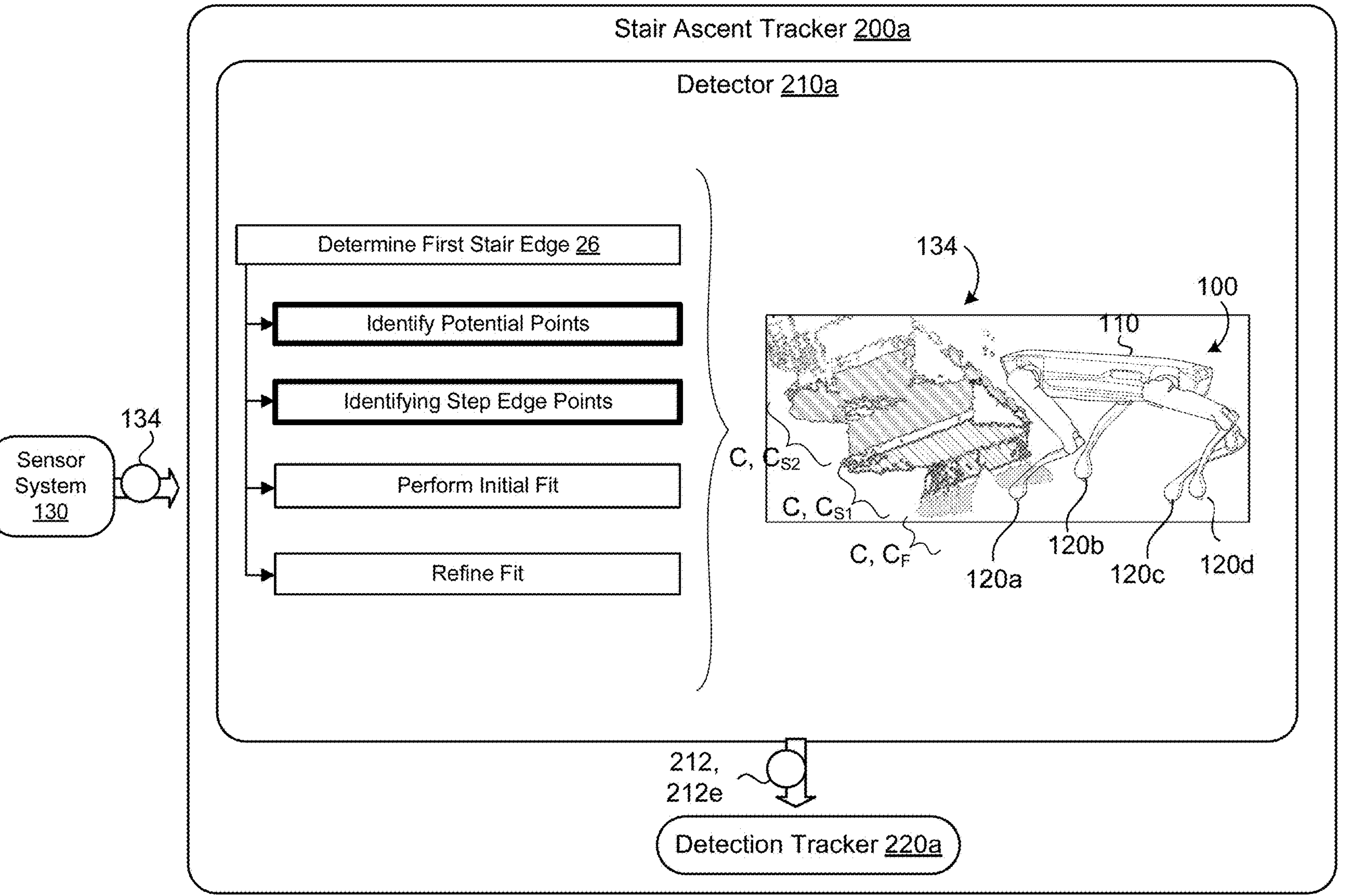

In some examples, such as FIGS. 2D-2F, the detector 210*a* is configured to detect an edge 26 of a stair 20. Generally speaking, to identify sensor data 134 that may correspond to the edge 26 of a stair 20, the detector 210*a* may first identify a location of a previous stair 20 based on prior detections. In other words, the detector 210*a* identifies sensor data 134 corresponding to a second stair 20, 20*b* based on a location of sensor data 134 previously detected for a first stair 20, 20*a*. In this approach, the detector 210*a* is able to bootstrap itself up any number of stairs 20 while also adapting to changes in a previous stair rather than a world frame. By looking at sensor data 134 relative to sensor data 134 of a prior stair 20, the relativity allows the detector 210 to detect features even if these features are changing over the course of a staircase (e.g., the stairs 20 are winding). For example, FIG. 2D depicts that the sensor data 134 for the second stair 20*b* exists in a detection area $A_D$ shown as a dotted rectangular target detection box relative to a first detected edge 212, 212$e_1$ of the first stair 20*a*.

Referring to FIG. 2E, in some implementations, based on the sensor data 134 within the detection area $A_D$, the detector 210*a* divides the detection area $A_D$ into segments (e.g., columnar segments defining a pixel-wide detection column) and traverses each segment of the detection area $A_D$ incrementally. When searching a segment of the detection area $A_D$ in a direction D toward the robot 100 (e.g., a direction towards where an actual edge 26 of the stair 20 would likely exist), the detector 210*a* identities points of sensor data 134 that are the furthest in this direction D within the segment of the detection area $A_D$. In some examples, to determine the furthest points in the search direction D, the detector 210*a* searches each segment of the detection area $A_D$ sequentially until a search segment is an empty set and identifies one or more points in the search segment prior to the empty set as one or more points along an edge 26 of the stair 20. For example, one or more points with a greatest height (e.g., z-coordinate height) within the search segment correspond to edge points (e.g., shown in solid fill).

Referring to 2F, in some configurations, the detector 210*a* generates a first line $L_1$ by applying a linear regression fit to the edge points identified by the detector 210*a*. For instance, the detector 210*a* generates the first line $L_1$ using a least squares fit. The detector 210*a* may further refine this fit due to the fact that some points may correspond to outlier data or points near the extent of the field of view $F_V$. For example, the detector 210 in FIG. 2F removes the sensor data 134 in the circles during refinement of the first fit. Here, the detector 210*a* may also refine the first fit by determining where the detected stair edge likely ends (or terminates) based on the distribution of sensor data 134 (e.g., shown in spheres near the ends of the lines $L_1$) and removes this sensor data 134. After one or more of these refinements, the detector 210*a* may generate a second line $L_2$ by applying a linear regression fit to the remaining edge points. Here, the linear regression fit may also be a least squares fit similar to the first line $L_1$. In some configurations, after the generating the first line $L_1$ or the second line $L_2$, the detector 210 may reject the current detected edge 212*e* by comparing it to one or more previously detected edges 212*e* and determining, for example, that the current detected edge 212 is too short, too oblique, or embodies some other anomaly justifying rejection. If the detector 210 does not reject the current detected edge 212, the detector 210*a* passes the current detected edge 212*e* to the detection tracker 220*a* in order for the detection tracker 220*a* to perform the tracking process.

Unlike the detection for features of other stairs 20, detection for the first stair 20, 20*a* of a staircase may be unique in that the detector 210*a* does not know where to look for sensor data 134. In other words, referring back to FIG. 2D, the detector 210*a* identified potential points of the sensor data 134 that would likely correspond to a feature for detection of the second stair 20*b* based on a previously detected feature 212 of the first stair 20*a*. When performing detection on the first stair 20*a*, the detector 210*a* does not have this prior stair reference point. To find the first stair 20*a*, the detector 210*a* is configured to classify the sensor data 134 according to height (i.e., a z-coordinate) along a z-axis $A_Z$ (e.g., parallel to a gravitational axis of the robot 100). For instance, in FIG. 2G, the classifications C may include a floor height classification C, $C_F$, an expected first stair classification C, $C_{S1}$, and/or an expected second stair classification C, $C_{S2}$. In some examples, the detector 210*a* first classifies the sensor data 134 by the floor height classification $C_F$ based on an assumption that the feet 124 of the robot 100 are on the floor. The detector 210*a* may generate the other classifications C relative to the determined floor height. Here, the detector 210*a* uses its prior knowledge of how tall stairs/staircases are typically in the real world to define the classification heights of the first and second stairs relative to the floor height.

In some configurations, based on the classifications C, the detector 210*a* searches a detection area $A_D$ as shown with respect to FIG. 2E to determine edge points of the sensor data 134. In other words, to detect the edge points for the first stair 20*a* from the sensor data 134, the detector 210*a* performs the column search described with respect to FIG. 2E at a height assumed to correspond to a first stair 20*a* (e.g., based on height corresponding to the expected first stair classification C, $C_{S1}$). In some examples, the detector 210*a* is configured to cluster the edge points and to merge any clusters CL that may seem likely to be part of the same stair 20 except for a gap between the clusters CL. In some implementations, with identified and clustered edge points, the detector 210 determines whether the identified and clustered edge points indicate a consistent relationship between the sensor data 134 classified as a first stair classification $C_{S1}$ and a second stair classification $C_{S2}$. Here, the identified and clustered edge points may indicate a consistent relationship between the sensor data 134 classified as a first stair classification $C_{S1}$ and a second stair classification $C_{S2}$ when the identified and clustered edge points delineate the stair classifications $C_{S1}$, $C_{S2}$ and define a second set of edge points above a first set of edge points (e.g., reflective of an actual staircase where one stair is above another). When this occurs, the stair ascent tracker 200*a* may determine that the underlying sensor data 134 is most likely to correspond to a staircase and apply itself (or recommend its application) to the underlying sensor data 134 to detect features.

Based on the sensor data classification process, the detector 210*a* is aware of an approximate location for the first stair 20, 20*a*. Using this approximate location, the detector 210*a* may refine the height of a stair 20 (e.g., the first stair 20*a*). For instance, the detector 210*a* selects points of the sensor data 134 that likely correspond to the tread 22 of a stair 20 based on the approximate location and averages the heights of the selected points of the sensor data 134. Here, the detector 210*a* then defines the average height of the selected points to be a refined height of the tread 22 of the stair 20 (i.e., also referred to as a height of the stair 20). The detector 210*a* may perform this height refinement when the robot 100 is near to the stair 20 such that the sensor(s) 132 of the robot 100 are above the stair 20.

Figure 2H:
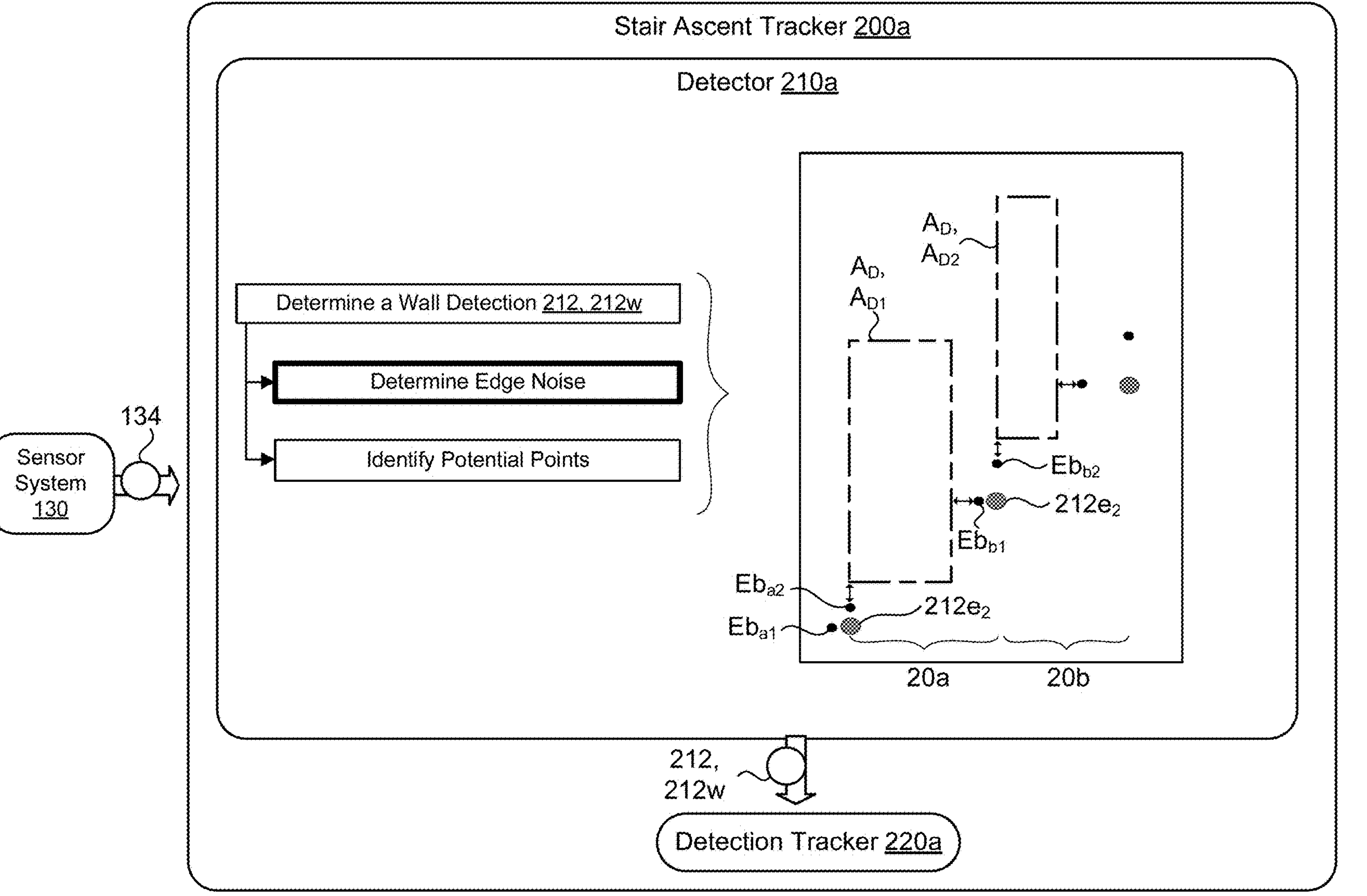

Referring to FIG. 2H, the detector 210*a* is configured to generate a detected wall 212, 212*w* as a detected feature 212. In some examples, to detect a wall 28, the detector 210*a* first estimates an error boundary Eb for a detected edge 212*e* for one or more stairs 20 to define a search region (i.e., a detection area $A_D$) for a wall 28. Here, the error boundary refers to confidence tolerance for the detected edge 212*e*. The error boundaries are generally smaller closer to the robot 100 (i.e., a tighter confidence tolerance for an edge 26) and larger further away from the robot 100 (i.e., a looser confidence tolerance for an edge 26). The detector 210*a* estimates the error boundary Eb because the detector 210*a* wants to avoid accidently including an edge point as a wall point during detection. In FIG. 2H, the detector 210*a* estimates an error boundary Eb for each stair 20 (e.g., shown as a first stair 20*a* and a second stair 20*b*) in a first direction (e.g., shown as a first error boundary $Eb_{a1}$ along an x-axis) and a second direction (e.g., shown as a second error boundary $Eb_{a2}$ along the z-axis). The detector 210*a* then defines the search area or detection area $A_D$ as an area bound at least partially by the error boundaries Eb. For example, a first detection area $A_{D1}$ spans the error boundary Eb from the first stair 20*a* to the error boundary Eb from the second stair 20*b* to search for one or more walls 28 intersecting the extents of the first stair 20*a* and a second detection area $A_{D2}$ spans the error boundary Eb from the second stair 20*b* to the error boundary Eb from a third stair 20*c* (partially shown) to search for one or more walls 28 intersecting the extents of the second stair 20*a*. By using this error boundary approach, the detector 210*a* attempts to prevent confusing parts of an edge 26 that are noisy sensor data 134 with a wall detection 212*w*.

Figure 2I:
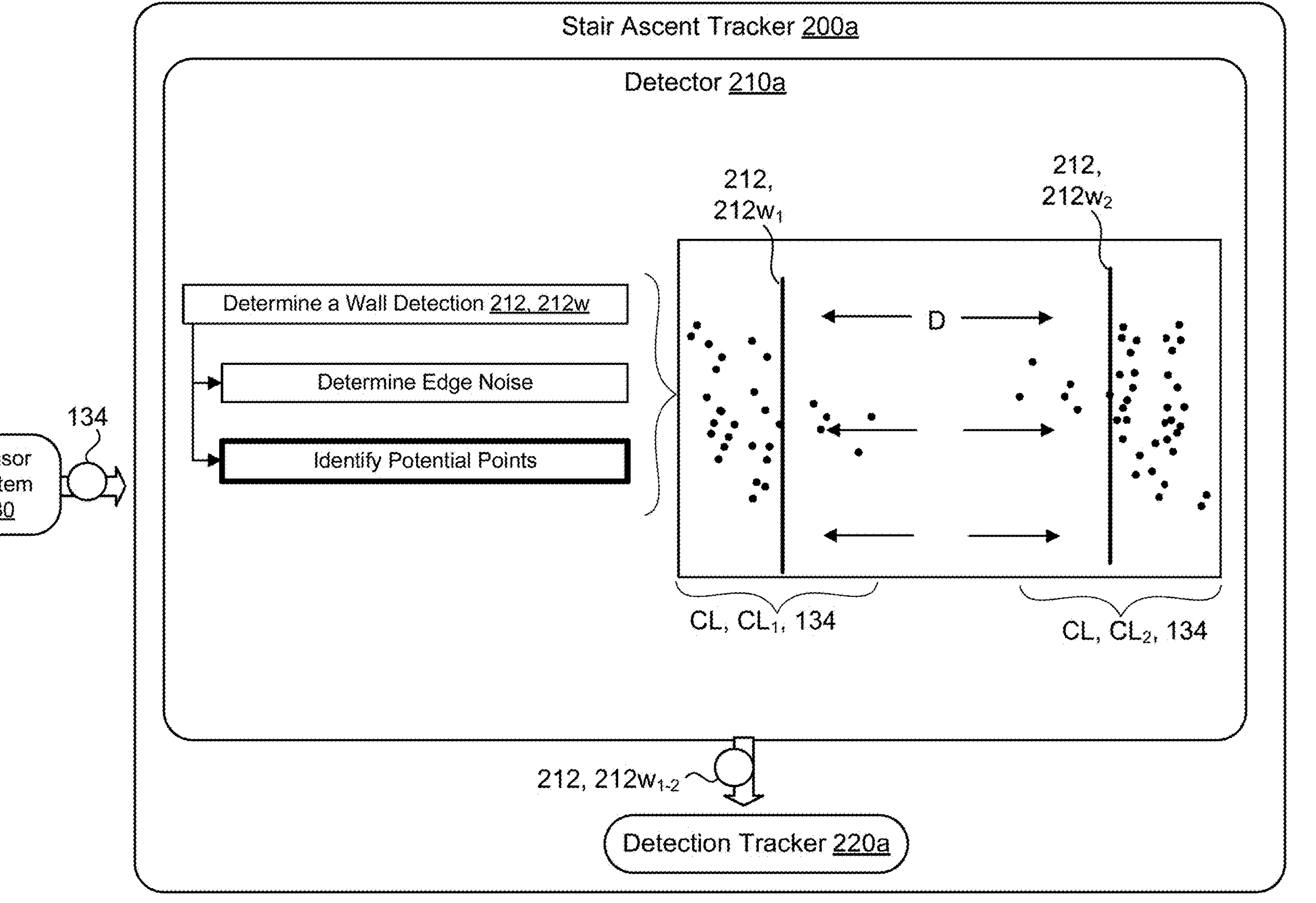
Figure 2J:
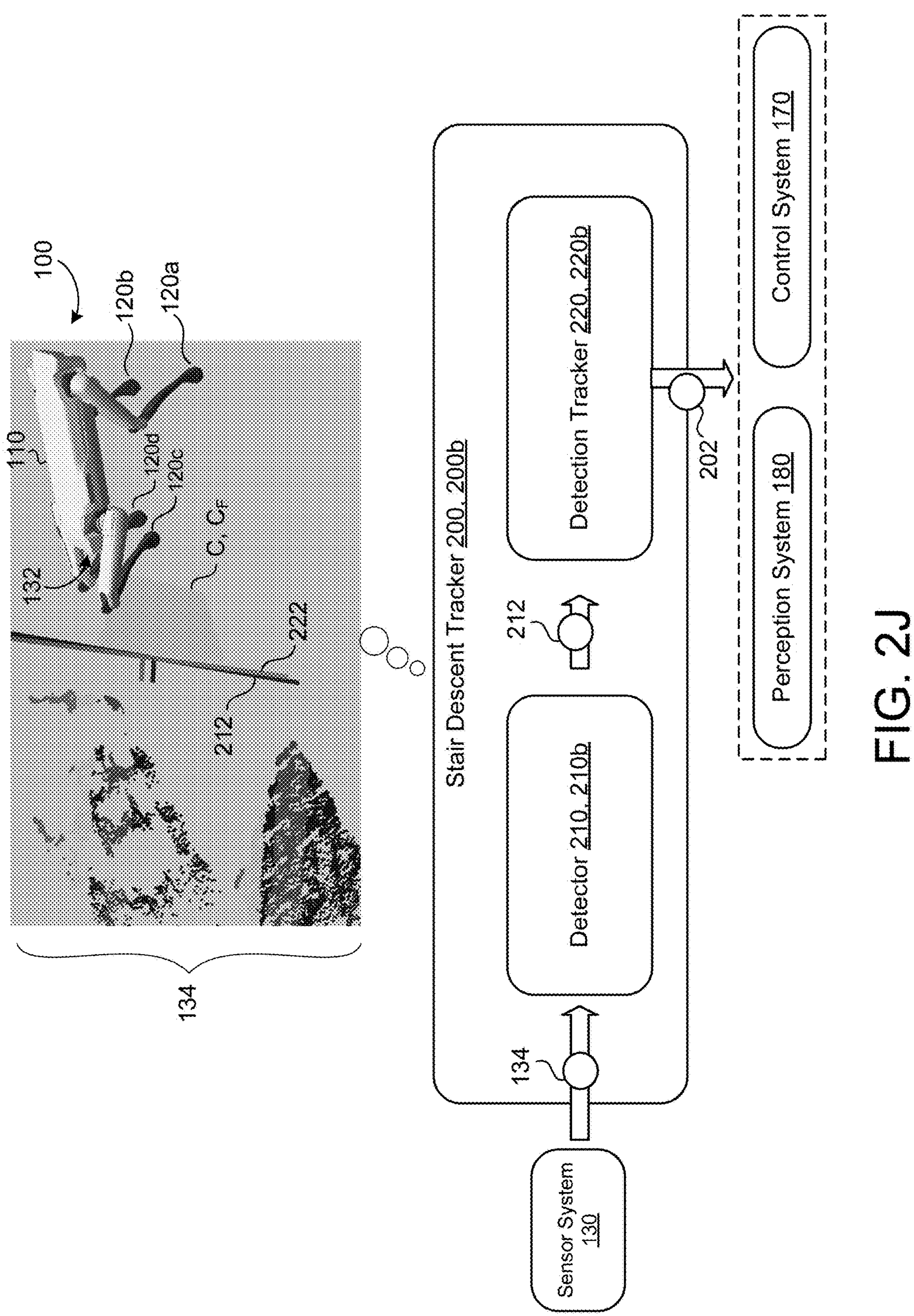
FIGS. 2J-2U are schematic views of example stair descent trackers for the robot of FIG. 1A.
Figure 2K:
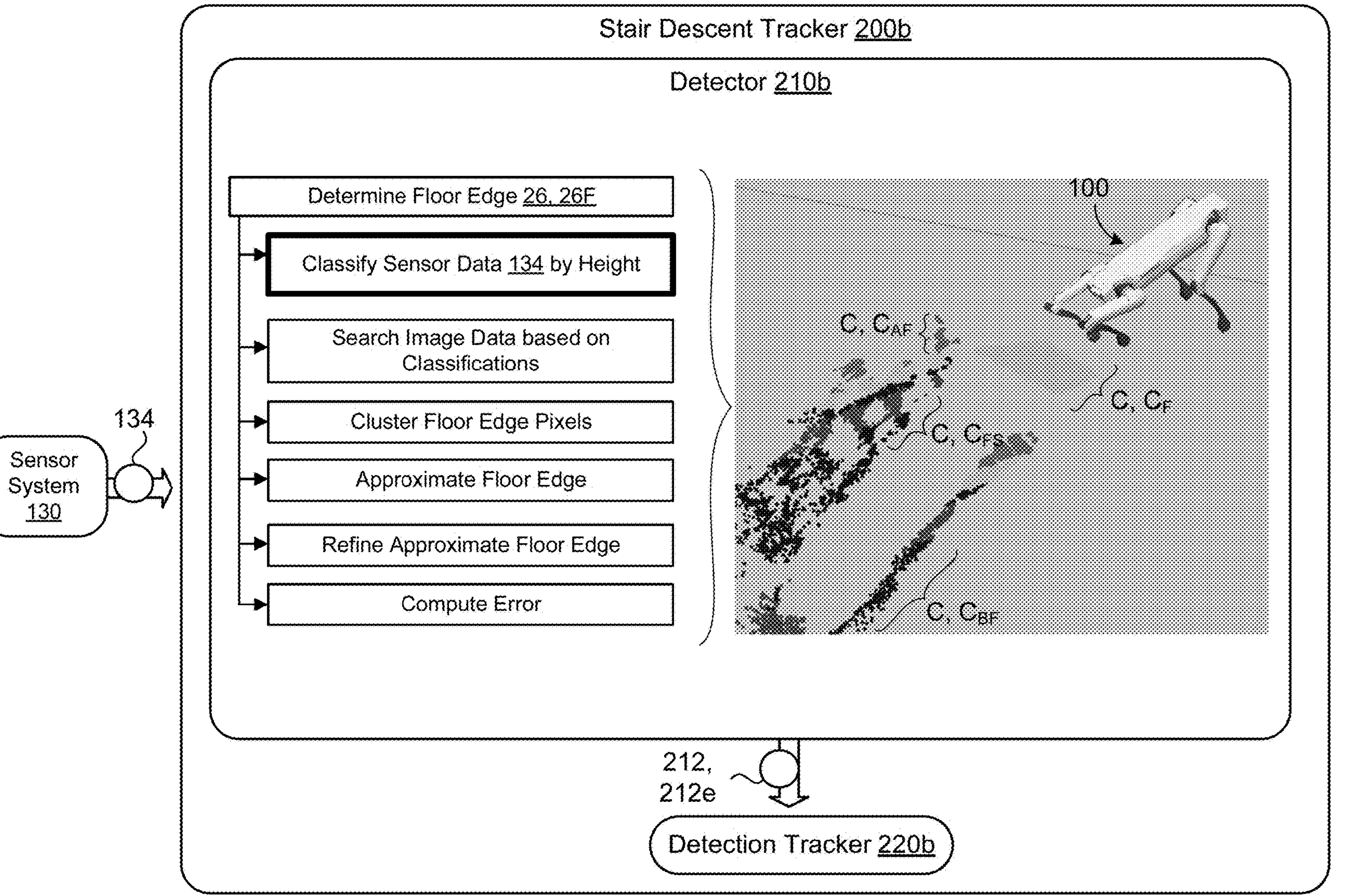

Referring to FIG. 2I, in some implementations, the detector 210*a* searches the detection area $A_D$ outward from a center of the staircase (or body 110 of the robot 100). While searching the detection area $A_D$ outward, the detector 210*a* determines a detected wall 212*w* when the detector 210*a* encounters a cluster CL of sensor data 134 of sufficient size. In some examples, the cluster CL of sensor data 134 is of sufficient size when the cluster CL satisfies an estimated wall threshold. Here, the estimated wall threshold may correspond to a point density for a cluster CL. When the detector 210*a* identifies a cluster CL of sensor data 134 satisfying the estimated wall threshold, the detector 210*a* estimates that a wall 28 is located at a position at an inner edge (i.e., an edge towards the center of the staircase) of the cluster CL. Here, the detector 210*a* defines the estimated wall location as a detected wall 212*w*. For instance, in FIG. 21, the detector 210*a* determines a first detected wall 212*w*$_1$ and a second detected wall 212*w*$_2$ on each side of the staircase corresponding to an inner edge of a first cluster CL, $CL_1$ and a second cluster $CL_2$ respectively. In some configurations, the detector 210*a* also generates an error boundary about the detected wall 212*w* based on a density of the sensor data 134 at the corresponding cluster CL.

Referring to FIGS. 2J-2U, the stair tracker 200 may be configured as a stair descent tracker 200, 200*b* that includes additional or alternative functionality to the ascent stair tracker 200*a* or general stair tracker 200. Here, the functionality of the descent stair tracker 200*b* is specific to the scenario where the robot 100 descends the stairs 20 and how the robot 100 perceives sensor data 134 during descent. When descending the stairs 20, one or more sensors 132 may generate inaccurate sensor data 134 due to particular limitations of the sensors 132.

Additionally, in some examples, during descent of a staircase, the robot 100 descends the stairs 20 backwards. In other words, the robot 100 is oriented such that the hind legs 120*c-d* of the robot 100 descend the stairs 20 first before the front legs 120*a-b* of the robot 100. When descending the stairs 20 backwards, the robot 100 may include fewer sensors 132 at the rear of the robot 100 (e.g., about an end of the body 110 near the hind legs 120*c-d*) because the robot 100 may be designed to generally frontload the sensor system 130 to accommodate for front-facing navigation. With fewer sensors 132 at the rear end of the robot 100, the robot 100 may have a limited field of view $F_V$ compared to a field of view $F_V$ of the front end of the robot 100.

For a descending staircase, most of the staircase may not be in the field of view $F_V$ of the robot 100 until the robot 100 is close or adjacent to the staircase. Since the staircase is not within the field of view $F_V$ of the robot 100 earlier, the robot 100 is without much initial sensor data 134 about the descending staircase before the robot 100 is at the top of the stairs 20. Accordingly, the robot 100 uses the stair descent tracker 200*b* to recognize the descending staircase according to a floor edge 26, 26*f* that corresponds to an edge 26 of a top stair 20 of the staircase. In some examples, in order to determine the floor edge 26*f*, the stair descent tracker 200*b* is configured to determine a location where the support surface 12 for the robot 100 (i.e., also referred to as the floor 12 beneath the robot 100) disappears in a straight line. In other words, the robot 100 determines that the straight line corresponding to where the support surface 12 disappears may be the floor edge 26*f* (i.e., the edge 26 of the top stair 20 of a descending set of stairs 20).

The stair descent tracker 200*b* includes a detector 210, 210*b* and a detection tracker 220, 220*b*. Here, the detector 210*b* and the detection tracker 220*b* of the stair descent tracker 200*b* may behave in similar ways to the detector 210 and the detection tracker 210 of the stair tracker 200 and/or stair ascent tracker 200*a*. Namely, the detector 210*b* is configured to detect a feature of one or more stairs 20 (e.g., an edge 26 or a wall 28) and the detection tracker 220*b* is configured to track the detected feature 212 to ensure that the detected feature 212 remains an accurate representation of the actual feature of the stair 20 based on the modeling techniques of the stair descent tracker 200 and current sensor data 134 captured by the robot 100.

In some implementations, the detector 210*b* of the stair descent tracker 200*b* receives the sensor data 134 from the sensor system 130 and generates a detected feature 212. As the robot 100 approaches a descending set of stairs 20, the detector 210*b* functions to determine a detected edge 212, 212*e* corresponding to a floor edge 26*f*. Once the detector 210*b* determines the detected edge 212*e*, the detection tracker 220*b* monitors that this detected edge 212*e* remains the best representation of the floor edge 26*f* during future time steps.

Referring to FIGS. 2K-2P, in some configurations, the detector 210*b* of the stair descent tracker 200*b* performs further processing on the received sensor data 134 in order to generate a detected edge 212, 212*e* as the detected feature 212. For example, the detector 210*b* receives the sensor data 134 and classifies the sensor data 134 by height. Here, the height of a point of the sensor data 134 corresponds to a height in the Z-axis (i.e., an axis parallel to the gravitational axis of the robot 100). In some examples, the classification process by the detector 210*b* classifies each point of the sensor data 134 as a height classification C corresponding to either a height of the floor C, $C_F$ about the robot 100, a height above the floor C, $C_{AF}$, or a height below the floor C, $C_{BF}$. Unfortunately, the sensor data 134 may often have gaps or sections missing from the sensor data 134 due to how the environment 10 is sensed or the capabilities of a sensor 132. To aid further processing by the detector 210*b*, the detector 210*b* may perform a morphological expand to fill in gaps within the sensor data 134. For example, a dilate process identifies gaps within the sensor data 134 and fills the identified gaps by expanding sensor data 134 adjacent to the identified gaps.

Figure 2L:
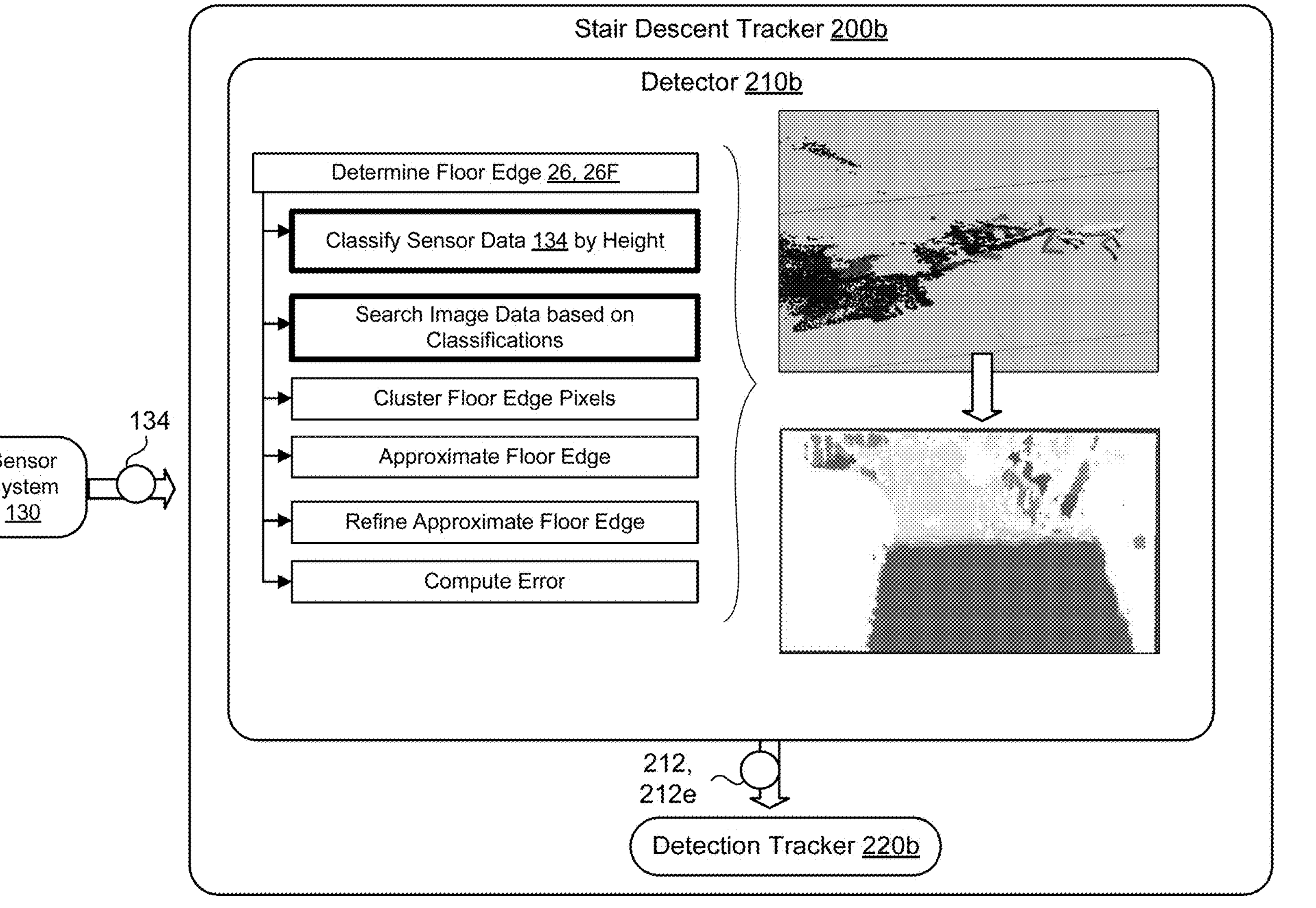

With classified sensor data 134, the detector 210*b* may be further configured to perform further processing on the two dimensional image space based on the three dimensional sensor data 134 (e.g., as shown in FIG. 2L). In the two dimensional image space, each pixel Px of the image space may represent or correspond to the height classifications C for the sensor data 134. In other words, for each pixel Px, the detector 210*b* determines whether the classified sensor data corresponding to a respective pixel position in the image space has been classified as a floor classification $C_F$, an above the floor classification $C_{AF}$, or a below the floor classification $C_{BF}$. With an image space representing the sensor data 134, the detector 210*b* may determine the detected edge 212*e* by analyzing pixels Px of the image space.

Figure 2M:
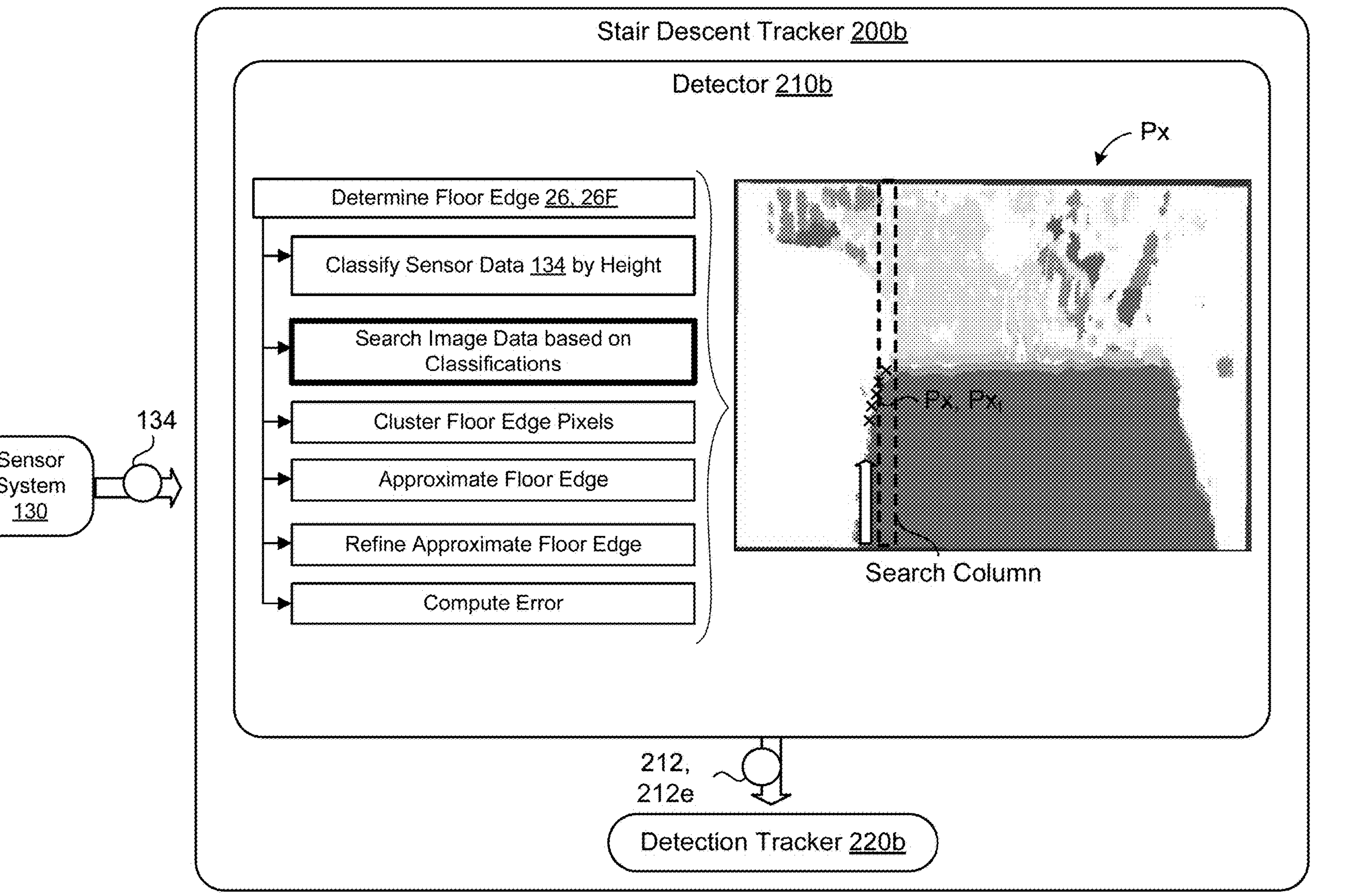

In some examples, such as FIG. 2M, once the detector 210*b* associates height classifications with pixels Px of an image space, the detector 210*b* is configured to search the image space to identify potential pixels Px that may correspond to the floor edge 26*e*. In some implementations, the detector 210*b* uses a search column of some predefined width (e.g., a pixel-wide column) to search the image space. For instance, the image space is divided into columns and, for each column, the detector 210*b* searches for a change in the height classifications C between pixels Px. Stated differently, during the search, the detector 210*b* identifies a pixel Px as a floor edge pixel Px, $Px_f$ when the pixel Px corresponds to a floor classification $C_F$ that is followed by subsequent pixels Px corresponding to either missing sensor data 134 or some threshold amount of below-floor sensor data 134 (i.e., with below the floor classifications $C_{BF}$). In some configurations, the detector 210*b* performs the column-wide search starting at a bottom of the image space where the pixels Px include floor classifications $C_F$ and searching upwards in a respective column.

By analyzing an image space to determine the detected edge 212*e*, the detector 210*b* may avoid potential problems associated with searching sensor data 134 in three dimensional space. For instance, when the detector 210*b* attempts to detect the floor edge 26*f*, the sensor data 134 may appear to be in an alternating height pattern of high-low-high-low (e.g., where high corresponds to a floor classification $C_F$ and low corresponds to a below floor classification $C_{BF}$). Yet in one configuration of the sensor data 134, the floor edge 26*f* is actually located within the first group of high sensor data 134, but the third group of high sensor data 134 may confuse the detector 210*b* causing the detector 210*b* to interpret that the floor edge 26*f* exists in the third group of high sensor data 134. In a contrasting configuration of sensor data 134 with the same pattern, the floor edge 26*f* may actually exist in the third group of high sensor data 134, but the second group of low sensor data 134 between the first group and the third group may confuse the detector 210*b* causing the detector 210*b* to detect the floor edge 26*f* in the first group of high sensor data 134. Because the sensor data 134 may have these inconsistencies, feature detection by the detector 210*b* may occur in two dimensional space instead of three dimensional space.

Figure 2N:
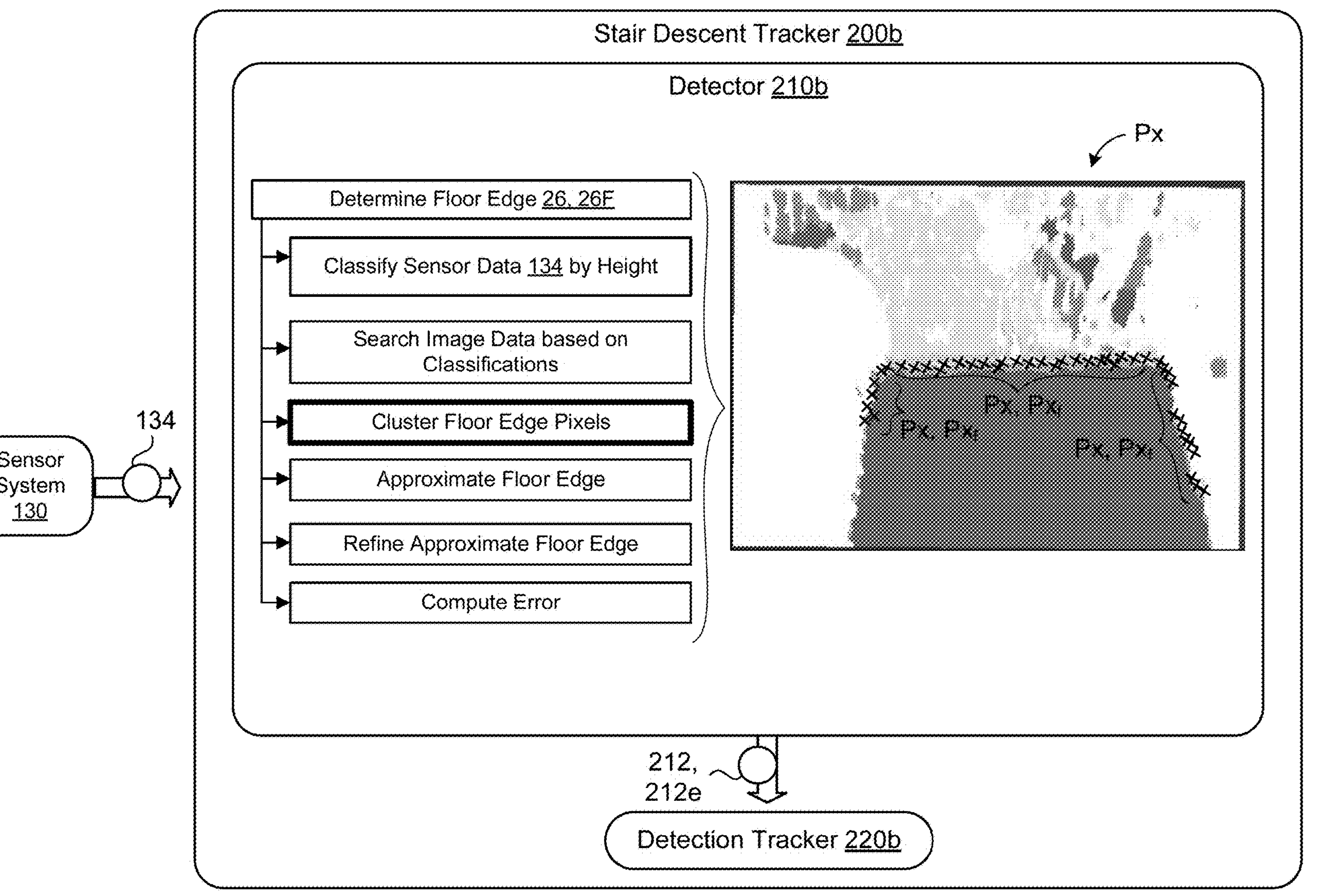
Figure 2O:
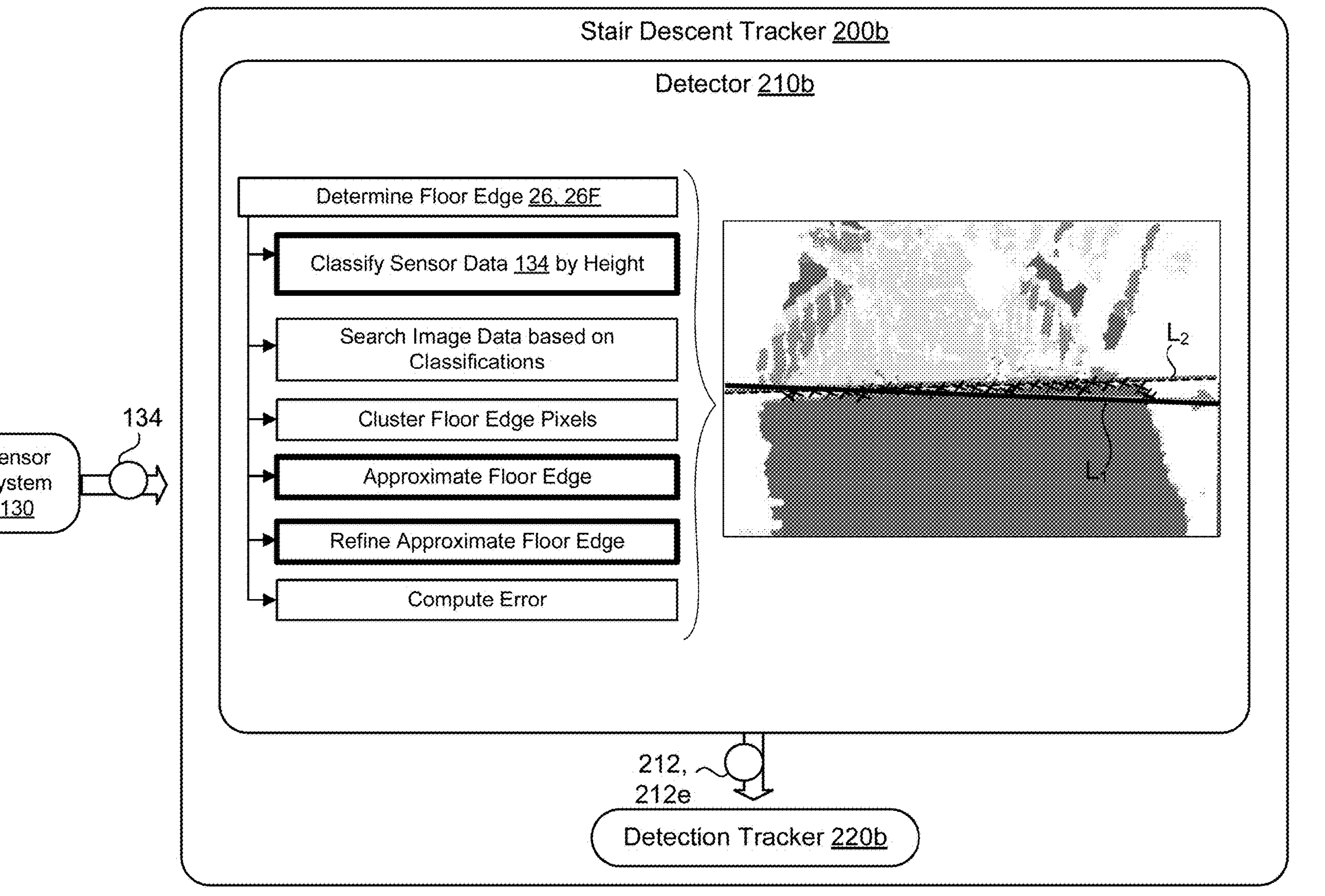
Figure 2P:
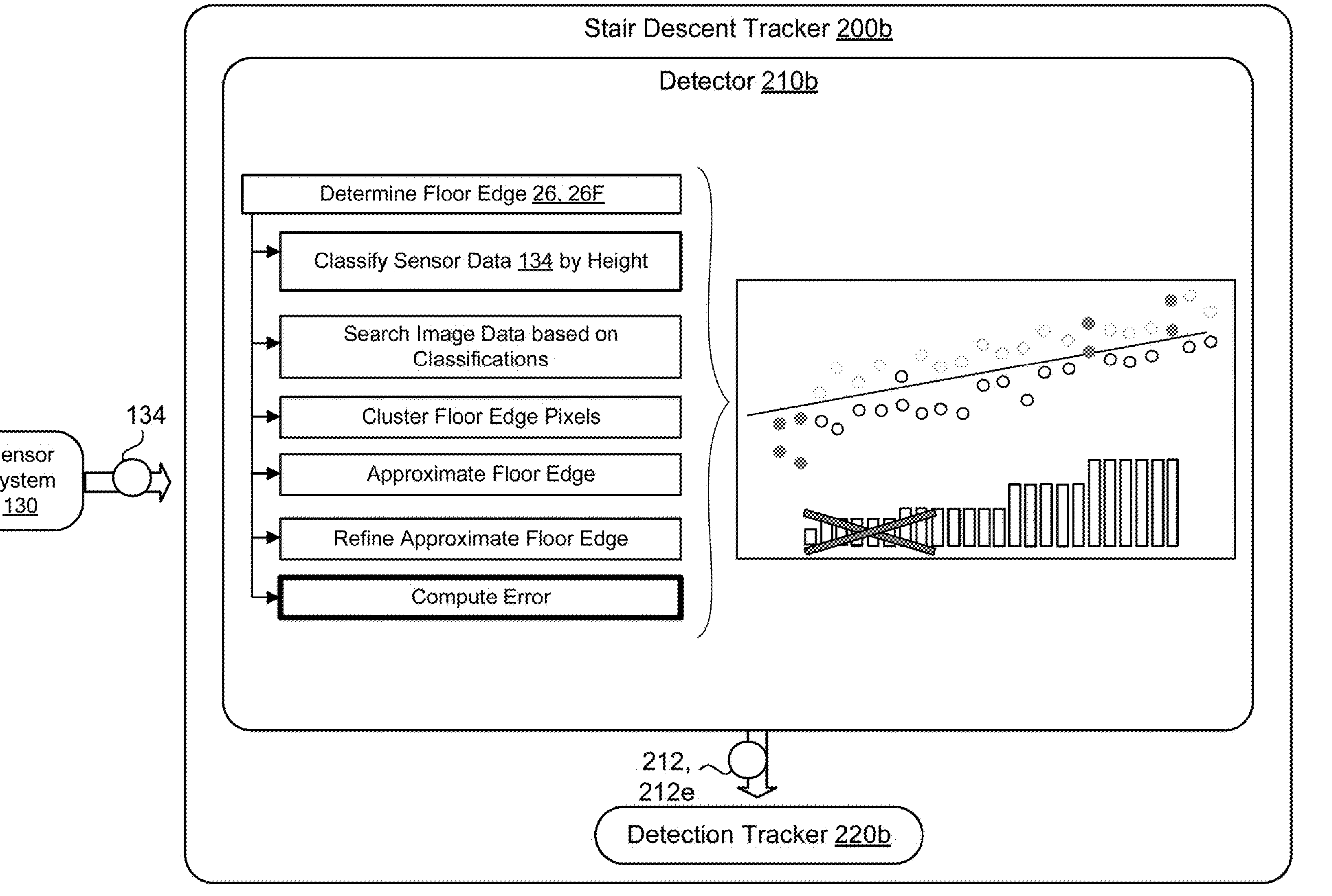
Figure 2Q:
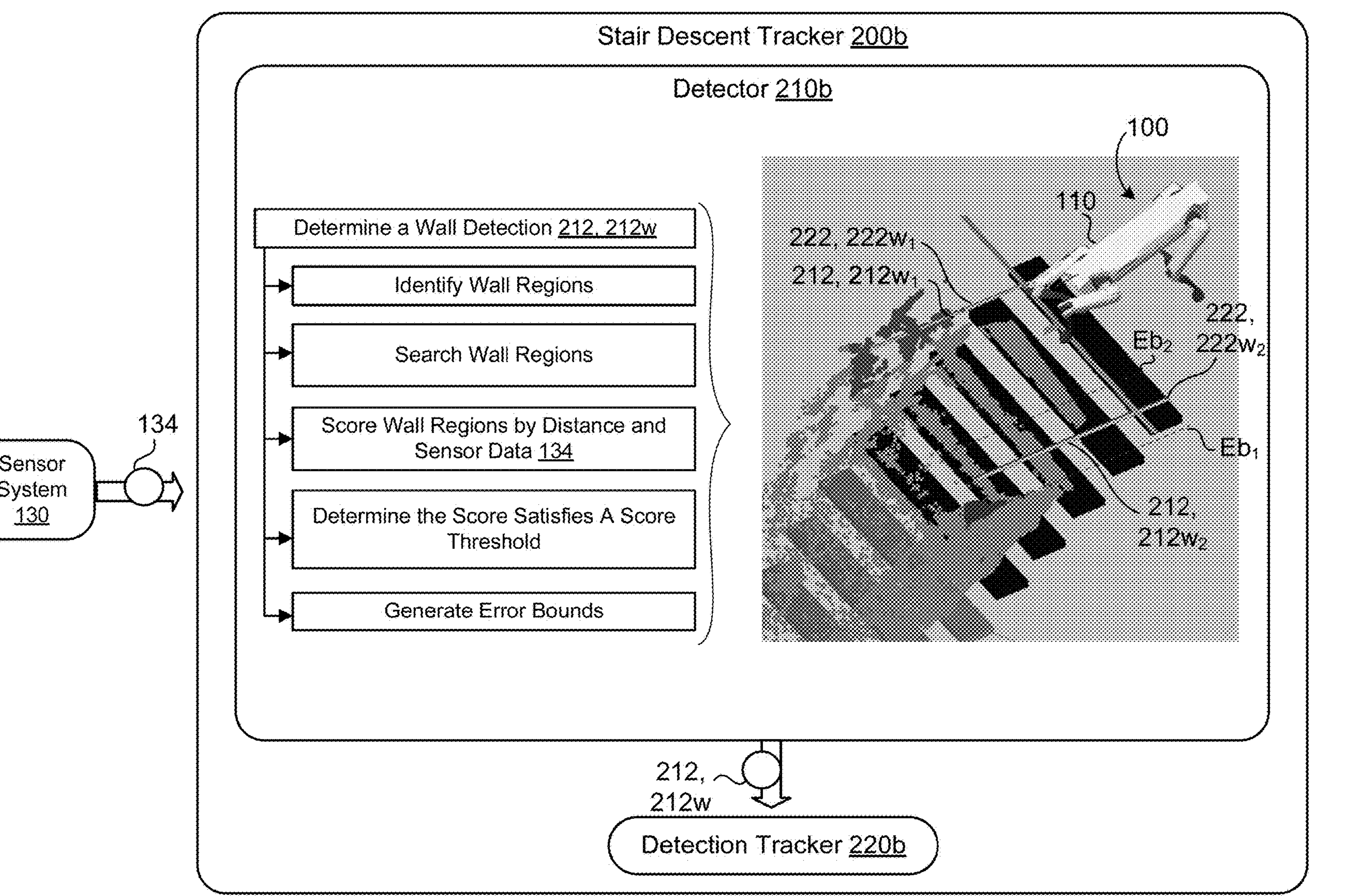

As shown in FIGS. 2N and 2O, when the detector 210*b* completes the search of the image space and identifies floor edge pixels Px, $Px_f$, the detector 210*b* may then approximate the floor edge 26*f* by performing one or more linear regression fits to the identified floor edge pixels Px, $Px_f$. In some examples, the detector 210*b* clusters the floor edge pixels $Px_f$ prior to applying a linear regression fit. For example, FIG. 2N depicts three clusters of flood edge pixels $Px_f$. Here, this clustering technique may help more complex situations where the detector 210*b* needs to merge together identified floor edge pixels Px, $Px_f$ to provide some linearity to the identified floor edge pixels Px, $Px_f$. In some implementations, such as FIG. 2O, the detector 210*b* first defines the floor edge 26*f* as a first line $L_1$ associated with a least squares fit and then refines the first line $L_1$ from the least squares fit by identifying outlier floor edge pixels Px, $Px_f$ and removing these outliers. For instance, the detector 210*b* identifies outlier floor edge pixels $Px_f$ near the periphery of the field of view $F_V$ and, as illustrated by comparing FIGS. 2N and 2O, the detector 210*b* removes these outlier floor edge pixels $Px_f$. With outliers removed, the detector 210*b* applies a refined fitting to generate a second line $L_2$ to represent the floor edge 26*f*. In some examples, the second line $L_2$ does not use a least squares fit (e.g., a fit based on Ridge regression), but uses a fit based a minimization of an absolute value for a loss function (e.g., a fit based on Lasso regression). By using a second line $L_2$ with a fit based on, for example, Lasso regression, the detector 210*b* may fit the line L to more appropriately reflect where portions of the sensor data 134 appear to accurately define the floor edge 26*f* (e.g., a cluster of floor classifications $C_F$ in close proximity to a cluster of below floor classifications $C_{BF}$ or narrow gaps between sensor data 134) while other portions of the sensor data 134 lack accurate definition of the floor edge 26*f* (i.e., is missing data and has large perception gaps for the 3D space about the robot 100). In comparison, a least squares fit line generally does not account for these nuances and simply constructs the line L through the middle of gaps of missing data 134. In other words, a least squares fit line can be more influenced by outliers than a fit based on a minimization of an absolute value for a loss function.

In some examples, the detector 210*b* determines an error 216 or an error value to indicate an accuracy (or confidence) of the detected edge 212*e* with respect to an actual edge 26 (e.g., a floor edge 26*f*). Here, to determine the error 216, the detector 210*b* may use, as inputs, the number of points (e.g., the number of identified floor edge pixels $Px_f$) used to construct the line L, a measurement of a distance between the floor and points of the generated line L (i.e., a size of gap between the floor 12 and the generated line L), and/or the fit of the line L (i.e., a metric representing the consistency of points on the line L). In some implementations, the error 216 indicates both a distance error and a rotation error (e.g., a yaw error). Here, in FIG. 2P, the detector 210*b* depicts ordered distance bars a visual illustration of the error computing process.

The detector 210*b* is configured to communicate the detected feature 212 (e.g., the detected edge 212*e*) to the detection tracker 220*b* of the stair descent tracker 200*b*. Here, the detection tracker 220*b* performs the tracking process for the detected feature 212 similar to the tracking process described with respect to FIG. 2B. In some examples, the detection tracker 220*b* uses the error 216 calculated by the detector 210*b* during the merging operation of the tracking process. For example, when merging a detected feature 212 at a first time step $t_1$ with a subsequent detected feature 212 at a second time step $t_2$, the detection tracker 220*b* performs a weighted average of the detected features 212 where the weights correspond to the error value 216 of each detected feature 212. Additionally, the error 216 associated with a detected feature 212 may also be used to determine whether the tracked detection 222 should be replaced by the alternative tracked feature 224. In other words, when the error 216 for the alternative tracked feature 224 satisfies a tracking confidence threshold, the detection tracker 220*b* replaces the tracked detection 222 with the alternative tracked feature 224. Here, the tracking confidence threshold may refer to a difference value between two errors 216 (e.g., a first error 216 for the tracked detection 222 and a second error 216 for the alternative tracked feature 224).

To generate the staircase model 202, the detector 210*b* is also configured to detect the walls 28 about a set of stairs 20 as a detected feature 212. When using the stair descent tracker 200*b* to detect walls 28 about the set of stairs 20, in some examples, such as FIG. 2Q, the detector 210*a* defines regions where a wall 28 may exist. For example, the detector 210*b* is aware that walls 28 do not intersect the robot 100 (e.g., the body 110 of the robot 100) and that walls 28 do not exist in a foot step of the robot 100 (e.g., based on perception systems 180 of the robot 100). Accordingly, the detector 210*b* may limit its detection to areas within the sensor data 134 to regions that exclude the robot 100 and footstep location. In some examples, to detect walls 28, the detector 210*b* searches defined regions outward from a center (e.g., outward from a body 110 of the robot 100). While searching outward, the detector 210*b* establishes a scoring system for the sensor data 134. Here, the scoring system counts each point of data for the sensor data 134 in a horizontal or radial distance from the robot 100 (e.g., a distance in the XY plane or transverse plane perpendicular to the gravitational axis of the robot 100). For each search region (e.g., every centimeter), the scoring system adds a count to a score for each point of sensor data 134 within the search region. As the detector 210*b* moves to the next search region further from the robot 100, the detector 210*b* discounts the score proportionally to the distance from the robot 100. For example, when the search area is a square centimeter, at a distance of two centimeters from the robot 100 in a second search region, the detector 210*b* subtracts a count from the score (i.e., the distance discount), but proceeds to add a count from each point of the sensor data 134 in this second search area. The detector 210*b* may iteratively repeat this process for the field of view $F_V$ to determine whether walls 28 exist on each side of the robot 100. In some configurations, the detector 210*b* detects that a wall 28 exists (i.e., determines a detected feature 212, 212*w* for the wall 28) when the score satisfies a predetermined score threshold. In some examples, the detector 210*b* establishes error bounds $Eb_{1,2}$ based on a value of 0.5 to 2 times the score threshold. Once the detector 210*b* generates a detected wall 212*w* at a particular time step $t_i$, the detector 210*b* passes this detected feature 212 to the detection tracker 220*b* to perform the tracking process on this wall feature.

Additionally or alternatively, when using the stair descent tracker 200*b*, the detector 210*b* determines a width of a stair 20 within a set of stairs 20 and assumes that this width is constant for all stairs 20 within the set. In some configurations, the detector 210*b* searches the sensor data 134 in one horizontal direction and, based on a detected wall 212*w* in this horizontal direction and a known position of the robot 100, the detector 210*b* presumes a location of a detected wall 212*w* for an opposite wall 28. These approaches may be in contrast to the stair ascent tracker 200*a* that identifies a width on each end of a stair 20.

Referring to FIGS. 2R-2U, besides detecting the floor edge 26*f* and one or more walls 28 (i.e., lateral boundaries for the robot 100), the detector 210*b* is able to detect stairs 20 or stair features of the staircase (e.g., as the robot 100 descends the stairs). That is, here, stair features refer to features of the stairs 20 that exclude features of the floor (e.g., a floor edge 260 and features of the wall(s) 28 (e.g., treads 22, risers 24, edges 26, etc.). In some examples, the detector 210*b* is configured to detect features of stairs 20 after first performing detection with respect to the floor edge 26*f* (i.e., the starting point and reference line for descending a staircase) and detection of one or more walls 28 surrounding the staircase. By performing detection of stair features after detection of one or more walls 28, the detector 210*b* excludes the locations of wall(s) 28 from its detection area $A_D$ when detecting these stair features. For instance, the detector 210*b* filters out the sensor data 134 previously identified as likely corresponding to a wall 28.

In some examples, the detector 210*b* clusters the sensor data 134 based on a single dimension, a z-coordinate corresponding to a height position of a point within the sensor data 134. As stated previously, the height or z-coordinate refers to a coordinate position along the z-axis $A_z$ (i.e., parallel to the gravitational axis of the robot 100). In order to cluster the sensor data 134 based on a height position, the detector 210*b* orders points of the sensor data 134 based on height, identifies peaks within the height order (e.g., convolves with a triangular kernel), and groups the points of the sensor data 134 based on the identified peaks. In other words, when ordering the points of the sensor data 134 based on height, the detector 210*b* recognizes there are bands of height ranges (e.g., corresponding to the discrete height intervals of the structure of a staircase). In a staircase with three stairs 20, the height ranges may correspond to a first tread height of a first stair 20, 20*a,* a second tread height of a second stair 20, 20*b,* and a third tread height of a third stair 20, 20*c*. By identifying these height increments or peaks, the detector 210 is able to cluster the points of sensor data 134. The detector 210*b* may merge the clusters Cl as needed to refine its grouping of a cluster Cl. In some configurations, the height clusters Cl undergo the same detection and tracking process as other detected features 212.

Figure 2R:
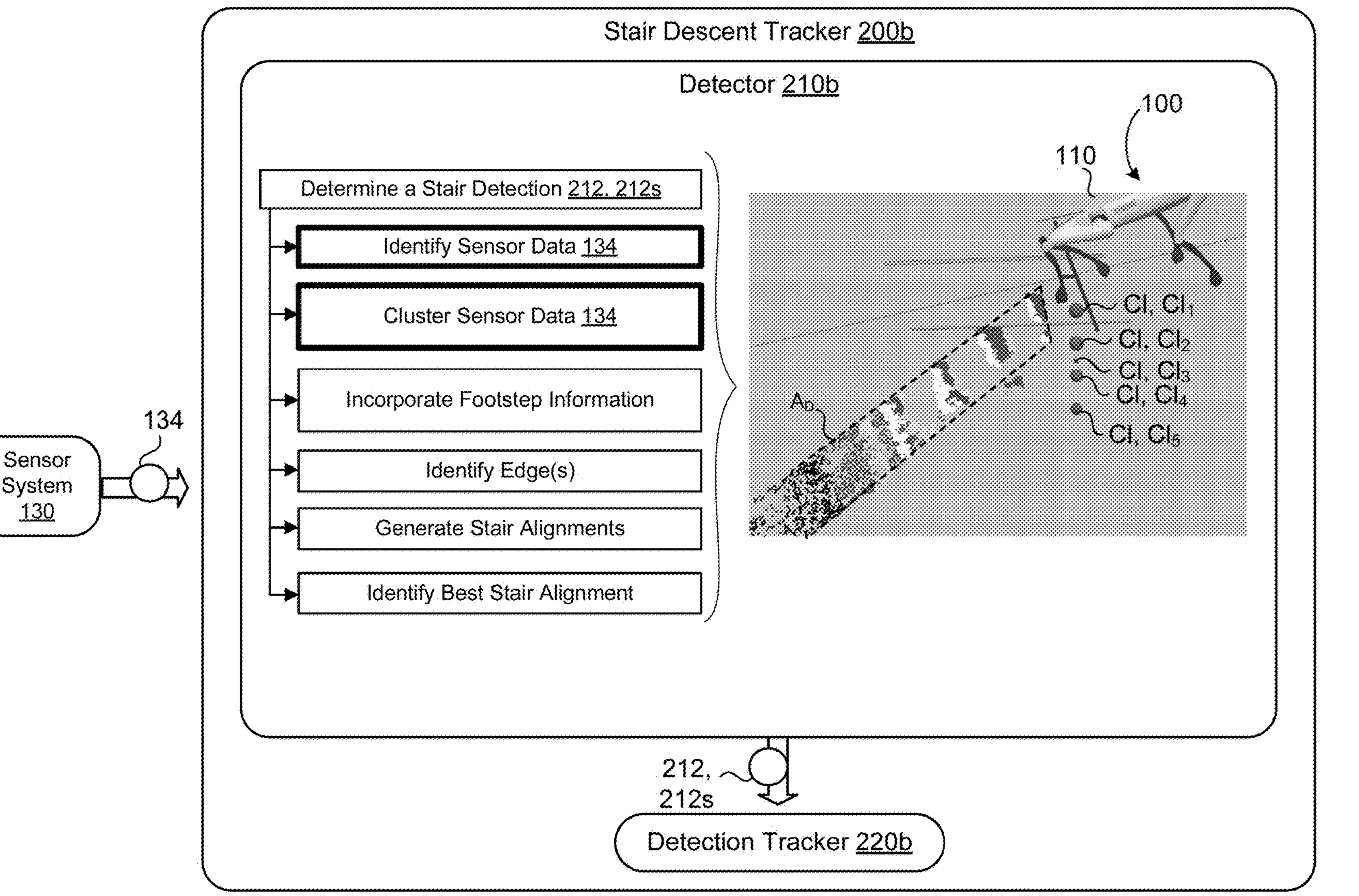
Figure 2S:
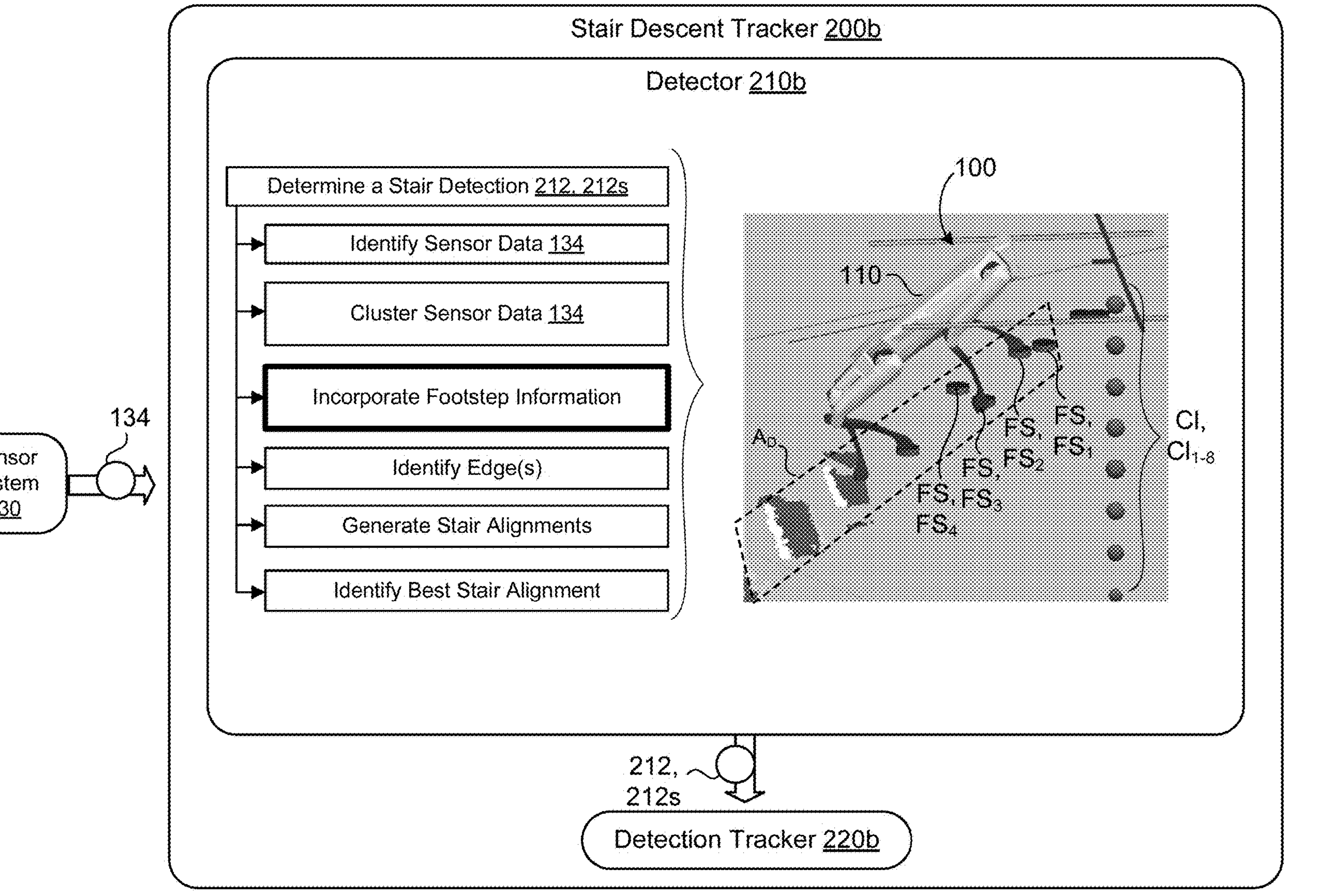

In some implementations, a cluster Cl also includes a cluster confidence indicating a confidence that a height of a respective cluster corresponds to a stair 20 (e.g., a tread 22 of a stair 20). For instance, in FIG. 2R, each cluster Cl is visually represented by a sphere with a diameter or size that indicates the detector's confidence in the cluster Cl. In some configurations, the confidence in the cluster Cl is based on a number of points in the cluster Cl (e.g., statistically increasing the likelihood the height correctly corresponds to a stair 20). As an example, FIG. 2R illustrates that the detector 210*b* is less confident in the third cluster Cl, $Cl_3$ than the other clusters Cl due to the diameter of the third cluster $Cl_3$ represented as smaller than the other clusters Cl. When the robot 100 is descending the stairs 20 as the stair descent tracker 200*b* operates, the detector 210*b* may include footstep information FS, $FS_{1-4}$ that identifies a location where the robot 100 successfully stepped on the staircase. By including footstep information FS, the detector 210*b* may refine its cluster confidences. In other words, since stairs 20, by nature, occur at discrete height intervals, a successful footstep FS means that a cluster Cl at or near that footstep height is correct; resulting in the detector 210*b* significantly increasing the confidence associated with the cluster Cl. For example, with a first footstep FS, $FS_1$ at a first stair 20, 20*a* and a second footstep FS, $FS_2$ at a second stair 20, 20*b,* the detector 210*b* may determine a height interval between the first stair 20*a* and the second stair 20*b* and apply this interval to the clusters Cl to update the cluster confidences. For instance, the detector 210*b* increases the cluster confidence for a cluster Cl that exists at a height that is an integer multiple of the height interval between the first stair 20*a* and the second stair 20*b*. In some examples, the detector 210*b* only increases the confidence for a cluster Cl when the cluster Cl occurs at or near a location where the robot 100 successfully steps on a stair 20 of the staircase.

Figure 2T:
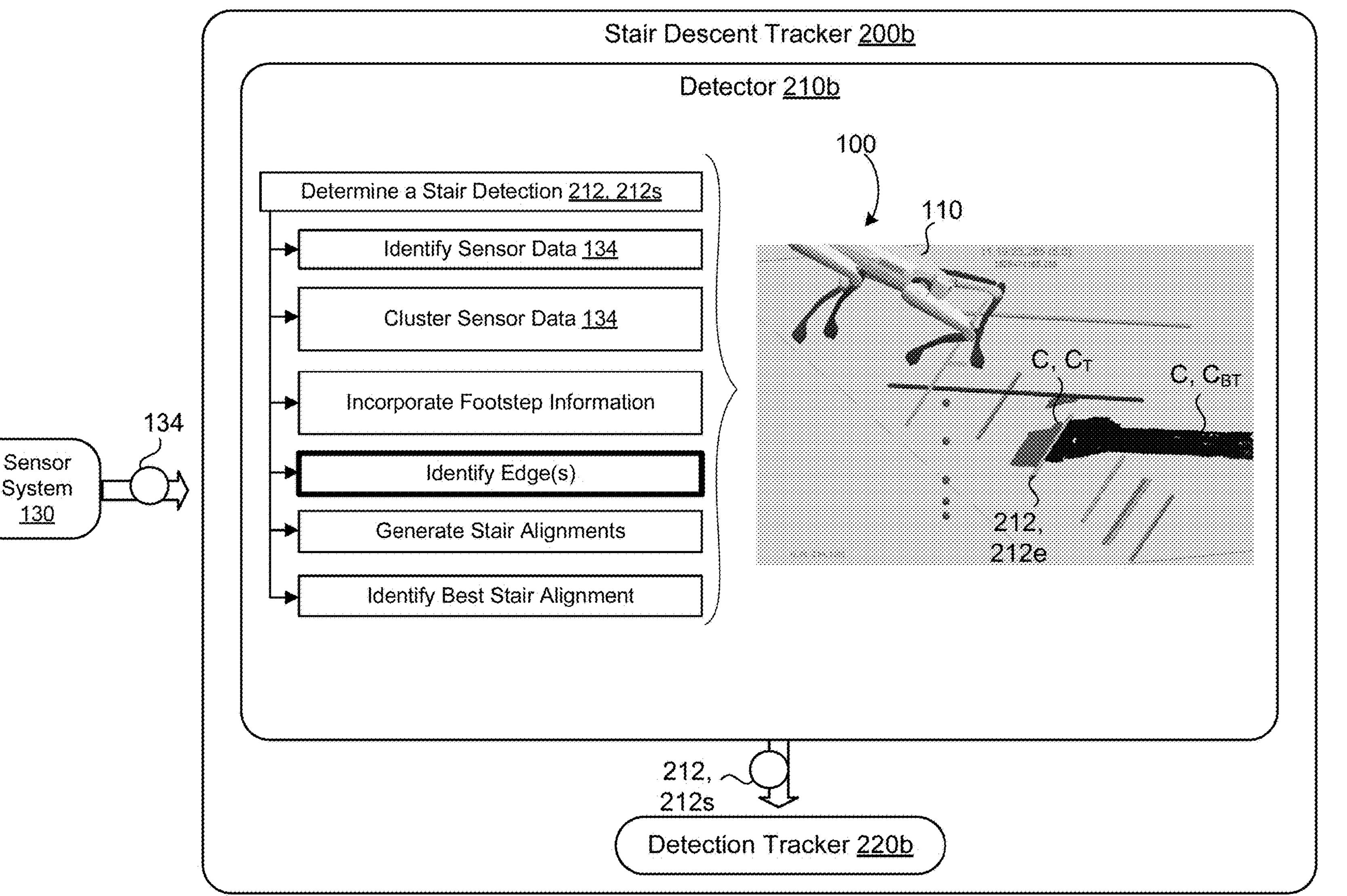

When detecting stair features, the detector 210*b* may detect an edge 26 of a single stair 20 as a detected features 212 much like it detected the floor edge 26*f*. In other words, the detector 210*b* may classify sensor data 134 or clusters Cl of sensor data 134 as a stair tread C, $C_T$ (like a floor classification $C_F$) and below the stair tread C, $C_{BT}$ (like a below floor classification $C_{BF}$). Here, FIG. 2T illustrates sensor data 134 that has been classified as a stair tread classification $C_T$ and a below the stair tread classification $C_{BT}$. Based on the classifications of sensor data 134 related to a tread 22 of a stair 20, the detector 210*b* may be configured to perform a one-dimensional search or a two dimensional search (e.g., like the detection of the floor edge) of the classified sensor data to detect the edge 26 of a stair 20. When the detector 210*b* performs a one dimensional search, the detector 210*b* searches the one dimensional height information for the sensor data 134 and assumes that the edge 26 is parallel to the detected floor edge 212, 212*e* previously confirmed by the detection and tracking process of the stair descent tracker 200*b* when the robot 100 initially approached the descending stairs 20. By performing a two-dimensional search and edge detection, unlike a one-dimensional search, the detector 210*b* may be able to detect a curved set of stairs 20 with edges 26 that are not necessarily parallel to other edges 26 of stairs 20 within the staircase. In some configurations, the detector 210*b* uses a multi-modal or hybrid search approach where the detector 210*b* first attempts to generate a detected edge 212, 212*e* for a stair 20 based on a two-dimensional search, but reverts to the one-dimensional search if the sensor data 134 is an issue or if the detector 210*b* determines that its confidence for a detected edge 212*e* of the two-dimensional search does not satisfy a search confidence threshold.

One of the differences between ascent and descent is that descent has to often deal with poor sensor data 134 due to the repeating nature of a set of stairs 20. Quite frequently, the sensor data 134 on, or prior to, descent may be consistently poor over time and with changes in space. Due to a high likelihood of poor sensor data 134, the detector 210*b* is configured to assume that some of the height clusters Cl correspond to real stairs 20 of the staircase and others do not; while there also may be stairs 20 in the actual staircase that do not correspond to any cluster Cl of sensor data 134. Based on these assumptions, the detector 210*b* generates all possible stair alignments AL for the clusters Cl identified by the detector 210*b*. Here, a stair alignment AL refers to a potential sequence of stairs 20 where each stair 20 of the sequence is at a particular height interval that may correspond to an identified cluster CL. When generating all possible stair alignments AL, the detector 210*b* may insert or remove potential stairs from the stair alignment AL.

Figure 2U:
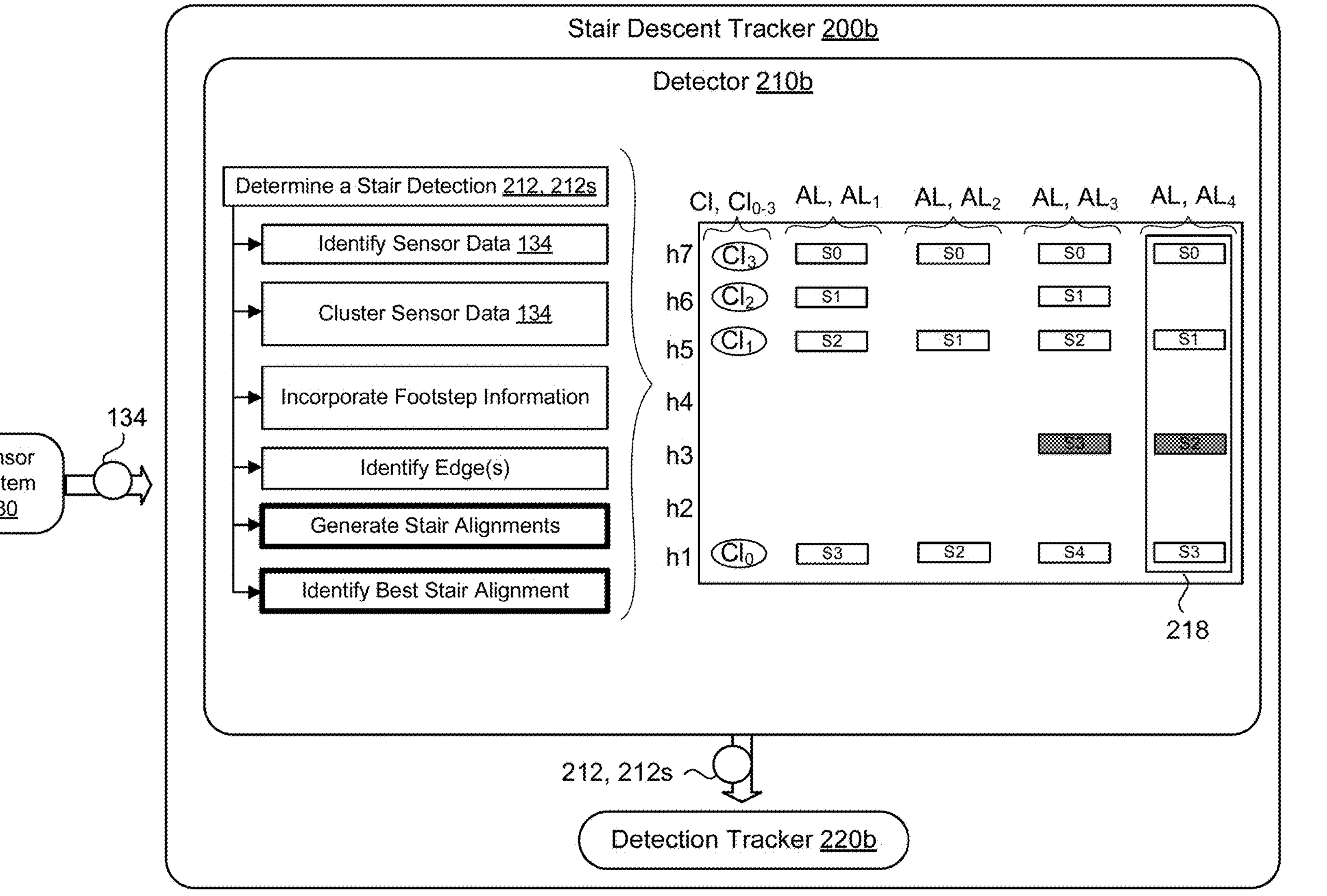

To illustrate, FIG. 2U depicts that the detector 210*b* identified four clusters Cl, $Cl_{0-3}$. Here, there is a large height gap between a first cluster $C_0$ and a second cluster $C_1$. As such, the detector 210*b* generates alignments AL where a potential stair (e.g., depicted as S) is located at some height between the first cluster $C_0$ and the second cluster $C_1$ (e.g., potential stairs shown at a third height h3). When evaluating all of the possible alignments AL, the detector 210*b* may determine whether the potential stairs within an alignment AL occur at height intervals with uniform spacing reflective of an actual staircase. In this example, a first alignment AL, $AL_1$ with a potential stair at each identified cluster Cl fails to have uniform spacing between potential stairs corresponding to the first cluster $CL_0$ and the second cluster $CL_1$. A second alignment AL, $AL_2$ does not include a potential stair corresponding to the third cluster C, $C_2$, but the sequence of potential stairs in this second alignment $AL_2$ still fails to have a uniform spacing between each potential stair due to the large height gap between the first height h1 and a fifth height h5. For a third alignment AL, $AL_3$, the detector 210*b* generates a potential stair in the gap between the first cluster $C_0$ and the second cluster $C_1$ at the third height h3, but this third alignment $AL_3$ also fails to have a uniform spacing between each potential stair. For instance, the potential stair at a sixth height h6 has a different spacing between neighboring stairs compared to the potential stair at the third height h3. In a fourth alignment AL, $AL_4$ generated by the detector 210*b,* the detector 210*b* does not associate a potential stair with the third cluster CL, $CL_2$ and also generates a potential stair at the third height h3. Here, this sequence of potential stairs does have uniform spacing and, as such, the detector 210*b* determines that the fourth alignment $AL_4$ is the best stair alignment candidate 218 (e.g., as shown by the box around this alignment sequence). In some configurations, the detector 210*b* scores each of the alignments AL and selects the alignment AL with the best score (e.g., highest or lowest score depending on the scoring system) as the best stair alignment candidate 218. In these configurations, the score may incorporate other detection or tracking based information such as cluster confidence, an amount of points forming a cluster, and/or stair detections previously tracked and confirmed.

Although FIGS. 2R-2U illustrate a process for the detector 210*b* to detect more than one stair 20, the detector 210 may identify stair features (e.g., edges 26) intermittently during this multi-stair detection process. When this occurs, these detected features 212 may be passed to the detection tracker 220*b* and subsequently incorporated within the stair model 202. Additionally or alternatively, different operations performed by this multi-stair detection process may be modified or eliminated, but still result in a detected feature 212 by the detector 210*b*. For instance, the process occurs to detect a single stair 20 or a portion of a stair 20. In another example, the detector 210*b* does not utilize footstep information FS.

Figure 3A:
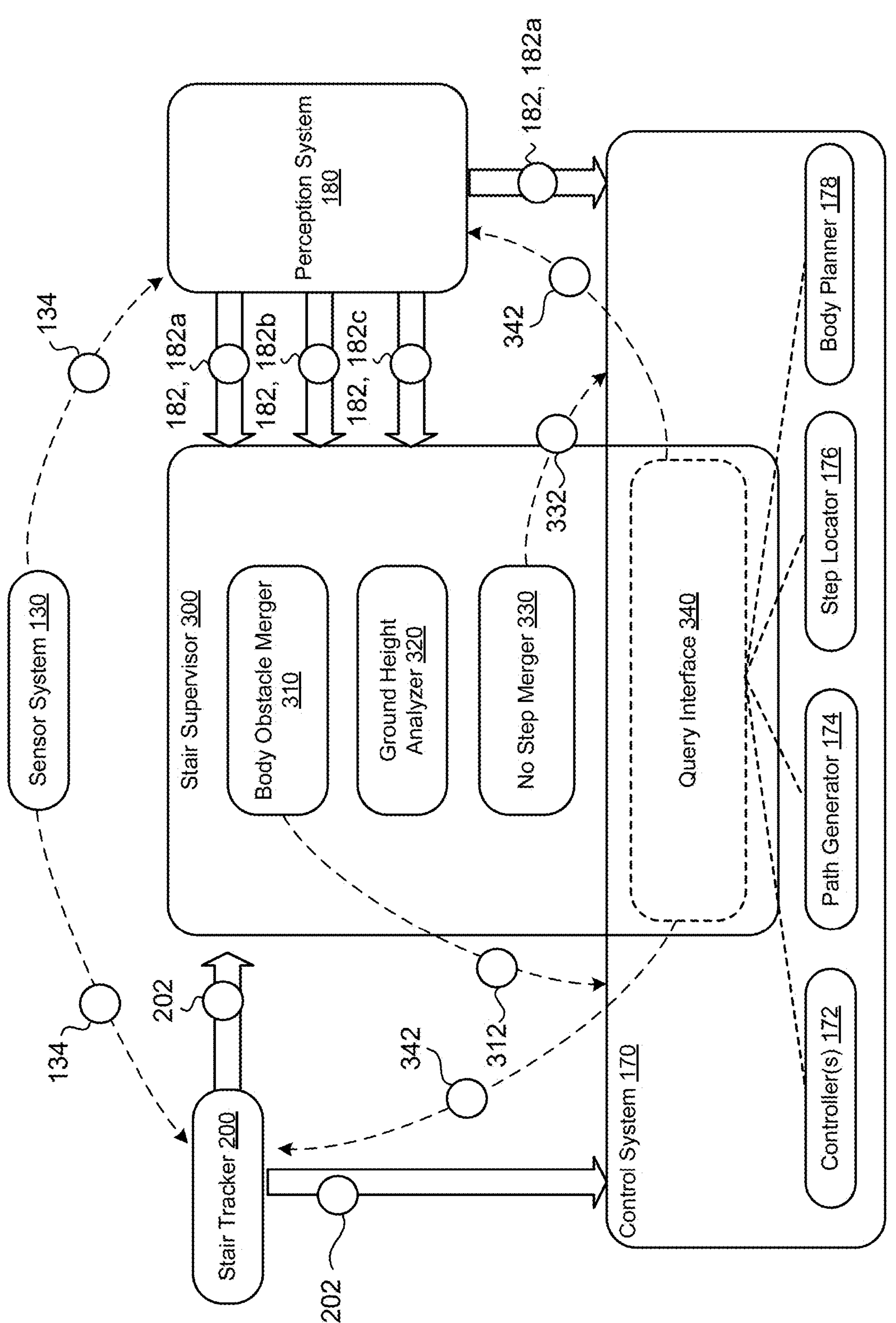
FIGS. 3A-3E are schematic views of example stair supervisors for the robot of FIG. 1A.

Referring to FIGS. 3A-3E, in some implementations, the robot 100 includes a stair supervisor 300. Systems of the robot 100 may be able to handle stair traversal in a few different ways. For instance, the robot 100 may navigate stairs 20 according to the perception system 180, the stair tracker 200 (e.g., in a stair mode), or using the perception system 180 in combination with the stair tracker 200. Due to these options, the stair supervisor 300 is configured to govern which of these approaches to use and/or when to use them in order to optimize navigation and operation of the robot 100. Here, use of the stair supervisor 300 may also help minimize particular weaknesses of implementing one option versus another by performing merging operations between maps 182 from the perception system 180 and the stair model 202 from the stair tracker 200. Generally speaking, the stair supervisor 300 includes a body obstacle merger 310, a no step merger 330, a ground height analyzer 320, and a query interface 340. In some configurations, one or more of the functions of the stair supervisor 300 may be performed in other systems of the robot 100. For instance, FIG. 3A depicts the query interface 340 as a dotted box within the control system 170 because its functionality may be incorporated into the control system 170.

With continued reference to FIG. 3A, in some configurations, the stair supervisor 300 is in communication with the control system 170, the perception system 180, and the stair tracker 200. The stair supervisor 300 receives maps 182 from perception system 180 and the stair model 202 from the stair tracker 200. With these inputs, the stair supervisor 300 advises when the control system 170 should use information from the stair tracker 200, information from the perception system 180, or some combination of both to navigate stairs 20. For instance, each merger component 310, 330 of the stair supervisor 300 may be configured to merge aspects of the stair model 202 with one or more maps 182 of the perception system 180 (e.g., forming an enhanced staircase model or enhanced perception map). In some examples, the stair supervisor 300 communicates a resulting merged map to the control system 170 to enable the control system 170 to control operation of the robot 100 based on one or more of these merged maps (e.g., enhanced no step map 332 and/or the enhanced body obstacle map 312). In addition to receiving these merged maps, the control system 170 may also receive the staircase model 202 and the ground height map 182*a* unmodified from the stair tracker 200 and the perception system 180 respectively.

Figure 3B:
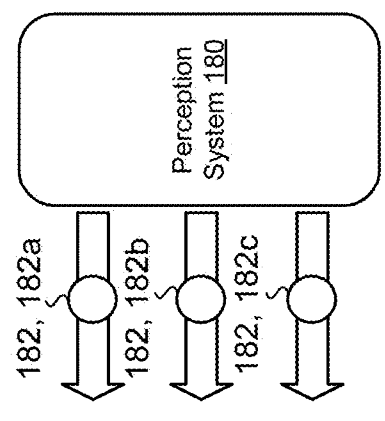
Figure 3B:
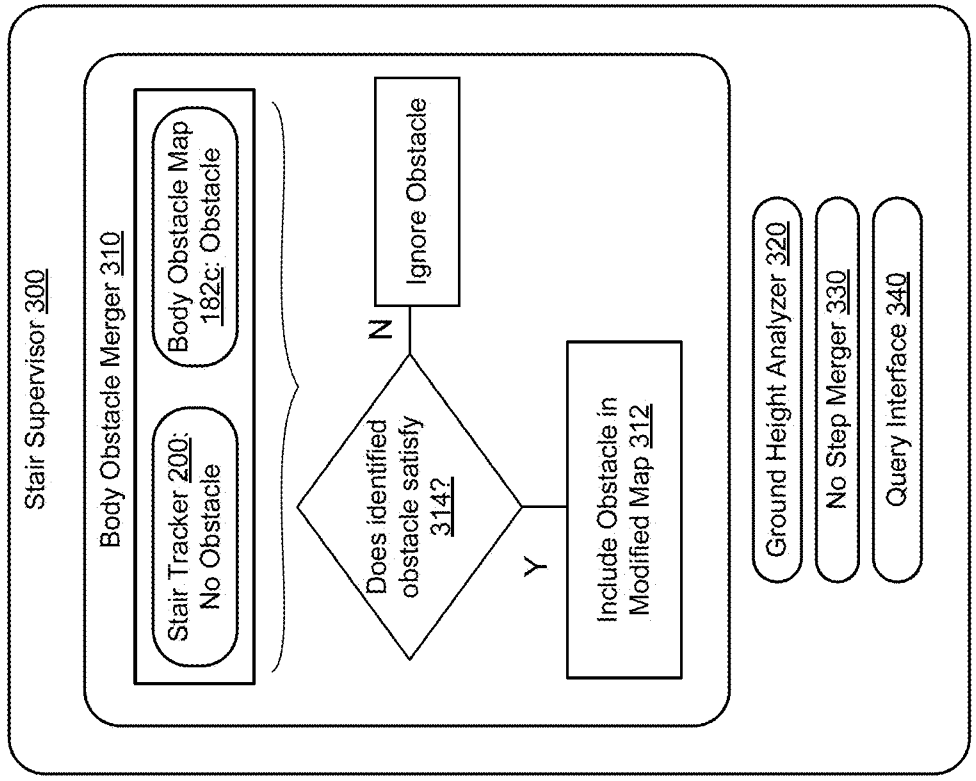
Figure 3B:
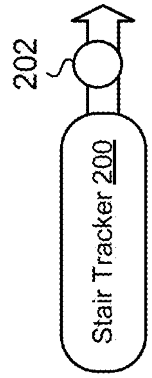

Referring to FIG. 3B, in some examples, the body obstacle merger 310 of the stair supervisor 300 is configured to merge the body obstacle map 182*c* and the staircase model 202 into an enhanced body obstacle map 312. When merging the body obstacle map 182*c* and the staircase model 202, the body obstacle merger 310 may identify that at a position in a staircase, the staircase model 200 does not indicate the existence of an obstacle while the body obstacle map 182*c* disagrees and indicates an obstacle. Here, the obstacle identified by the body obstacle map 182*c* may be incorporated into the enhanced body obstacle map 312 when the identified obstacle satisfies particular criteria 314. When the criteria 314 is not satisfied, the obstacle is not included in the enhanced body obstacle map 312. In this scenario, the concern is that something is on the staircase that is not part of the staircase model 202 and should be avoided during navigation. In some examples, the criteria 314 corresponds to a confidence of the perception system 180 that the obstacle that exists on the stairs 20 satisfies a confidence threshold. In these examples, the confidence threshold may correspond to a confidence that is above average or exceeds a normal level of confidence. In some configurations, the criteria 314 requires that the identified obstacle exist at a particular height with respect to the staircase to indicate that the identified obstacle most likely exists on the staircase. By setting the criteria 314 to require that the identified obstacle be present at a certain height (e.g., a threshold obstacle height), the criteria 314 tries to avoid situations where the perception system 180 is partially viewing the stairs 20 and classifying the stairs 20 themselves incorrectly as obstacles. The threshold obstacle height may be configured at some offset distance from the heights of the stairs 20 of the staircase. Some other examples of criteria 314 include how many point cloud points have been identified as corresponding to the obstacle, how dense is the sensor data 134 for the obstacle, and/or whether other characteristics within the obstacle resemble noise or solid objects (e.g., fill rate).

When the perception system 180 identifies a discrepancy between its perception (i.e., mapping) and the staircase model 202 of the stair tracker 200, this discrepancy is generally ignored if the robot 100 is engaged in a grated floors mode. Here, grated floors may cause issues for the sensor(s) 132 of the robot and thus impact perceptions by the perception system 180. Therefore, if the robot 100 is actively engaged in the grated floors mode, the stair supervisor 300 is configured to trust identifications by the stair tracker 200 rather than the perception system 180 because the stair tracker 200 has been designed specifically for scenarios with poor sensor data 134 such as grated floors.

Figure 3C:
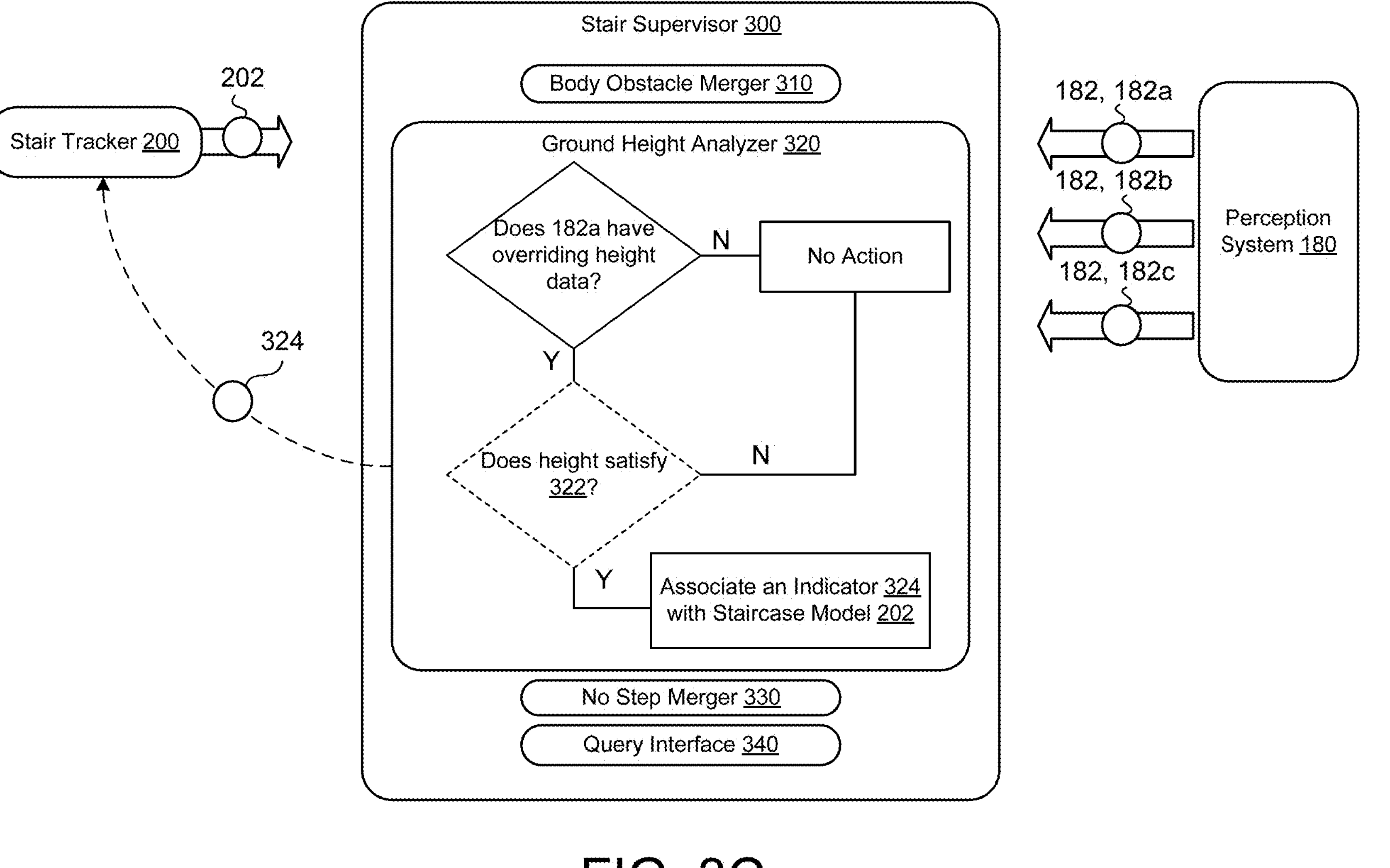

Referring to FIG. 3C, in some configurations, the ground height analyzer 320 of the stair supervisor 300 is configured to identify locations in the staircase model 202 that should be overridden by height data of the ground height map 182*a*. To identify these locations, the analyzer 320 receives the ground height map 182*a* and searches the ground height map 182*a* at or near the location of the staircase within the map 182*a* to determine whether a height for a segment of the ground height map 182*a* exceeds a height of the staircase in a corresponding location. In some examples, the ground height analyzer 330 includes a height threshold 322 or other form of criteria 322 (e.g., similar to the criteria 314 of the body obstacle merger 310) such that the ground height analyzer 320 determines that a height within the ground height map 182*a* satisfies the height threshold 322 or other form of criteria 322. In some configurations, when the analyzer 320 identifies a location in the staircase model 202 that should be overridden by height data from the ground height map 182*a*, the analyzer 320 generates an indicator 324 and associates this indicator 324 with the staircase model 202 to indicate that that the staircase model 202 is overridden in that particular location. In some examples, rather than generating an indicator 324 for the particular location within the staircase model 202, the analyzer 320 associates the indicator with a stair 20 of the staircase model 202 that includes the location. Here, the indicator 324 may not include how the staircase model 202 is overridden (e.g., at what height to override the staircase model 202), but simply that the model 202 is in fact overridden (e.g., at some location on a particular stair 20). This indication may function such that the query interface 340 does not need to query both the ground height map 182*a* and the staircase model 202 whenever it wants to know information about a location. Rather, the query interface 340 may query only the staircase model 202 and, in a minority of instances, be told an override exists; thus having to subsequently query the ground height map 182*a*. In some implementations, when the analyzer 320 determines a location within the staircase model 202 that should be overridden by height data of the ground height map 182*a*, the analyzer 320 dilates the feature at this location in order to include a safety tolerance around the precise location of the object/obstacle corresponding to the height data.

Figure 3D:
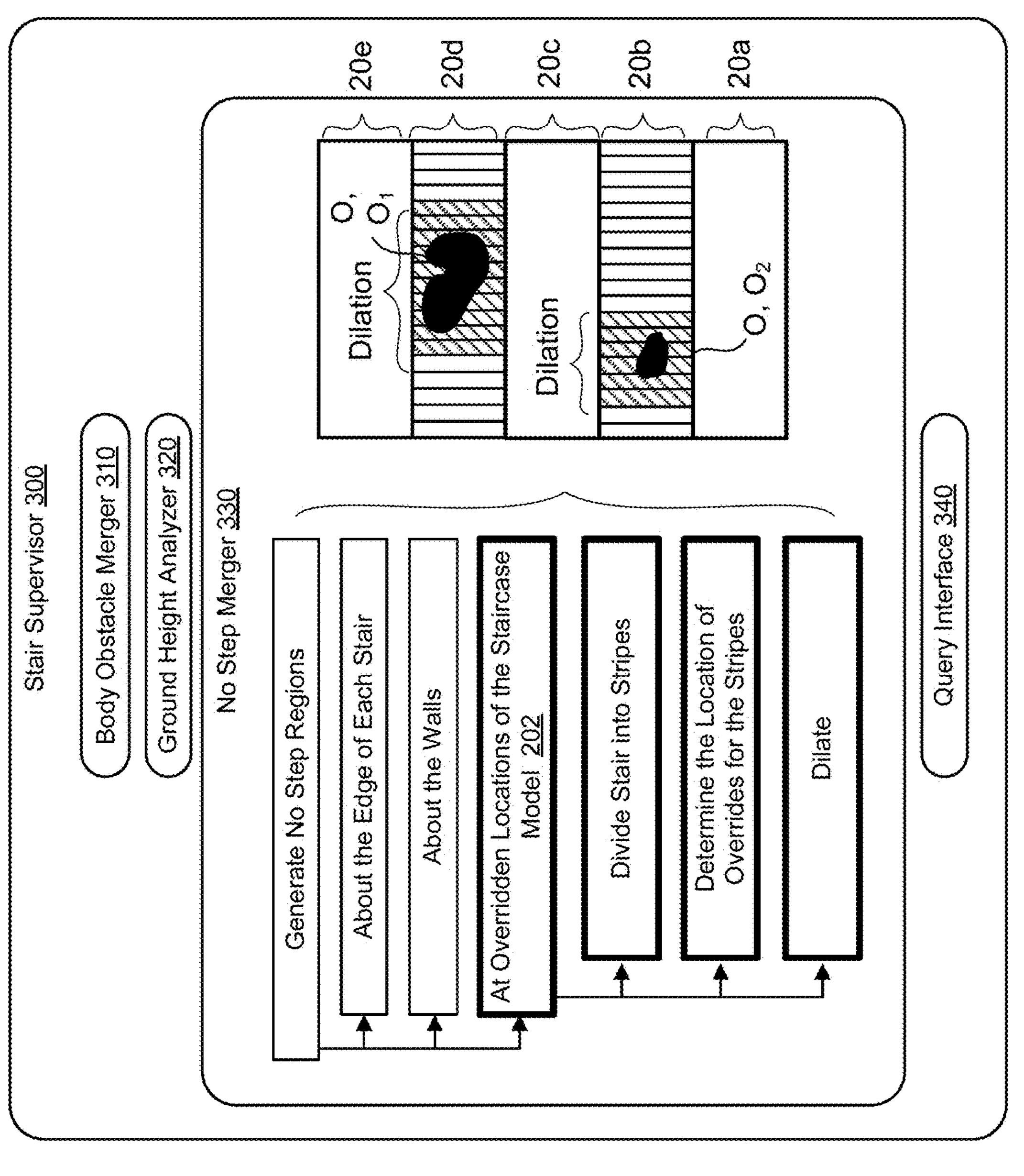

Referring to FIG. 3D, in some examples, the no step merger 330 of the stair supervisor 300 is configured to merge the no step map 182*b* and the staircase model 202 to form a modified no step map 332 (FIG. 3A). To form the modified no step map 332, the no step merger 330 generates no step regions in the modified no step map 332 corresponding to areas near some features of the staircase model 202. For instance, the no step merger 330 generates no step regions in the modified step map 332 for a particular distance above and below an edge 26 of each stair 20 as well as no step regions within a particular distance of a wall 28.

Additionally, the no step merger 330 generates no step regions in the modified step map 332 at locations where the staircase model 202 was overridden by the ground height map 182*a*. For example, the no step merger 330 identifies each stair 20 of the staircase model 202 that corresponds to an override O. Based on this determination, the no step merger 330 divides each identified stair 20 into segments or stripes (e.g., vertical columns of a designated width) and determines which stripes include the override O. For example, FIG. 3D illustrates a second stair 20, 20*b* and a fourth stair 20*d* of five stairs 20, 20*a-e* each having an override O (e.g., a first override O, $O_1$ and a second override O, $O_2$)). Each stripe having an override O may then be designated by the no step merger 330 as a no step region. In some examples, the no step merger 330 dilates the no step regions to as a tolerance or buffer to ensure that neither the feet 124 of the robot 100 nor any other part of the structure of the robot 100 accidently collides with the object.

Figure 3E:
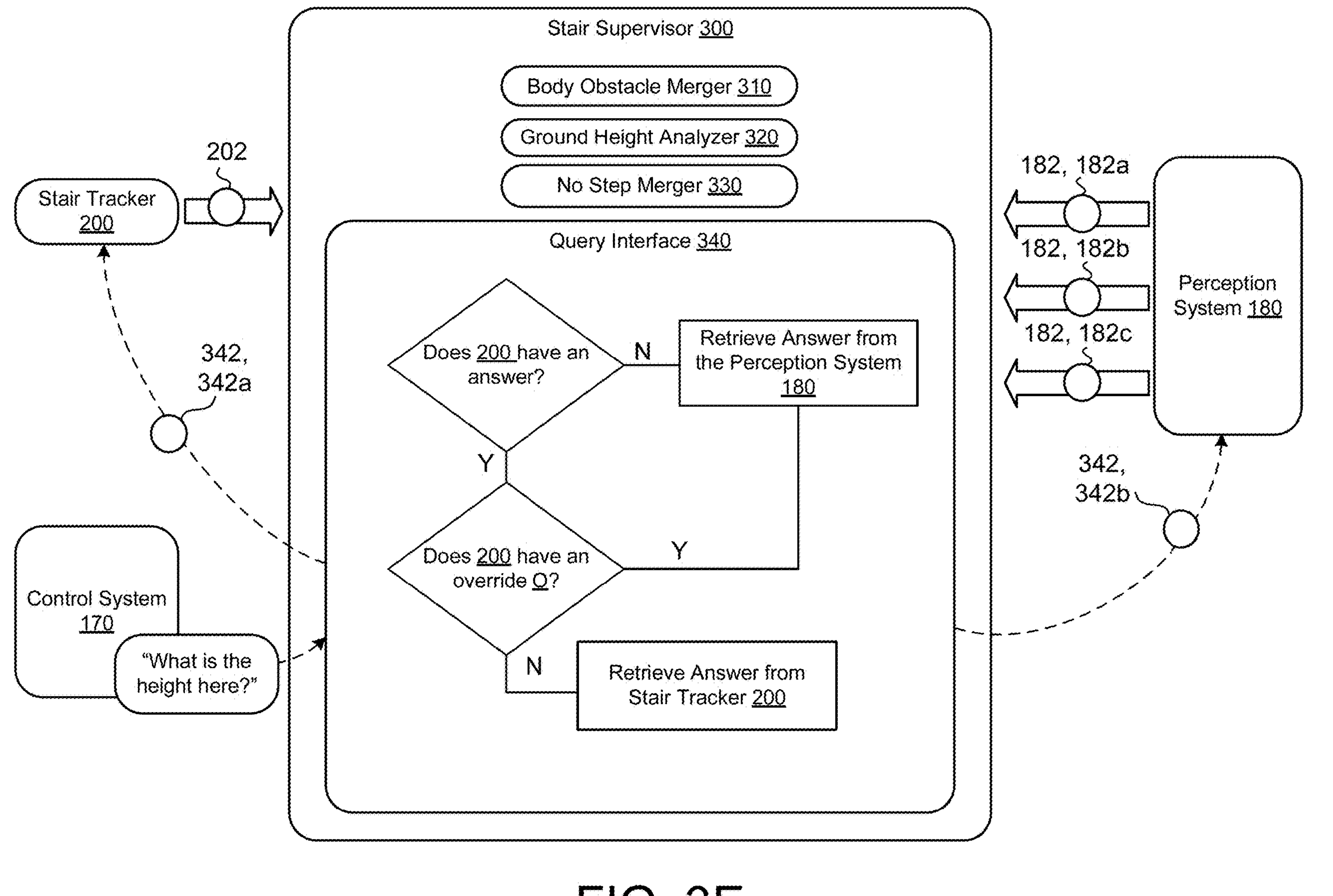

In some implementations, such as FIG. 3E, the query interface 340 interfaces between the control system 170, the perception system 180, and the stair tracker 200. For instance, a controller 172 (FIG. 1B) of the control system 170 may ask the query interface 340 what the height is at a particular location on a stair 20. The query interface 340 in turn communicates a first query 342, 342*a* to the stair tracker 200 inquiring whether the stair tracker 200 has answer for the height at the particular location on the stairs 20 (i.e., whether the staircase model 202 has an answer). Here, the stair tracker 200 may respond no, yes, or yes, but an override O exists for that stair 20. When the stair tracker 200 responds with a no, the query interface 340 queries 342, 342*b*the perception system 180 for the height at the particular location on the stairs 20 since the perception system 180 as the default navigation system will inherently have an answer. When the stair tracker 200 responds yes, the stair tracker 200 returns a response with the height at the particular location on the stairs. When the stair tracker 200 informs the query interface 340 that an override O exists on that particular stair 20, the query interface 340 sends a second query 342, 342*b* to the perception system 180 to identify whether the stair tracker 200 is overridden at the particular location on the stair 20. When the answer to this second query 342*b* is yes, the query interface 340 requests the height from the perception system 180. When the answer to this second query 342*b* is no, the query interface 340 may return to the stair tracker 200 to retrieve the height location. In some examples, the stair tracker 200 is configured to respond yes or no. In these examples, when the stair tracker 200 responds in the affirmative, the query interface 340 further refines the query 342*a* to ask whether an override O exists for the stair 20 that includes the particular location.

In some configurations, an operator or user of the robot 100 commands or activates a stairs mode for the robot 100. When the robot 100 is in the stairs mode, the stair tracker 200 becomes active (i.e., from an inactive state). With an active stair tracker 200, the stair supervisor 300 may perform its functionality as a set of stairs 20 within the environment becomes detected and tracked. In some implementations, stair tracker 200 is always active (i.e., does not have to become active from an inactive state) and the always active stair tracker 200 determines whether the robot 100 should enter the stairs mode (e.g., utilizing the stair supervisor 300).

When the stair tracker 200 is active, the robot 100 may be constrained as to its speed of travel. In some examples, the speed of the robot 100 is constrained to be a function of the average slope or actual slope of a detected staircase. In some implementations, an active stair tracker 200 enables the robot 100 to select a speed limit to match the robot's stride length to a step length for a detected staircase (e.g., generating one footstep per stair step). For example, when stair tracker 200 is active, the control system 170 may be configured to select a controller 172 with a cadence to achieve one footstep per stair step. Additionally or alternatively, when the stair tracker 200 is active, the stair tracker 200 may have an associated specialty stair controller that has been optimized for aspects of speed, cadence, stride length, etc.

In some examples, the robot 100 engages in obstacle avoidance tuning when the stair tracker 200 is active. For example, when the stair tracker 200 indicates the robot 100 is actually on the staircase, the robot 100 may change the manner in which it performs obstacle avoidance. When an obstacle constraint exists, obstacle avoidance generally occurs based on a straight line along the border of the obstacle. Here, the orientation of this straight line may be significant, especially in a potentially constrained environment such as a staircase. Therefore, when the stair tracker 200 is active and an obstacle on a staircase seems similar to a wall of the staircase, the robot 100 may redefine the orientation for the wall obstacle as parallel to the direction of the staircase (i.e., much like a staircase wall is typically parallel to the direction of the staircase). This makes obstacle avoidance a little bit easier on the stairs 20.

In some implementations, when the stair tracker 200 is active, the stair tracker 200 applies or causes the application of stair-specific step-planner constraints. For instance, the step-planner constraints correspond to a soft constraint that tries to prevent the robot 100 from stepping up or down more than one stair 20 at a time relative to a contralateral leg 120. Here, a soft constraint refers to a constraint that the robot 100 is urged to obey, but is allowed to violate in extreme or significant conditions (e.g., to satisfy a hard constraint). Another form of step-planner constraints may be constraints that identify when it is too late to switch the touchdown location at a given stair 20. With the simplified geometry of a staircase, the systems of the robot 100 may compute when it is too late to switch a stair touchdown location. To perform this analysis, the robot 100 may use four potential constraints bounding the edges of a stair 20 above and a stair 20 below the current position for a foot 124 of a swing leg $\mathbf{120}_{SW}$. At every time step, the robot 100 checks if the swing leg $\mathbf{120}_{SW}$ is able to clear these four potential constraints based on the current position and velocity of the swing leg $\mathbf{120}_{SW}$ in conjunction with how much time is remaining before touchdown. If, at a particular time step, it is not possible to clear these four potential constraints, the robot 100 introduces a hard constraint defining that it is too late to change the stair touchdown location.

Optionally, when the stair tracker 200 is active, the control systems 170 of the robot 100 may provide a form of lane assist such that the robot 100 traverses the center of the staircase. While an operator of the robot 100 uses a remote controller (e.g., with a joystick) to drive the robot 100, the lane assist feature may function to automatically drive the robot 100 towards the center of the staircase; eliminating some form of potential operator error. However, with lane assist, if the operator is actually supplying an input that drives the robot away from the center, the lane assist yields to these manual controls. For instance, the lane assist feature turns off completely when the user command is in opposition to the lane assist function.

Stair tracker 200 may also help prevent cliff scraping that occurs when a swing leg $\mathbf{120}_{SW}$ contacts an edge 26 of a stair 20. For example, using solely the perception system 180, the geometry for stairs 20 is rather complex because the perception system 180 uses blocks in three centimeter resolution. When using stair tracker 200 predominantly or in combination with the perception system 180, the stair geometry may be simplified such that control of the swing leg $\mathbf{120}_{SW}$ lifting over a rise 24 and an edge 26 of a stair 20 may be achieved at a threshold distance from the edge 26 of the stair 20 to prevent cliff scraping.

Figure 4:
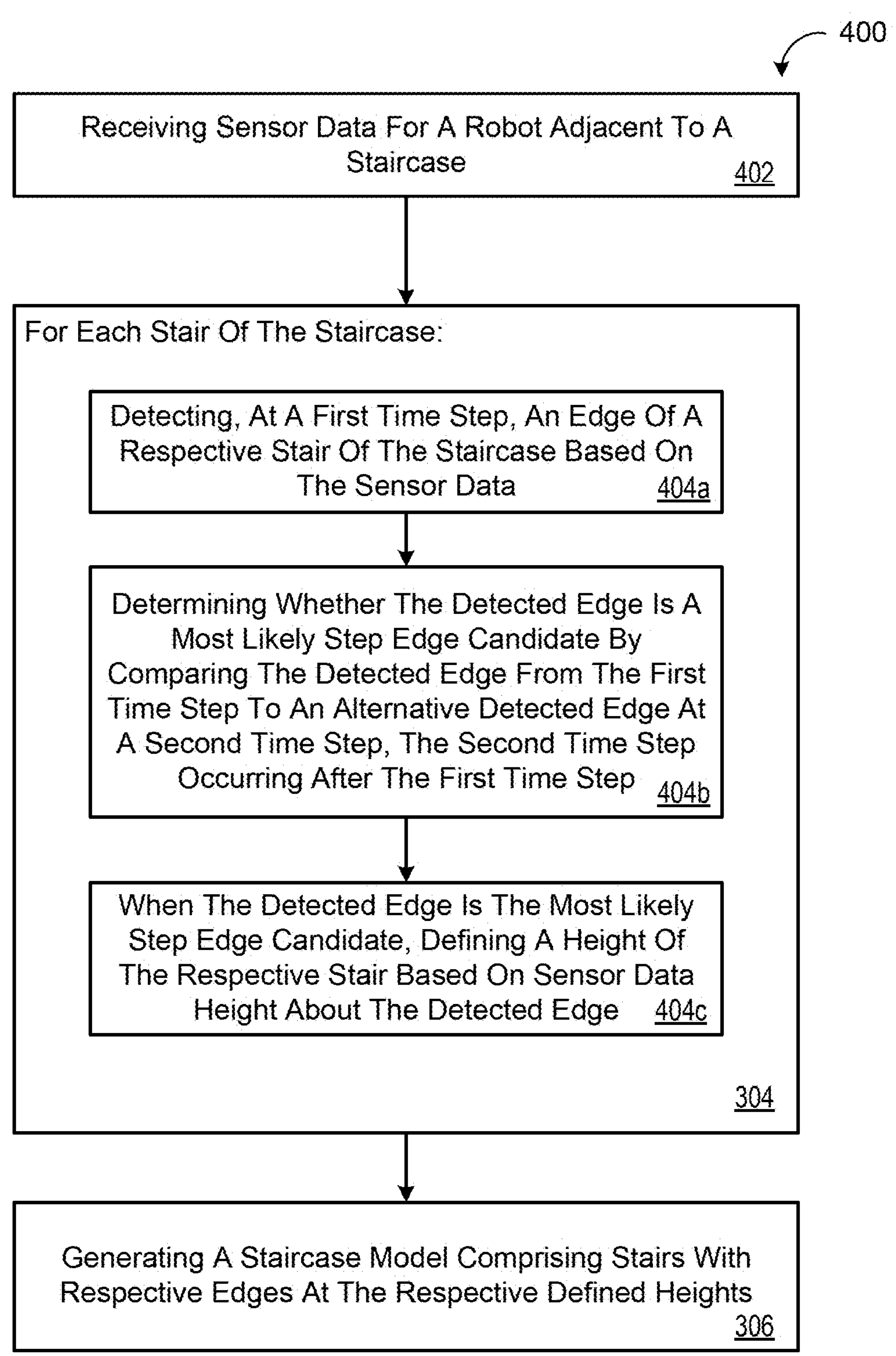
FIG. 4 is a flow chart of an example arrangement of operations for a method of generating a staircase model.

FIG. 4 is a flow chart of an example arrangement of operations for a method of generating a staircase model. At operation 402, the method 400 receives sensor data 134 for a robot 100 adjacent to a staircase 20. For each stair 20 of the staircase 20, the method 400 performs operations *404a-c*. At operation *404a*, the method 400 detects, at a first time step $t_i$, an edge 26 of a respective stair 20 based on the sensor data 134. At operation *404b*, the method 400 determines whether the detected edge 212 is a most likely step edge candidate 222 by comparing the detected edge 212 from the first time step $t_i$ to an alternative detected edge 224 at a second time step $t_{i+1}$. Here, the second time step $t_{i+1}$ occurs after the first time step $t_i$. At operation *404c*, when the detected edge 212 is the most likely step edge candidate 222, the method 400 defines a height of the respective stair 20 based on sensor data height about the detected edge 212. At operation 406, the method 400 generates a staircase model 202 including stairs 20 with respective edges 26 at the respective defined heights.

Figure 5:
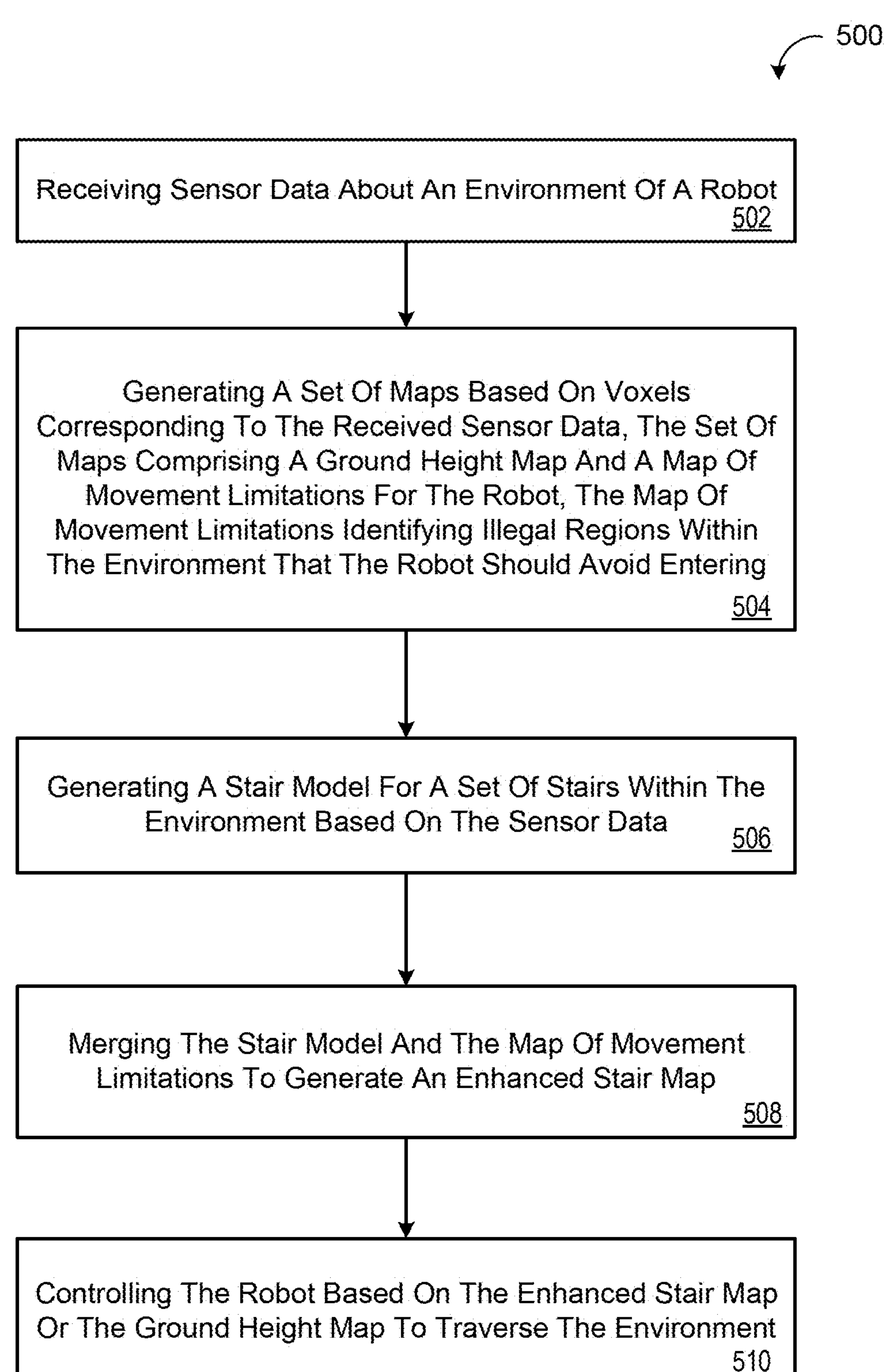
FIG. 5 is a flow chart of an example arrangement of operations for a method of controlling a robot based on fused modeled and perceived terrain.

FIG. 5 is a flow chart of an example arrangement of operations for a method of controlling a robot based on fused modeled and perceived terrain. At operation 502, the method 500 receives sensor data 134 about an environment 10 of the robot 100. At operation 504, the method 500 generates a set of maps 182 based on voxels corresponding to the received sensor data 134. The set of maps 182 including a ground height map *182a* and a map of movement limitations 182 for the robot 100. The map of movement limitations 182 identifying illegal regions within the environment 10 that the robot 100 should avoid entering. At operation 506, the method 500 generates a stair model 202 for a set of stairs 20 within the environment 10 based on the sensor data 134. At operation 508, the method 500 merges the stair model 202 and the map of the movement limitations 182 to generate an enhanced stair map. At operation 510, the method 500 controls the robot 100 based on the enhanced stair map or the ground height map *182a* to traverse the environment 10.

Figure 6:
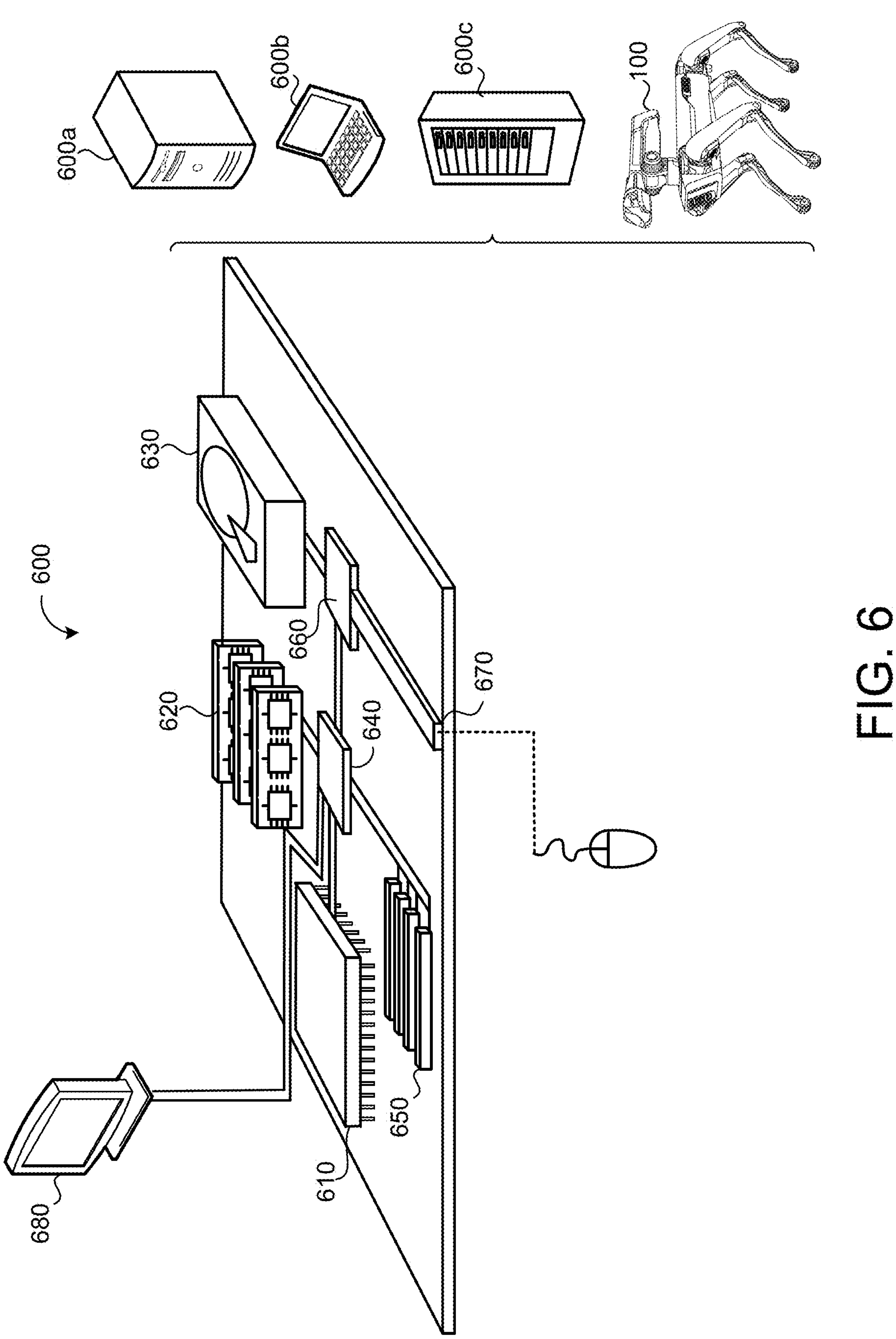
FIG. 6 is a schematic view of an example computing device that may be used to implement the systems and methods described herein.

FIG. 6 is schematic view of an example computing device 600 that may be used to implement the systems (e.g., the control system 170, the perception system 180, the stair tracker 200, and the stair supervisor 300) and methods (e.g., the method 400, 500) described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (e.g., data processing hardware), memory 620 (e.g., memory hardware), a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, as part of a rack server system 600*c*, or as the robot 100.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A four-legged robot, the four-legged robot comprising:
four legs;
memory storing computer-executable instructions; and
a processor in communication with the memory, wherein the processor is configured to execute the computer-executable instructions, wherein execution of the computer-executable instructions causes the processor to:
receive data associated with a stair located within an environment of the four-legged robot;
identify that the stair is located within the environment based on the data associated with the stair, wherein the data associated with the stair indicates one or more identifications of the stair by the four-legged robot using image data or identification of an entry into a stair mode from a non-stair mode associated with traversal of the environment based on a speed of the four-legged robot;

determine a modified speed of the four-legged robot at which to traverse a set of stairs including the stair in response to the one or more identifications of the stair by the four-legged robot using the image data or the identification of the entry into the stair mode from the non-stair mode; and subsequent to determining the modified speed, instruct the four-legged robot to navigate to a footstep location in a non-stair portion of the environment and traverse, at the modified speed, the set of stairs from the footstep location in the non-stair portion of the environment.

2. The four-legged robot of claim 1, wherein the processor and the computer-executable instructions are configured to modify the speed of the four-legged robot by adjusting a speed limit of the four-legged robot.

3. The four-legged robot of claim 1, wherein the data associated with the stair comprises sensor data from one or more sensors of the four-legged robot, the sensor data corresponding to the environment.

4. The four-legged robot of claim 1, wherein the processor and the computer-executable instructions are configured to receive the data associated with the stair from a user computing device, wherein the data associated with the stair indicates the identification of the entry into the stair mode.

5. The four-legged robot of claim 1, wherein the processor and the computer-executable instructions are configured to modify the speed of the four-legged robot by adjusting the speed from a first speed to the modified speed, wherein the four-legged robot is configured to utilize the modified speed for traversal of the set of stairs and the first speed for traversal of the non-stair portion of the environment.

6. The four-legged robot of claim 1, wherein the processor and the computer-executable instructions are configured to instruct the four-legged robot to traverse the set of stairs by controlling the four-legged robot to descend the set of stairs such that a back portion of the four-legged robot precedes a front portion of the four-legged robot down the set of stairs, wherein the back portion is associated with fewer sensors as compared to the front portion.

7. The four-legged robot of claim 6, wherein the four legs are associated with one or more knee joints configured to extend the four legs from a closed position to an open position where segments of the four legs form openings facing away from the back portion and toward the front portion.

8. The four-legged robot of claim 1, wherein the processor and the computer-executable instructions are configured to modify the speed by switching from a first speed of the four-legged robot to the modified speed.

9. The four-legged robot of claim 8, wherein the four-legged robot is configured to traverse the non-stair portion of the environment according to the first speed.

10. The four-legged robot of claim 1, wherein the modified speed is based on a slope associated with the stair.

11. A legged robot, the legged robot comprising:

two or more legs;

one or more sensors; and a control system, the control system comprising data processing hardware and memory hardware in communication with the data processing hardware, the memory hardware storing instructions, wherein execution of the instructions by the data processing hardware causes the data processing hardware to:

receive image data from the one or more sensors, the image data corresponding to an environment with a stair, wherein the legged robot traverses the environment based on a speed of the legged robot;

identify the stair based on the image data;

determine a modified speed of the legged robot at which to traverse a set of stairs including the stair in response to identifying the stair based on the image data; and subsequent to determining the modified speed, instruct the legged robot to navigate to a footstep location in a non-stair portion of the environment and traverse, at the modified speed, the set of stairs from the footstep location in the non-stair portion of the environment.

12. The legged robot of claim 11, wherein the execution of the instructions by the data processing hardware causes the data processing hardware to enter a stair mode based on identifying the stair.

13. The legged robot of claim 11, wherein the execution of the instructions by the data processing hardware causes the data processing hardware to:

receive a command to activate a stair mode of the legged robot; and enter the stair mode based on the command, wherein identifying the stair is further based on entering the stair mode.

14. The legged robot of claim 11, wherein the execution of the instructions by the data processing hardware causes the data processing hardware:

detect an edge of the stair based on the image data; and define a height of the stair based on the edge of the stair, wherein instructing the legged robot to traverse the set of stairs is further based on the height of the stair.

15. The legged robot of claim 11, wherein the execution of the instructions by the data processing hardware causes the data processing hardware:

determine a rise of the stair; and determine a run of the stair, wherein the modified speed is based on the rise of the stair and the run of the stair.

16. A method comprising:

receiving, at data processing hardware, data identifying an entry into a stair mode of a four-legged robot from a non-stair mode of the four-legged robot, wherein the four-legged robot traverses an environment of the four-legged robot by moving four legs of the four-legged robot at a first speed lower than or equal to a speed limit of the four-legged robot based on the non-stair mode;

instructing, by the data processing hardware, the four-legged robot to operate according to the stair mode, wherein instructing the four-legged robot to operate according to the stair mode comprises determining, by the data processing hardware, an adjusted speed limit of the four-legged robot in response to the entry into the stair mode, and wherein a speed of movement of the four legs is limited using different speed limits based on operation according to the non-stair mode and operation according to the stair mode; and subsequent to determining the adjusted speed limit, instructing, by the data processing hardware, the four-legged robot to traverse a set of stairs at a second speed lower than or equal to the adjusted speed limit.

17. The method of claim 16, further comprising:

determining a stride length of the four-legged robot based on a run of the set of stairs, wherein determining the adjusted speed limit is based on the stride length.

18. The method of claim 16, further comprising:

determining a cadence of the four-legged robot based on a run of the set of stairs, wherein determining the adjusted speed limit is based on the cadence.

19. The method of claim 16, wherein instructing the four-legged robot to operate according to the stair mode comprises adjusting, by the data processing hardware, a controller used by the four-legged robot from a first controller to a second controller based on the entry into the stair mode, wherein instructing the four-legged robot to traverse the set of stairs at a second speed lower than or equal to the adjusted speed limit comprises instructing the four-legged robot to traverse the set of stairs at a second speed lower than or equal to the adjusted speed limit using the second controller.

20. The method of claim 16, wherein receiving data identifying the entry into the stair mode comprises receiving the data identifying the entry into the stair mode from a remote controller of the four-legged robot.

* * * * *